(12) United States Patent
Ran

(10) Patent No.: US 12,007,572 B2
(45) Date of Patent: Jun. 11, 2024

(54) HEAD-MOUNTED DEVICE

(71) Applicant: GUANGDONG OPPO MOBILE TELECOMMUNICATIONS CORP., LTD., Guangdong (CN)

(72) Inventor: Ke Ran, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 136 days.

(21) Appl. No.: 17/833,585

(22) Filed: Jun. 6, 2022

(65) Prior Publication Data

US 2022/0299781 A1    Sep. 22, 2022

Related U.S. Application Data

(63) Continuation of application No. PCT/CN2020/129870, filed on Nov. 18, 2020.

(30) Foreign Application Priority Data

Dec. 6, 2019    (CN) .......................... 201911244286.7

(51) Int. Cl.
    *G02B 27/01*    (2006.01)
    *F16M 13/04*    (2006.01)
    *G06F 3/01*    (2006.01)

(52) U.S. Cl.
    CPC ......... *G02B 27/0176* (2013.01); *F16M 13/04* (2013.01); *G02B 27/0172* (2013.01);
    (Continued)

(58) Field of Classification Search
    CPC .. F16M 13/04; G02B 27/017; G02B 27/0172; G02B 27/0176; G02B 2027/0138; G02B 2027/0154; G06F 3/011
    See application file for complete search history.

(56) References Cited

U.S. PATENT DOCUMENTS 5,991,085 A * 11/1999 Rallison ............. G02B 27/0176
                                                        359/630
2002/0118506 A1    8/2002 Saito
(Continued)

FOREIGN PATENT DOCUMENTS

CN        204479841        7/2015
CN        105661735        6/2016
(Continued)

OTHER PUBLICATIONS

WIPO, International Search Report and Written Opinion for PCT/CN2020/129870, Jan. 27, 2021.
(Continued)

*Primary Examiner* — Nitin Patel
*Assistant Examiner* — Cory A Almeida
(74) *Attorney, Agent, or Firm* — Hodgson Russ LLP

(57) ABSTRACT

The present disclosure provides a head-mounted device and relates to a field of smart device. The head-mounted device includes a first housing, two second housings and a tightness adjustment mechanism. The first housing defines a first receiving cavity and a second receiving cavity partitioned from each other along an up-down direction. The two second housings extend from either side of two opposite sides of the first housing respectively. Each of the two second housings defines a third receiving cavity. Each of the two third receiving cavities communicates with the first receiving cavity. A part of the first housing at a side of the second receiving cavity extends beyond the second housing. The tightness adjustment mechanism is received in the first receiving cavity. A motion of a pawl assembly is achieved, thus a tightness of the first and second head bands can be adjusted.

20 Claims, 25 Drawing Sheets

(52) U.S. Cl.
CPC .............. *G02B 2027/0138* (2013.01); *G02B 2027/0154* (2013.01); *G06F 3/011* (2013.01)

(56) References Cited

U.S. PATENT DOCUMENTS

| | | | |
|---|---|---|---|
| 2015/0339468 A1 | 11/2015 | Son et al. | |
| 2016/0209661 A1 | 7/2016 | Nikkhoo et al. | |
| 2016/0357250 A1 | 12/2016 | Kim et al. | |
| 2017/0017085 A1 | 1/2017 | Araki et al. | |
| 2017/0337737 A1* | 11/2017 | Edwards | F16M 13/04 |
| 2018/0003984 A1 | 1/2018 | Lai et al. | |
| 2019/0220056 A1* | 7/2019 | Yan | G02B 27/0176 |
| 2021/0041909 A1 | 2/2021 | Ahn | |
| 2021/0333558 A1 | 10/2021 | Wang et al. | |

FOREIGN PATENT DOCUMENTS

| | | |
|---|---|---|
| CN | 205750111 | 11/2016 |
| CN | 205809421 | 12/2016 |
| CN | 106405861 | 2/2017 |
| CN | 107209384 | 9/2017 |
| CN | 206684384 | 11/2017 |
| CN | 207689758 | 8/2018 |
| CN | 207803549 | 9/2018 |
| CN | 207817306 | 9/2018 |
| CN | 108627980 | 10/2018 |
| CN | 207992564 | 10/2018 |
| CN | 208013552 | 10/2018 |
| CN | 109298527 | 2/2019 |
| CN | 109480806 | 3/2019 |
| CN | 208737099 | 4/2019 |
| CN | 110376740 | 10/2019 |
| CN | 110376741 | 10/2019 |
| CN | 209560205 | 10/2019 |
| CN | 110441910 | 11/2019 |
| CN | 110824715 | 2/2020 |
| CN | 110873964 | 3/2020 |
| WO | 2018023939 | 2/2018 |
| WO | 2019063706 | 4/2019 |
| WO | 2019182232 | 9/2019 |

OTHER PUBLICATIONS

CNIPA, First Office Action for CN Application No. 201911244286.7, Mar. 3, 2021.
CNIPA, First Office Action for CN Application No. 202111683502.5, Aug. 17, 2023.
EPO, Extended European Search Report for EP Application No. 20896428.8, Dec. 21, 2022.

* cited by examiner

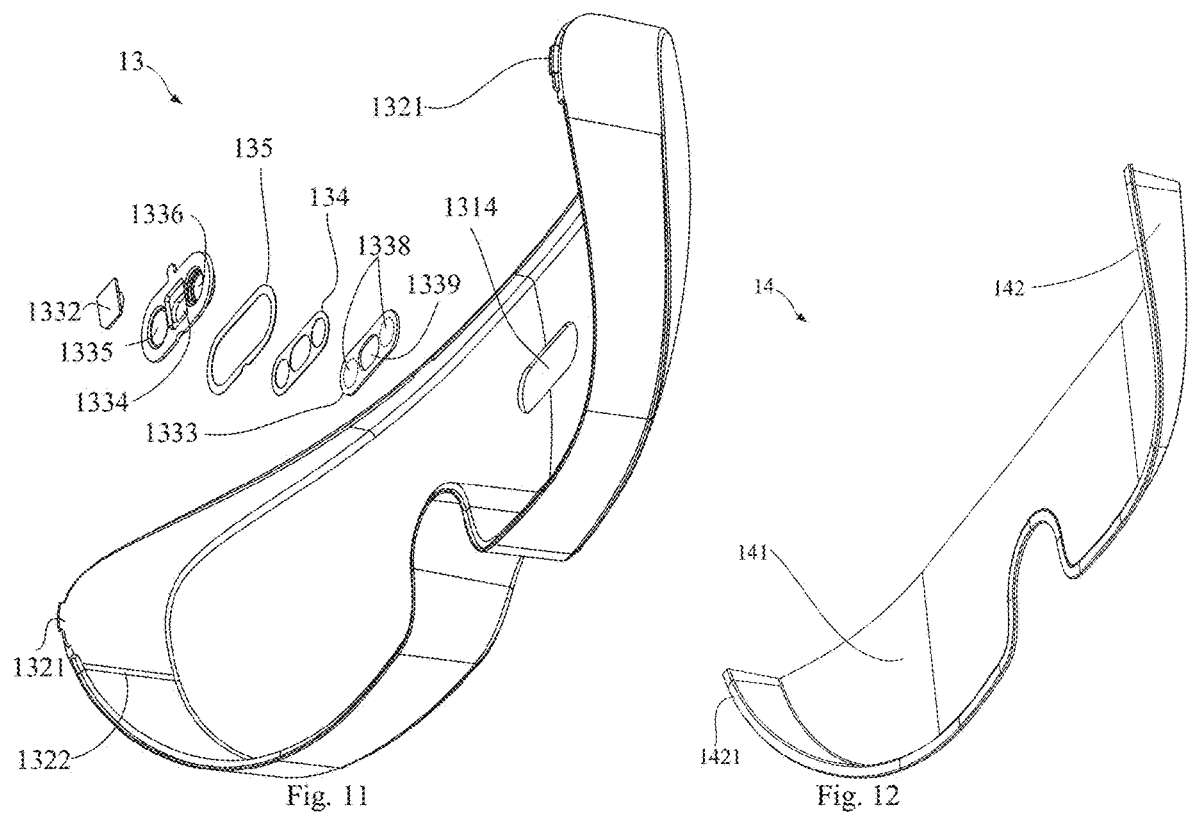
Fig. 11
Fig. 12
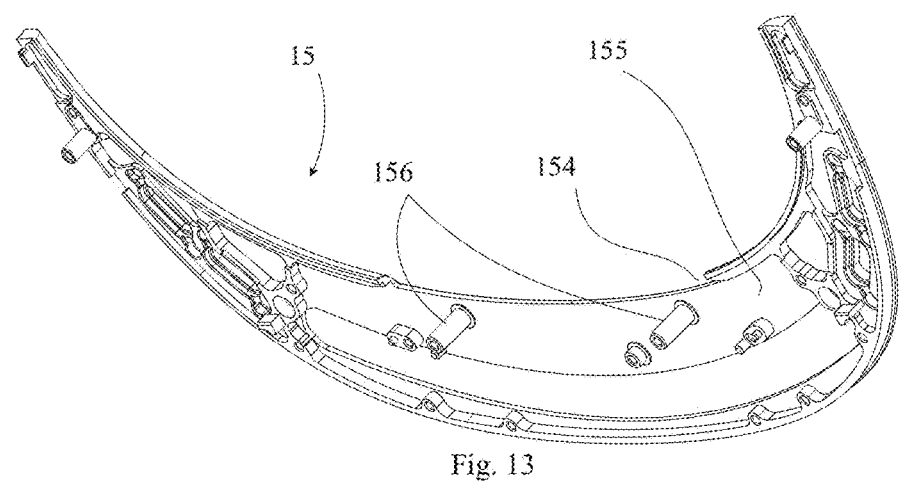
Fig. 13

HEAD-MOUNTED DEVICE

CROSS REFERENCE TO RELATED APPLICATIONS

The present application is a continuation of International Patent Application No. PCT/CN2020/129870, filed Nov. 18, 2020, which claims priority to Chinese Patent Application No. 201911244286.7, filed Dec. 6, 2019, the entire disclosures of which are incorporated herein by reference.

TECHNICAL FIELD

The present disclosure relates to a technical field of smart device, in particular to a kind of head-mounted device.

BACKGROUND

Virtual Reality (VR) and Augmented Reality (AR) technologies, which can bring users a visual experience comparable to that of real scenes, are currently popular research fields. To enable users to better experience VR and AR technologies, VR and AR are often displayed by head-mounted devices.

A head-mounted device is a wearable device worn on the user's head. After the head-mounted device is worn, the display screen used for VR or AR display may be located in front of the user's eyes. By displaying, in the areas corresponding to the left eye and right eye of the user in the display screen of the head-mounted device, the corresponding content, the user is enabled to experience the VR or AR display effect.

A head-mounted device may be worn with the aid of a tether. The length of the tether may be adjusted, such that the user can wear the head-mounted device more easily and comfortably. Therefore, an adjustment device may be needed to achieve the adjustment of the length of the tether.

SUMMARY OF THE DISCLOSURE

According to an aspect of the present disclosure, a head-mounted device is provided. The head-mounted device include a first housing, two second housings and a tightness adjustment mechanism. The first housing defines a first receiving cavity and a second receiving cavity partitioned from each other along an up-down direction. The two second housings extend from either side of two opposite sides of the first housing. Each of the two second housings defines a third receiving cavity, each of the two third receiving cavities communicates with the first receiving cavity. One of the two third receiving cavities is at a right side of the first receiving cavity, the other one of the two third receiving cavities is at a left side of the first receiving cavity. A part of the first housing at a side of the second receiving cavity extends beyond the second housing. The tightness adjustment mechanism is received in the first receiving cavity. The tightness adjustment mechanism includes a mounting plate, a ratchet pawl mechanism and a knob assembly. The mounting plate is fixed in the first receiving cavity. The ratchet pawl mechanism is mounted on the mounting plate. The ratchet pawl mechanism includes a ratchet and a pawl assembly. The pawl assembly engages with the ratchet. The knob assembly engages with the pawl assembly and the ratchet.

According to another aspect of the present disclosure, a head-mounted device is provided. The head-mounted device includes a first housing, a second housing, a lacing assembly and a tightness adjustment mechanism. The first housing defines a first receiving cavity. The second housing extends from a side of the first housing. A second receiving cavity is defined by the second housing. The second receiving cavity is isolated from the first receiving cavity. An extending length of the first housing is greater than an extending length of the second housing along a same direction. The lacing assembly includes a first head band and a second head band. The first head band and the second head band are overlapped and connected with each other. A length adjustment hole is defined at an end of each of the first head band and the second head band. The length adjustment holes of the first head band and the second head band are overlapped and connected with each other in the first receiving cavity. A connection portion is provided at the other end of each of the first head band and the second head band. The tightness adjustment mechanism is received in the first receiving cavity. The tightness adjustment mechanism includes a mounting plate and a ratchet pawl mechanism. The mounting plate is fixed in the first receiving cavity. The ratchet pawl mechanism is mounted on the mounting plate. The ratchet pawl mechanism and the length adjustment hole cooperate with each other and adjust an overlapped length of the first head band and the second head band.

According to yet another aspect of the present disclosure, a head-mounted device is provided. The head-mounted device includes a host housing, a first housing, two second housings, a lacing assembly, a tightness adjustment mechanism and a force bearing member. The first housing defines a first receiving cavity and a second receiving cavity partitioned with each other. The two second housings extend from either side of two opposite sides of the first housing. A third receiving cavity is defined by the second housing. The third receiving cavity communicates with the first receiving cavity. A part of the first housing at a side of the second receiving cavity extends beyond the second housing. The lacing assembly is connected with the host housing and the two second housings to form a frame. The lacing assembly includes a first head band and a second head band connected with each other. The first head band and the second head band are configured to overlap with each other. An end of each of the first head band and the second head band is received in the first receiving cavity and the third receiving cavity. The other end of each of the first head band and the second head band is provided with a connection portion. The connection portion is configured to be connected to the host housing. The tightness adjustment mechanism is received in the first receiving cavity. The tightness adjustment mechanism includes a mounting plate and a ratchet pawl mechanism. The ratchet pawl mechanism is mounted on the mounting plate. The ratchet pawl mechanism cooperates with the first head band and the second head band, and adjusts an overlapping length of the first head band and the second head band. The force bearing member is mounted on the frame.

A tightness adjustment mechanism is provided in the present disclosure. A motion of a pawl assembly is achieved through the combination of a ratchet and the pawl assembly, thus a tightness of the first head band and the second head band can be adjusted.

BRIEF DESCRIPTION OF THE DRAWINGS

In order to more clearly illustrate technical solutions in the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts.

FIG. 11 is a schematic diagram of the mask shown in FIG. 10 from another view angle.

FIG. 12 is an enlarged schematic diagram of a rear cover of the first housing assembly shown in FIG. 5.

FIG. 13 is a schematic diagram of a primary shell ornament shown in FIG. 5 from another view angle.

DETAILED DESCRIPTION

Technical solutions in embodiments of the present disclosure will be described clearly and thoroughly in connection with accompanying drawing of the embodiments of the present disclosure. Obviously, the described embodiments are only a part of the embodiments, but not all of them. All other embodiments by a person of ordinary skills in the art based on embodiments of the present disclosure without creative efforts should all be within the protection scope of the present disclosure.

Reference to 'embodiments' herein means that a specific feature, structure, or characteristic described in conjunction with the embodiments may be included in at least one embodiment of the present disclosure. The appearance of this phrase in various locations in the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

In addition, the terms "first" and "second" etc. in the present specification are only for the purpose of description, and cannot be construed as indicating or implying relative importance or implicitly indicating the number of technical features referred to. Thus, the features preceded by "first" and "second" may explicitly or implicitly include one or more of these features.

Figure 1:
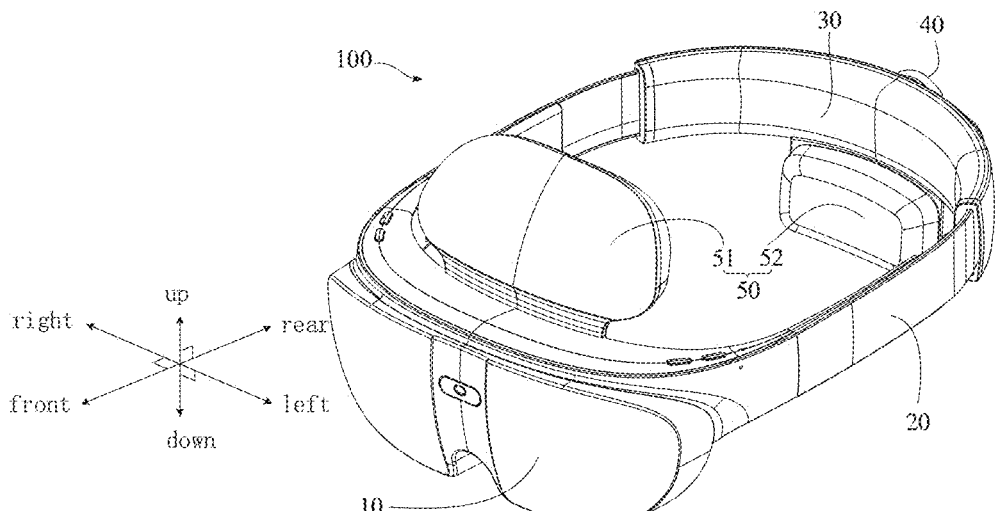
FIG. 1 is a perspective view of a head-mounted device according to an embodiment of the present disclosure.

As shown in FIG. 1, the head-mounted device 100 in the embodiments of the present disclosure may include a first housing assembly 10, a lacing assembly 20 connected with both ends of the first housing assembly 10, a tightness adjustment mechanism 40 connected with the lacing assembly 20, a second housing assembly 30 arranged on the lacing assembly 20 and opposite to the second housing assembly 30 and a force-bearing assembly 50 arranged on the first housing assembly 10 and the second housing assembly 30. The first housing assembly 10, the lacing assembly 20 and the second housing assembly 30 may constitute a tightness-adjustable frame, to facilitate wearing of the head-mounted device 100 on a user's head. The force-bearing assembly 50 may be arranged on the upper and lower sides of the frame, to share the weight of the head-mounted device 100 bearing by the user's head.

Figure 2:
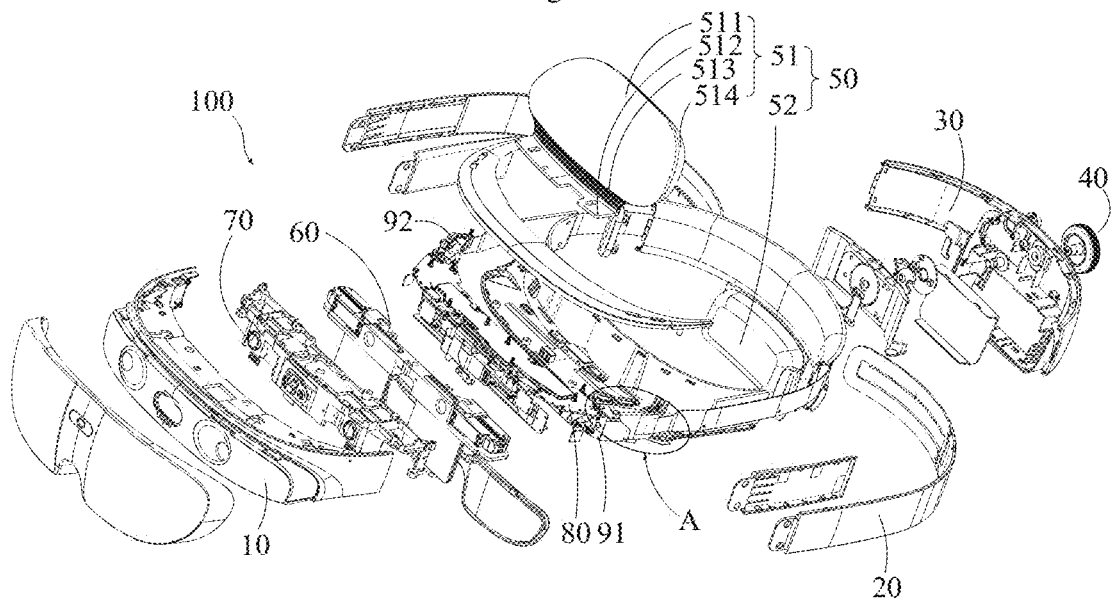
FIG. 2 is an exploded perspective view of the head-mounted device shown in FIG. 1.
Figure 3:
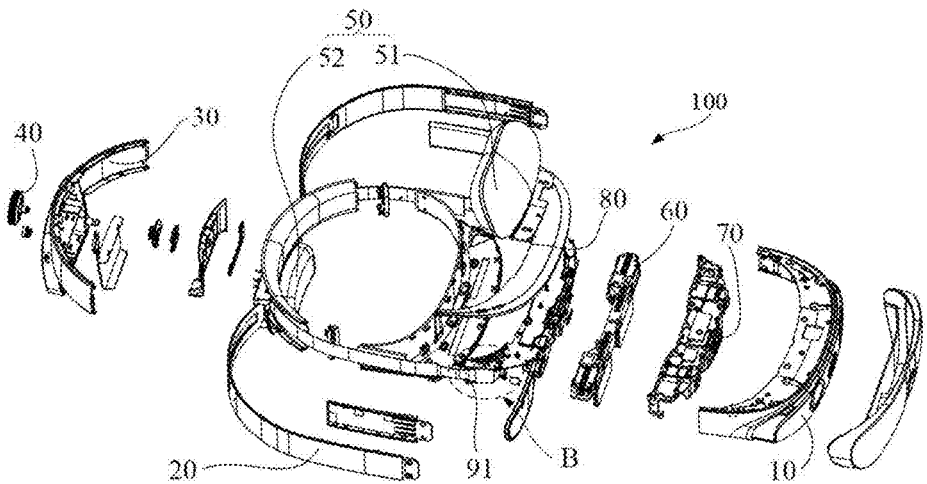
FIG. 3 is an exploded perspective view of the head-mounted device shown in FIG. 1 from another view angle.

As shown in FIG. 2 and FIG. 3, the head-mounted device 100 of embodiments of the present disclosure may further include a host housed in the first housing assembly 10. The host may include an optical-mechanical assembly 60, a camera assembly 70, a motherboard 80, a speaker assembly 91 and a microphone assembly 92 among others. Since the first housing assembly 10 is configured for housing and protecting the host machine, the first housing assembly 10 may also be referred to as a host housing or a protective housing. The first housing assembly 10 and the host housed in it may form a host assembly. The head-mounted device 100 may be a VR glass, an AR glass etc. The AR glass may be taken as an example in the embodiments of the present disclosure for description.

In the example AR glass, the head-mounted device 100 may be configured to deliver data to and receive data from an external processing device via a signaling connection. The signaling connection may be a wired connection, a wireless connection, or a combination thereof. However, in other cases, the head-mounted device 100 may be used as a stand-alone device. That is, the data processing may be performed in the head-mounted device 100 itself. The signaling connection may be configured to carry any kind of data, such as image data (for example, static image and/or full motion video, including 2D and 3D images), audio, multimedia, voice and/or any other kind of data. The external processing device for example may be a game console, a personal computer, a tablet computer, a smart phone or other kinds of processing devices. The signaling connection may be, for example, a Universal Serial Bus (USB) connection, a Wi-Fi connection, a Bluetooth or Bluetooth Low Energy (BLE) connection, an Ethernet connection, a cable connection, a DSL connection, a cellular connection (e.g., 3G, LTE/4G, or 5G), or a combination thereof. Additionally, the external processing device may communicate with one or more other external processing devices via a network. The network may be or include, for example, a local area network (LAN), a wide area network (WAN), an Intranet, a metropolitan area network (MAN), the global Internet, or a combination thereof.

The first housing assembly 10 of the head-mounted device 100 may be fitted with display components, optics, sensors and processors, among others. In the example AR glass, the display component may be designed to, for example, overlay an image on the user's view of the real-world environment by projecting light into the user's eyes. The head-mounted device 100 may also include an ambient light sensor. The head-mounted device 100 may also include an electronic circuit system to control at least some of the above components and perform associated data processing functions. The electronic circuit system may for example include one or more processors and one or more memories.

First Housing Assembly 10

Figure 4:
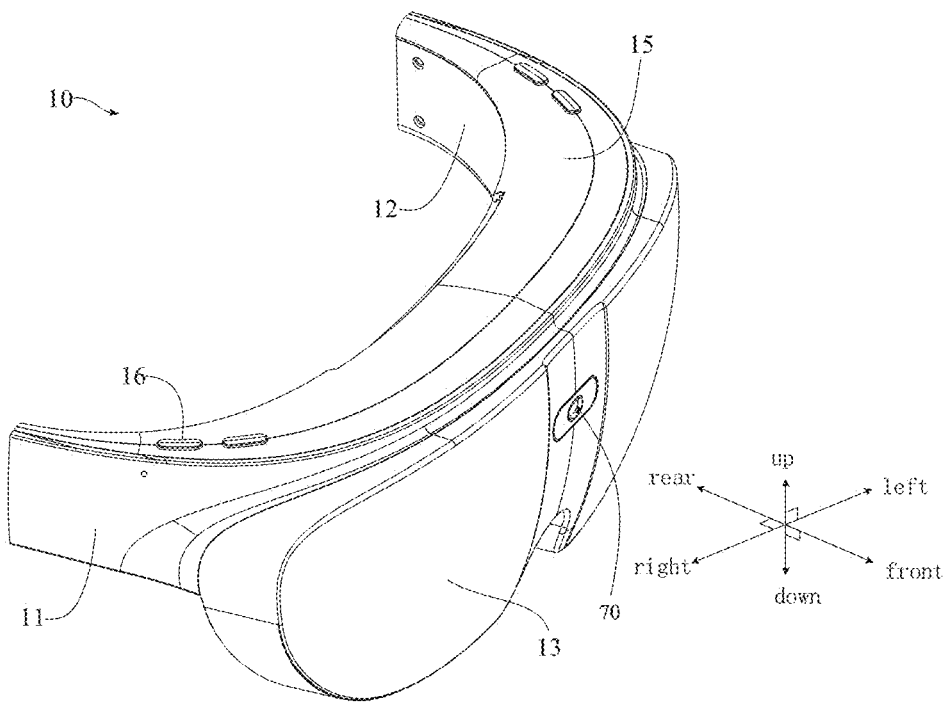
FIG. 4 is a perspective view of a first housing assembly of the head-mounted device according to an embodiment of the present disclosure.
Figure 5:
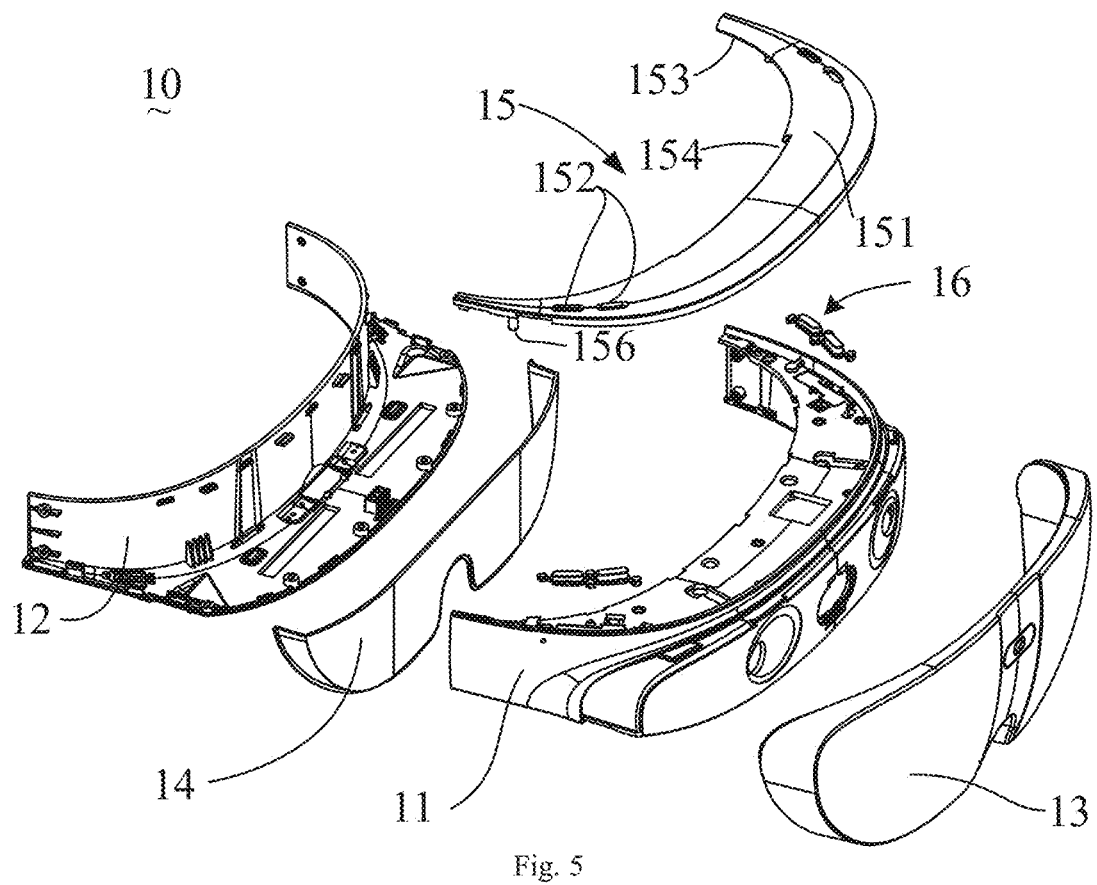
FIG. 5 is an exploded perspective view of the first housing assembly shown in FIG. 4.

As shown in FIGS. 4 and 5, an assembly view and an exploded view of the first housing assembly 10 of the head-mounted device 100 are respectively illustrated. The first housing assembly 10 may include a primary front shell 11, a primary rear shell 12 that fits with the primary front shell 11 by a snap-on connection, a mask 13 that is provided on and covers or masks the front of the primary front shell 11, a rear cover 14 that is located below the primary rear shell 12 and fits with a lower portion of the mask 13, and a primary shell ornament 15 that is provided on and covers or masks the top of the primary front shell 11.

In the present specification, orientations such as "top", "bottom", "front", "rear", "left" and "right" as shown in FIGS. 1 and 4 will be referred to for description. It should be appreciated that, in the present disclosure, the terms "middle", "longitudinal", "transverse", "length", "width", "thickness", "upper", "lower", "front", "rear", "left", "right", "vertical", "horizontal", "top", "bottom", "inner", "outer", "clockwise", "counter-clockwise" and others may indicate directions or positions that are based on the orientation or position relationship shown in the drawings, and are only for the convenience of describing the application and simplification of the description, but not indicate or imply that the apparatus or unit referred to should have a specific orientation, be constructed and operated in a specific orientation, therefore cannot be construed as a restriction on this application.

The Primary Front Shell 11 of the First Housing Assembly 10

Figure 6:
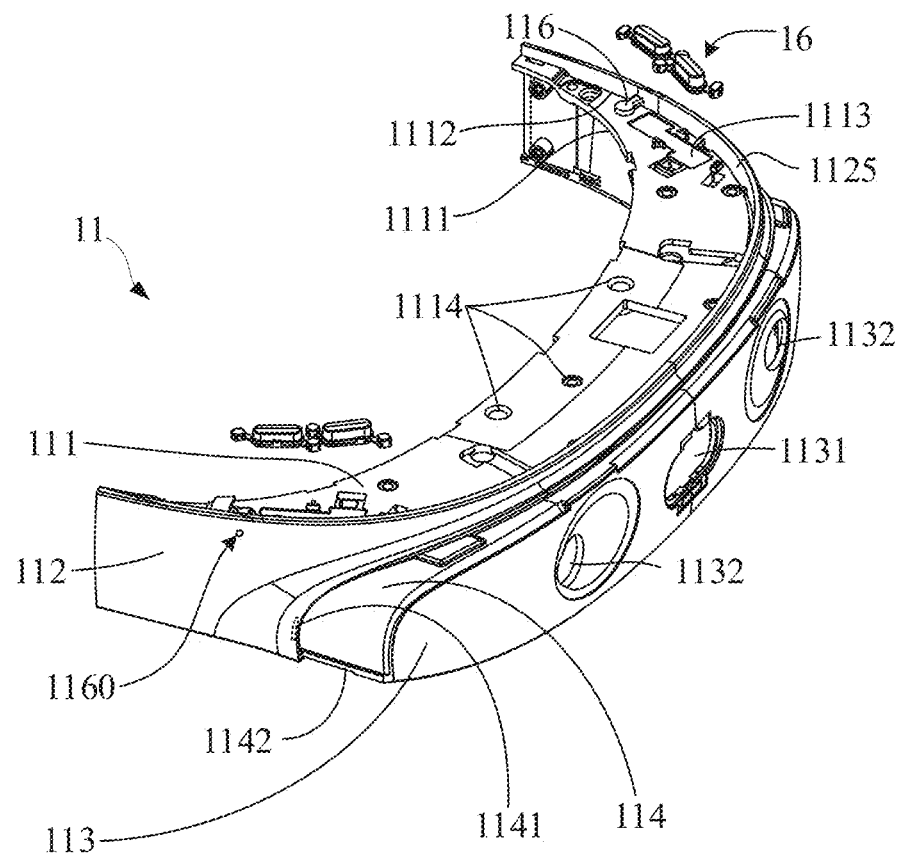
FIG. 6 is an enlarged perspective view of a primary front shell of the first housing assembly shown in FIG. 5.

As shown in FIG. 6, the primary front shell 11 may include a top plate 111 and a first side plate provided on one side of the top plate 111. The first side plate may include a first portion 112, a second portion 113 and a connection portion 114. The first portion 112 may be provided on the outer side of the top plate 111 and extend downward from both sides of the top plate 111. The connection portion 114 may extend from the first portion 112 away from a mounting plate 122 (please refer to FIG. 8) of the primary rear shell 12. The second portion 113 may extend downward from the connection portion 114. The cross section of the primary front shell 11 may be generally an inverted L-shape. The primary front shell 11 may be a one-piece injection molded member, to increase the structure strength of the primary front shell 11.

Figure 18:
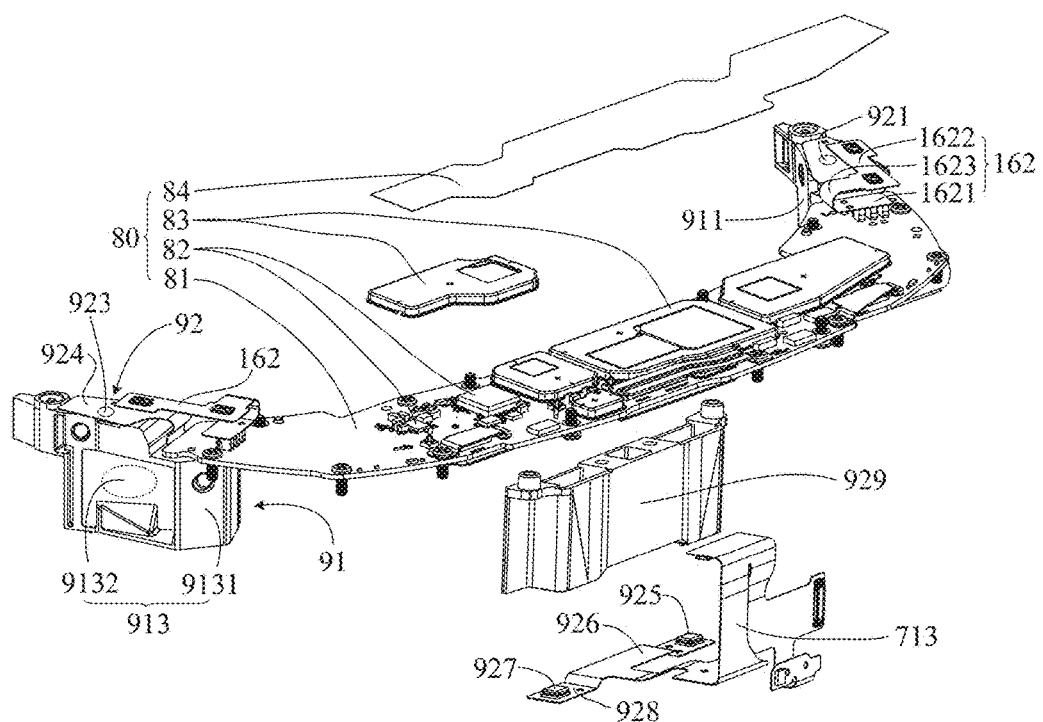
FIG. 18 is an exploded perspective view of a motherboard, a speaker assembly and a microphone assembly of the head-mounted device according to an embodiment of the present disclosure.

The top plate 111 may as a whole be crescent-shaped. That is, the inner side 1111 of the top plate 111 may be in an arc generally matching a forehead profile of the user. The outer side 1112 of the top plate 111 may also be in an arc that is curved to a greater extent than the inner side 1111. Two ends of the inner side 1111 and two ends of the outer side 1112 may approach each other respectively. In other words, the distance between the inner side 1111 and the outer side 1112 decreases gradually from a middle of the top plate 111 to the left and right sides of the top plate 111. The top plate 111 may be arranged horizontally. One or more accommodating sections 1113 may be defined on both sides of the top plate 111. For example, an accommodating section 1113 may be defined at the left-front of the top plate 111, an accommodating section 1113 may be defined at the right-front of the top plate 111. The accommodating section 1113 may be a recess for accommodating a key segment 1622 of the key Flexible Printed Circuit (FPC) 162 (as shown in FIG. 18). The accommodating section 1113 may also partially accommodate a bottom part of a side key 16 or a side button 16. When the side key 16 is pressed, the tab or post 161 (see FIG. 7) below the side key 16 may be configured to press this key segment 1622. In some embodiments, four side keys 16 may be symmetrically arranged on the top plate 111 at positions near its left and right sides away from its middle position. That is, with two side keys 16 on one side. One or more through holes 1114 may also be defined on the top plate 111. The one or more through holes 1114 may be configured for the mounting of other components. Threads may be arranged on inner walls of some of these through-holes 1114 to mate with screws. Threads may not be arranged on inner walls of other through-holes 1114 and these through holes 1114 are merely for passing of screws. As further shown in FIG. 7, the lower surface 1115 of the top plate 111 may also be provided with one or more snap structures 1116 near the inner side 1111. In some embodiments, each snap structure 1116 may be a snap-hook. It should be appreciated that, the snap structures in the present disclosure is not limited to snap-hooks, bumps, slots, recesses, through holes etc., as long as they can enable two structures to snap into each other.

It should be note that, in the present disclosure, unless otherwise definitely specified and limited, the terms "installed", "joined", "connected" should be understood in a broad sense, for example, they can be fixed connections or detachable connections, or integrally connected. In some embodiments, they can be mechanical connections or electrical connections. In some embodiments, they can be direct connections or indirect connections through intermediate mediums, and they can be an internal communication between two components. For those of ordinary skills in the art, the specific meanings of the above-mentioned terms in the present disclosure can be understood according to specific circumstances.

Figures 7, 8:
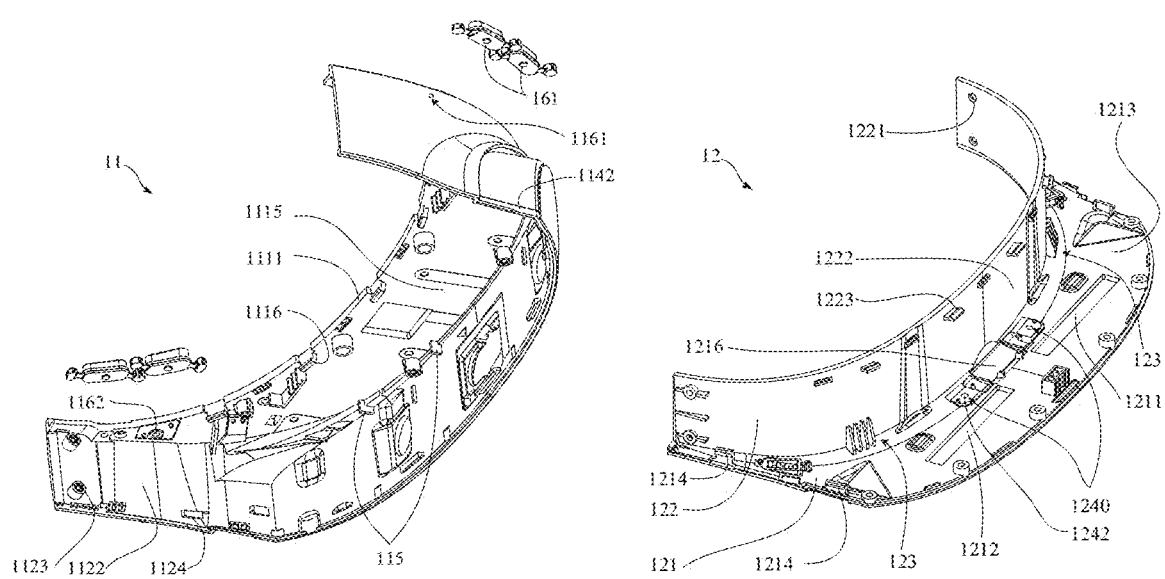
FIG. 7 is a perspective view of the primary front shell shown in FIG. 6 from another view angle.
FIG. 8 is an enlarged perspective view of a primary rear shell of the first housing assembly shown in FIG. 5.

The first portion 112 may extend downward from both sides (i.e., correspond to the positions of the left and right sides of the user's eyes) of the outer side 1112 of the top plate 111, such that a top view profile of the first portion 112 may have a same curved shape as that of the outer side 1112. The first portion 112 and the second portion 113 may be provided symmetrically on both sides of the top plate 111 with respect to each other. One or more channels 1160 for sound input may be defined on both sides of the first portion 112. For example, a channel 1160 may be defined at the left-front position of the first portion 112, and a channel 1160 may be defined at the right-front position of the first portion 112. Each of the channels 1160 may be defined within a bump 116. The inlet 1161 of the channel 1160 may be defined on an outer surface of the first portion 112 of the first side plate. For example, the inlets 1161 of both channels 1160 may be defined in the upper half part of the first portion 112 of the first side plate. An exit 1162 of this channel 1160 may be defined on the lower surface 1115 of the top plate 111. Each of the channels 1160 may be defined in a rearward position of the accommodating section 1113. The inlets 1161 of both channels 1160 may be defined on sides of the housing 10. The orientations of the inlets 1161 of both channels 1160 may be opposite. These channels 1160 may also be referred to as microphone holes, and configured to transmit sound into the microphone assembly 92 (as shown in FIG. 18) within the head-mounted device 100. The sound data of the user and/or the external environment may then be collected by the microphone assembly 92. The left and right ends of an inner surface 1122 of the first portion 112 of the first side plate may be provided with one or more posts 1123, to connect with the lacing assembly 20. In the assembly structure of the primary front shell 11 and the primary rear shell 12, the post 1123 may also be located between the first portion 112 and the mounting plate 122. A threaded hole may be defined in the post 1123, to screw in a screw. One or more snap structures 1124 may also be provided at a lower edge of the inner surface 1122 of the first portion 112. This first portion 112 may also extend upward from the outer side 1112 of the top plate 111 to form a convex ridge portion 1125. The shape of the convex ridge portion 1125 may match with that of the outer side 1112. The upward extending direction is a direction in which the top plate 111 extends away from the bottom plate 121 (as shown in FIG. 8). A height of the convex ridge portion 1125 may be comparable to a thickness of the primary shell ornament 15. In this way, the primary shell ornament 15 may be placed within a space defined by the top plate 111 and the convex ridge portion 1125, thus a rear-facing side surface of the convex ridge portion 1125 may be in contact with the forward-facing side surface of the primary shell ornament 15. The convex ridge portion 1125 may also be arranged to surround the periphery of the primary shell ornament 15. The connection portion 114 may extend from the first portion 112 in a forward direction. That is, the connection portion 114 may extend in a direction away from the post 1123. A step may be formed on the connection portion 114. One or more snap structures 1141 may be provided on the step. In some embodiments, each snap structure 1141 may be a recess. The snap structure 1141 may also be a bump, a snap-hook, a recess etc. Both sides of the connection portion 114 may be provided with guiding structures 1142, such as horizontally extending bosses. These guiding structures 1142 and snap structures 1141 may be configured to fit and connect with the mask 13.

As shown in FIG. 6 and FIG. 7, the second portion 113 may be provided on the front side of the top plate 111, corresponding to locations of the user's eyes. The second portion 113 may be connected to a front end of the connection portion 114. A width of the middle position of the second portion 113 along an up-down direction may be wider than a width at positions connecting with the connection portion 114 on both sides. A through hole 1131 may be defined in the center of the second portion 113. Two through holes 1132 may be defined on either side of the through hole 1131. The through holes 1131 and 1132 may be configured for passage of external light received by the camera.

As shown in FIG. 7, one or more reinforcing ribs 115 may also be provided at the connection of the top plate 111 and the second portion 113, to enhance the connection between the second portion 113 and the top plate 111.

The Primary Rear Shell 12 of the First Housing Assembly 10

Figure 9:
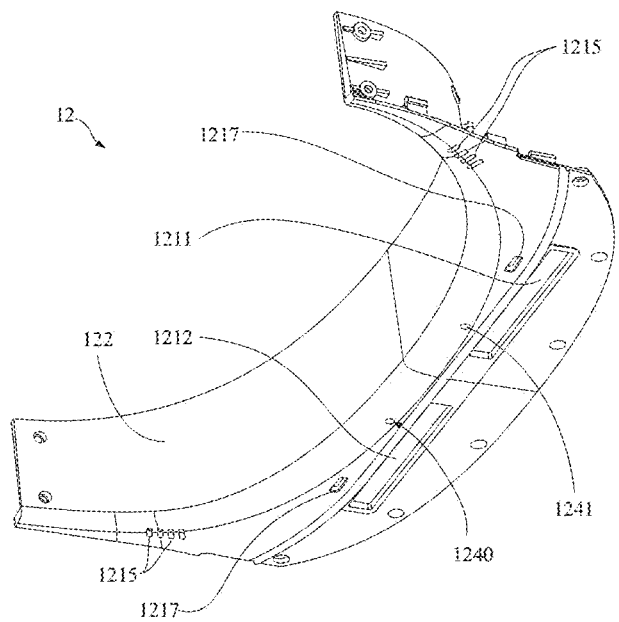
FIG. 9 is a perspective view of the primary rear shell shown in FIG. 8 from another view angle.
Figure 22:
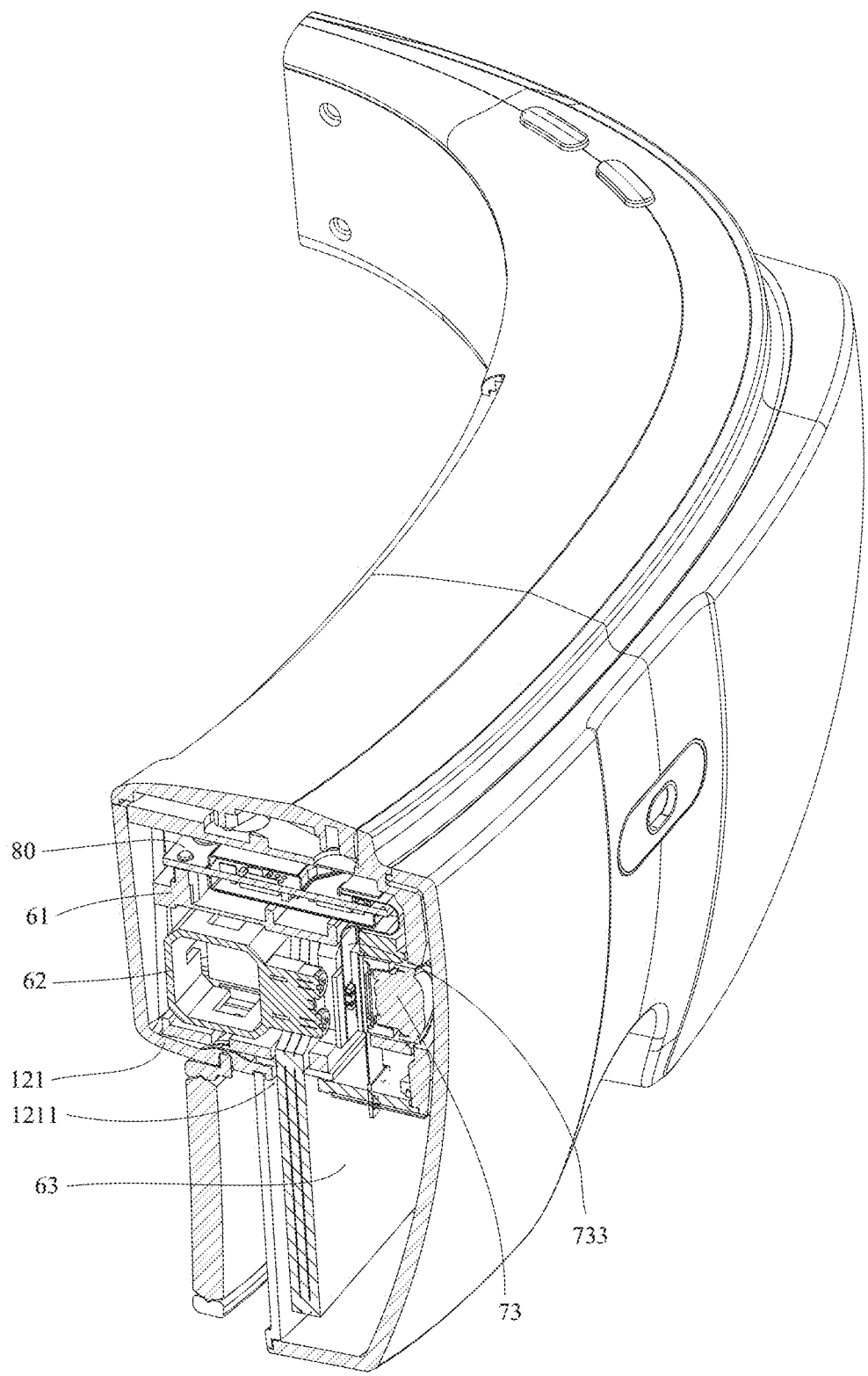
FIG. 22 is another sectional view of the first housing assembly, the optical-mechanical assembly, the camera assembly, the speaker and the motherboard of the head-mounted device shown in FIG. 1.

Referring to FIGS. 8 and 9, the primary rear shell 12 may include a bottom plate 121 and a mounting plate 122. A position of the bottom plate 121 along the up-down direction may correspond to the position of the top plate 111 of the primary front shell 11. A position of the mounting plate 122 along the front-rear direction may correspond to the position of the first side plate of the primary front shell 11. The mounting plate 122 may also be referred as a second side plate. The cross section of the primary rear shell 12 may be generally an L-shape, The L-shape of the primary rear shell 12 may fit with the inverted L-shape of the primary front shell 11 to exactly form together an accommodation cavity 17 (as shown in FIG. 22). The primary rear shell 12 may be a one-piece injection molded member, to increase the structure strength of the primary rear shell 12. One or more reinforcing ribs 123 may also be provided at the connection of the bottom plate 121 and the mounting plate 122, to enhance the connection between the bottom plate 121 and the mounting plate 122.

Figure 14:
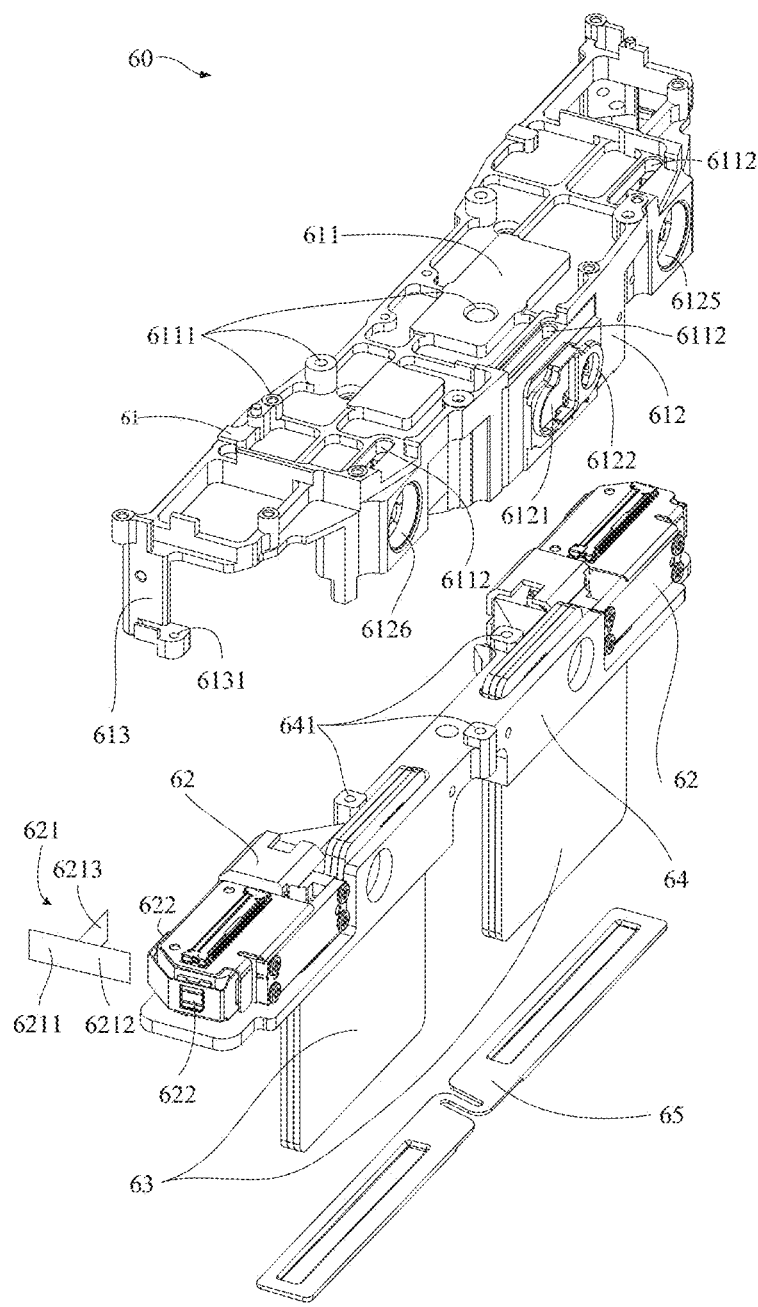
FIG. 14 is an exploded perspective view of the optical-mechanical assembly shown in FIG. 2.

The bottom plate 121 may be in a crescent shape that is substantially same as that of the top plate 111. A rectangular through hole 1211 may be defined on the left part of the bottom plate 121, a rectangular through hole 1212 may be defined on the right part of the bottom plate. The rectangular through holes 1211 and 1212 may be symmetrical with respect to a line between left part and right part of the bottom plate. A waveguide sheet 63 of the optical-mechanical assembly 60 (as shown in FIG. 14) may be plugged into the rectangular through holes 1211 and 1212 from above. One or more snap structures 1214 may be provided on edges of the upper surface 1213 of the bottom plate 121 away from the mounting plate 122. The one or more snap structures 1214 may be configured to mate with the snap structures 1124 of the first portion 112 of the primary front shell 11. One or more speaker sound output hole 1215 may be defined in a middle position of each of the two sides of the bottom plate 121. Specifically, a first set of speaker sound output holes consisting of one or more speaker sound output holes 1215 may be defined at the middle position of one side of the bottom plate 121. A second set of speaker sound output holes consisting of one or more speaker sound output holes 1215 may be defined at the middle position of the other side of the bottom plate 121. When the head-mounted device 100 is worn by the user, the speaker sound output holes 1215 may be close to the user's ears. In this way, the user may be allowed to hear the sound played by the speakers within the head-mounted device 100 more easily. A first magnet 1216 may also be provided in the middle of the bottom plate 121 near the mounting plate 122. Two recesses 1217 may be defined on the lower surface of the bottom plate 121 away from the top plate 111. Each of the two recesses 1217 may be defined on one side of the first magnet 1216 respectively. The two recesses 1217 may be defined at one side of the rear cover 14 away from the mask 13. The above-mentioned first set of speaker sound output holes may be defined at one side of the two recesses 1217, while the second set of speaker sound output holes may be defined at the other side of the two recesses 1217. The first set of speaker sound output holes and the second set of speaker sound output holes may be more far away from the rear cover 14 than the two recesses 1217.

One or more channels 1240 for sound input may be defined on the bottom plate 121. These channels 1240 may be defined at positions that are in the middle of the bottom plate 121 and close to the mounting plate 122. For example, a channel 1240 may be defined at a position on the left side of the first magnet 1216, another channel 1240 may be defined at a position at the right side of the first magnet 1216. An inlet 1241 of each channel 1240 may be defined on the lower surface of the bottom plate 121. That is, the inlet 1241 is defined on the under-surface of the housing 10. The inlet 1241 of each of the two channels 1240 may be adjacent to the mounting plate 122. The exit 1242 of each of the channels 1240 may be defined on the upper-surface 1213 of the bottom plate 121. These channels 1240 may also be referred to as microphone holes, and configured to transmit sound into the microphone assembly 92 (as shown in FIG. 18) within the head-mounted device 100. The sound data of the user and/or the external environment may then be collected by the microphone assembly 92.

In some embodiments, a distance between two channels 1160 may be greater than a distance between two channels 1240. Further, a distance from a channel 1160 to a channel 1240 is equal to a distance from another channel 1160 to another channel 1240. Wherein, the channel 1240 is adjacent to the channel 1160, and the another channel 1240 is adjacent to the another channel 1160.

The mounting plate 122 may extend upward from the bottom plate 121. The mounting plate 122 may have an arc shape that generally matches with the user's forehead profile. A through hole 1221 may be defined on each side of the mounting plate 122. A screw may be received in the through hole 1221. One or more snap structures 1223 may be provided on the upper edge of the outer side 1222 of the mounting plate 122. In some embodiments, each of the snap structures 1223 may be a snap-hook. A snap structure 1223 may for example be hooked to and mate with the snap structure 1116 of the top plate 111 of the primary front shell 11.

When the primary front shell 11 is buckled to the primary rear shell 12, the mounting plate 122 and the top plate 111 may be connected by a connection between the snap structures 1223 and the snap structures 1116, the first portion 112 and the bottom plate 121 may be connected by the connection between the snap structures 1124 and the snap structures 1214. By the snap-connection between the snap structures 1223 and the snap structures 1116 and the snap-connection between the snap structures 1124 and the snap structures 1214, the first housing assembly 10 may be disassembled during a later maintenance process. Further, the assembly of the first housing assembly 10 may not need too many screws, and an increase of weight of the product may be avoided. In addition, the top plate 111 and the bottom plate 121 may also be fixed by screws, bolts, etc., to enhance the connection between the primary front shell 11 and the primary rear shell 12.

The snap structures 1116 and the snap structures 1223 may constitute a first connection mechanism arranged between the top plate 111 and the mounting plate 122. The snap structures 1124 and the snap structures 1214 may constitute a second connection mechanism arranged between the bottom plate 121 and the first side plate. The first connection mechanism and the second connection mechanism may enable the primary front shell 11 and the primary rear shell 12 to mate with each other, thereby defining an accommodation cavity 17 configured to receive the host of the head-mounted device 100. In some embodiments, the first connection mechanism may be a threaded connection structure or a bonding structure, and the second connection mechanism may be a threaded connection structure or a bonding structure.

It should be noted that, when the first housing assembly 10 is described alone, that is, when the first housing assembly 10 is not described in conjunction with the second housing assembly 30, the primary front shell 11 of the first housing assembly 10 may also be referred as a first housing, and a primary rear shell 12 of the first housing assembly 10 may be referred as a second housing.

The Mask 13 of the First Housing Assembly 10

Figure 10:
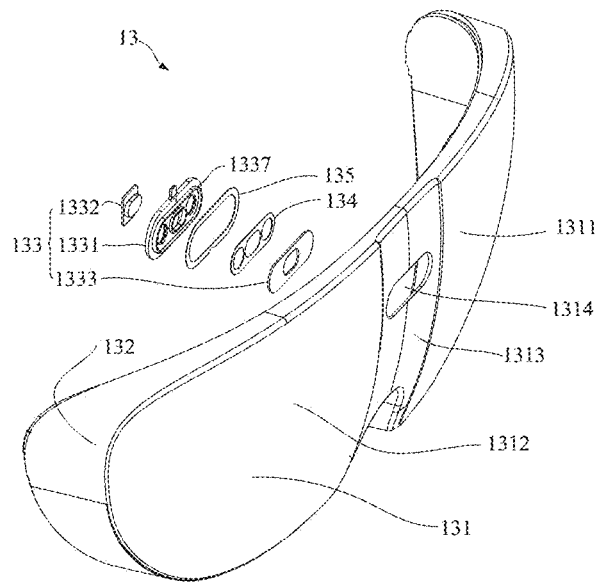
FIG. 10 is an enlarged perspective view of a mask of the first housing assembly shown in FIG. 5.

As shown in FIGS. 10 and 11, the mask 13 may be translucent. The mask 13 may include a mask portion 131, an mounting portion 132 and a lens assembly 133. The mask portion 131 may include a first mask portion 1311, a second mask portion 1312 and a connection portion 1313. The first mask portion 1311 and the second mask portion 1312 may be arranged symmetrically along a left-right direction. The connection portion 1313 may be arranged between the first mask portion 1311 and the second mask portion 1312.

The first mask portion 1311 and the second mask portion 1312 may be light-transmissible in terms of optics. At least parts of the first mask portion 1311 and the second mask portion 1312 that corresponds to the two through holes 1132 of the second portion 113 of the primary front shell 11 are light-transmissible. In this way, the following effects may be achieved: external light may be allowed to pass through the first mask portion 1311 and the second mask portion 1312, while objects inside the mask 13 cannot be seen by human eyes from outside. For example, the mask 13 may be treated to degrade its light-transmission capacity, and the mask 13 may be translucent. In this way, structures inside the mask 13 may not be seen by human eyes, yet the camera assembly 70 within the mask 13 may receive external light, thereby enabling imaging of outside objects etc. The mask 13 may be made of materials such as plastics or hardware.

A through hole 1314 may be defined at a position of the connection portion 1313 corresponding to the through hole 1131 of the second portion 113. The mounting portion 132 may extend rearward from an edge of the mask portion 131. That is, the mounting portion 132 may extend toward the primary front shell 11. One or more snap structures 1321, such as snap-hooks or bosses may be provided on an edge of the mounting portion 132 away from the mask portion 131. One or more guiding structures 1322 may be arranged on inner surfaces at each of two sides of the mounting portion 132. The one or more guiding structures 1322 may be horizontally extending bosses or steps. These snap structures 1321 may be configured to match with the snap structures 1141 of the connection portion 114 of the primary front shell 11, these guiding structures 1322 may be configured to match with the guiding structures 1142 of the connection portion 114 of the primary front shell 11. In this way, the mask 13 may be mounted to the primary front shell 11. As an example, the first mounting portion 132 of the mask 13 may be attached to the connection portion 114 of the first side plate. When viewed in front of the mask 13, a projection area of the mask 13 is greater than a projection area of the primary front shell 11. In this way, when the mask 13 is mounted to the primary front shell 11, only an upper part of the mask 13 is attached to the first side plate of the primary front shell 11 and covers the first side plate. For example, the upper part of the mask portion 131 covers the second portion 113 of the first side plate. A lower part of the mask 13 is lower than the primary front shell 11. That is, the mask 13 extends downward to a position beyond the primary front shell 11 (as shown in FIG. 4). Correspondingly, the mask 13 extends downward to a position beyond the bottom plate 121. A protecting space may be defined between the rear cover 14 and a lower part of the mask 13, to protect the waveguide sheet 63 between the rear cover 14 and a lower part of the mask 13. The upper part of the mask 13 may be an upper half of the mask 13, the lower part of the mask 13 may be a lower half of the mask 13.

The snap structures 1141 of the connection portion 114 and the snap structures 1321 of the mask 13 may together form a connection structure between the connection portion 114 and an edge of the first mounting portion 132 away from the mask portion 131. The snap structures 1321 may snap-connect with the snap structures 1141. The guiding structures 1142 of the connection portion 114 and the guiding structures 1322 of the mask 13 may together form a guiding structure between the connection portion 114 and a surface of the first mounting portion 132 facing the connection portion 114. The guiding structures 1322 may slidingly fit with the guiding structures 1142.

The lens assembly 133 may be plugged in the through hole 1314. The lens assembly 133 may include a lens bracket 1331, a first lens 1332 and a second lens 1333. The first lens 1332 and the second lens 1333 may be mounted on the lens bracket 1331. The lens bracket 1331 may define a first through hole 1334, a second through hole 1335 and a third through hole 1336. The first through hole 1334 may be defined in the middle of the lens bracket 1331. The second through hole 1335 and the third through hole 1336 may be respectively defined on either side of the first through hole 1334. This first lens 1332 may be plugged into the first through hole 1334 from the rear and fixed in the first through hole 1334. The second lens 1333 may include two lens parts 1338. One of the two lens parts 1338 may correspond to the second through hole 1335, the other one of the two lens parts 1338 may correspond to the third through hole 1336. The second lens 1333 may define a through hole 1339 between the two lens parts 1338. The second lens 1333 may be bonded to a front surface of the lens bracket 1331 by a bonding member 134. An annular flange 1337 may be provided on the front surface of the lens bracket 1331. The annular flange 1337 may surround the first through hole 1334, the second through hole 1335 and the third through hole 1336. The protruding length of the annular flange 1337 may be equal to a thickness of the second lens 1333, such that the second lens 1333 may be received in a space defined by the annular flange 1337. The lens bracket 1331 may be bonded to a rear surface of the connection portion 1313 through a bonding member 135. The annular flange 1337 may be plugged into the through hole 1314. The bonding member 134 and the bonding member 135 may be double-sided adhesives, etc.

In the assembled lens assembly 133, the first lens 1332 may be plugged in the first through hole 1334 and opposite to the through hole 1339. One of the two lens parts 1338 may be opposite to the second through hole 1335, the other one of the two lens parts 1338 may be opposite to the third through hole 1336.

The Rear Cover 14 of the First Housing Assembly 10

Figure 20:
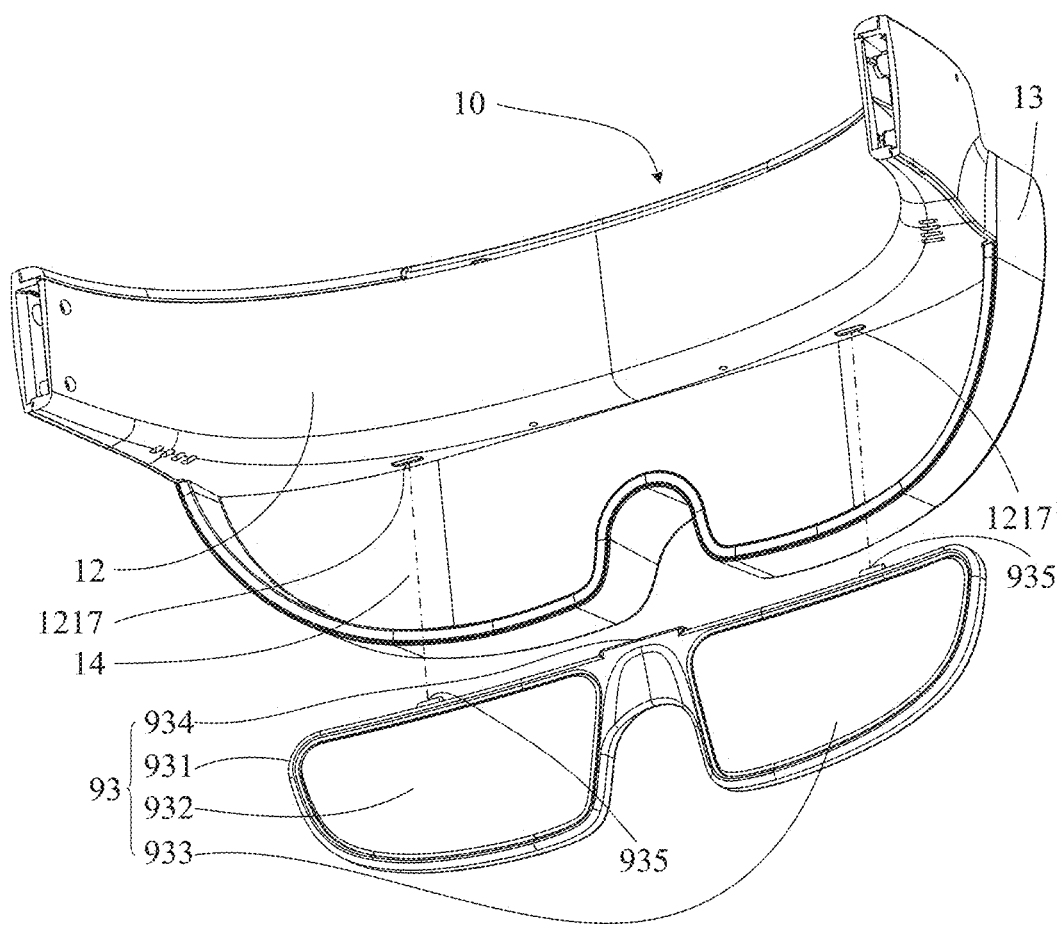
FIG. 20 is an exploded perspective view of the first housing assembly and a vision regulating glass of the head-mounted device according to an embodiment of the present disclosure.

As shown in FIG. 12, the rear cover 14 may be transparent. The rear cover 14 may include a light-transmitting portion 141 and a mounting portion 142. The light-transmitting portion 141 may be optically set to be light-transmitting, so that light emitted from the optical-mechanical assembly 60 may transmit through the light-transmitting portion 141 and be incident on the eyes of the user. The light-transmitting portion 141 may be arranged to be substantially parallel with the mask portion 131 of the mask 13. The mounting portion 142 may extend rearward from edges of the light-transmitting portion 141 other than the upper edge. That is, the mounting portion 142 may extend toward a direction away from the mask 13. A flange 1421 may be formed on an edge of the mounting portion 142 away from the light-transmitting portion 141. The flange 1421 may protrude outward from the edge of the mounting portion 142. As shown in FIG. 5, the rear cover 14 may mate with and be assembled to the lower part of the mask 13, and may be accordingly located below the bottom plate 121. The rear cover 14 may approach toward the mask 13, so that the light-transmitting portion 141 and the mounting portion 142 may be inserted into the lower part of the mask 13, until the flange 1421 abuts against an end face of the mounting portion 132 of the mask 13 (as shown in FIG. 20). Adhesive agent may also be coated on a part of the rear cover 14 that contacts with the mask 13 and the primary rear shell 12, to enhance the connection. The waveguide sheet 63 (as shown in FIG. 14) of the optical-mechanical assembly 60 may usually include glass material, which is fragile. Thus the waveguide sheet 63 may be protected from the outside by the mask 13 and from the inside by the rear cover 14. In this way, the waveguide sheet 63 may be safer and prevented from hurting the user's eyes by accidental break of the glass material. In addition, the rear cover 14 may be fully transparent, have a higher light-transmissible capacity than normal transparent materials. In this way, the user can clearly see a picture displayed by the waveguide sheet 63 when wearing the head-mounted device 100.

The Primary Shell Ornament 15 of the First Housing Assembly 10

As shown in FIG. 13, the primary shell ornament 15 may as a whole be crescent-shaped. The primary shell ornament 15 may include a top surface 151. The top surface 151 may be arranged to be streamlined or smooth etc., to increase the aesthetic appearance of the product. The primary shell ornament 15 may be arranged on the top plate 111 to cover the top plate 111. That is, the primary shell ornament 15 covers a top part of the primary front shell 11. Therefore, the primary shell ornament 15 may also be referred to as a cover plate. The cover plate 15 may include two opposite sides with arch shape. The arc shape of one side of the two opposite sides may be the same as the arc shape of the inner side 1111 of the top plate 111. The arc shape of the other side of the two opposite sides may be the same as the arc shape of the outer side 1112 of the top plate 111. As shown in FIG. 5, one or more key holes 152 may be defined on either side of the primary shell ornament 15. The number of the key holes 152 may be the same as the number of the side keys 16. For example, two key holes 152 may be defined on a front-left side of the primary shell ornament 15, two key holes 152 may be defined on a front-right side of the primary shell ornament 15. These key holes 152 may be defined corresponding to the accommodating sections 1113 defined on the top plate 111 of the primary front shell 11. A key hole 152 may be defined above and correspond to an accommodating section 1113. Each of the four side keys 16 may be respectively arranged above an accommodating section 1113 of the top plate 111, pass through a key hole 152 of the primary shell ornament 15 and at least partly protrude from the primary shell ornament 15. In this way, the user may press the side keys 16, and adjust various parameters of the head-mounted device 100. Since each of the four side keys 16 may be generally located at a position on the front-left or front-right side of the first housing assembly 10, the user may be facilitated to operate and use the side keys 16. A recess 154 may be further defined in the middle of the inner side 153 of the primary shell ornament 15. One or more posts 156 may protrude downward from the lower surface 155 of the primary shell ornament 15. A threaded hole may be defined in one of the posts 156. As illustrated above, the primary shell ornament 15 may be arranged in a space defined by the top plate 111 of the primary front shell 11 and the convex ridge portion 1125. One of the posts 156 of the primary shell ornament 15 may be received in one of the through holes 1114 of the top plate 111, to fix the primary shell ornament 15 to the top plate 111 of the primary front shell 11.

As shown in FIGS. 4 and 5, when the first housing assembly 10 is assembled, by an engagement between the snap structures 1124 of the primary front shell 11 and the snap structures 1214 of the primary rear shell 12 and an engagement between the snap structures 1116 of the primary front shell 11 and the snap structures 1223 of the primary rear shell 12, the primary front shell 11 and the primary rear shell 12 may be assembled together. The mask 13 may cover the primary front shell 11 and be arranged at the front of the primary front shell 11 by the engagement between the snap structures 1321 and the snap structures 1141. The rear cover 14 may approach toward the mask 13 and be plugged into the lower part of the mask 13. Next, the primary shell ornament 15 may be installed to cover the top part of the primary front shell 11.

The Optical-Machine Assembly 60

As shown in FIG. 14, a perspective view of the optical-machine assembly 60 of the head-mounted device 100 according to an embodiment of the present disclosure is illustrated. The optical-machine assembly 60 may include an optical-machine support 61, an optical-machine 62 and a waveguide sheet 63.

The optical-machine support 61 may include a top plate 611, a side plate 612 and two legs 613. The side plate 612 may extend from one side of the top plate 611. Each of the two legs 613 may extend from the top plate 611 and be positioned at either side of the top plate 611 and the side plate 612.

The top plate 611 may be arranged horizontally. It should be noted that, the top plate 611 is not necessary a continuous and leveling flat plate. Recesses may be defined at one or more positions of the top plate 611, so that a structure weight may be reduced while satisfying a supporting strength requirement. One or more through holes 6111 may be defined on the top plate 611. The one or more through holes 1114 may be configured for the mounting of other components. Thread may be arranged on the wall of one of these through holes 6111, or thread may not be arranged on the wall of one of these through holes 6111. One or more long strip-shaped through holes 6112 may be defined at a position at the front part of the top plate 611. FPCs may pass through the one or more long strip-shaped through holes 6112. The side plate 612 may extend downward from a front edge of the top plate 611. One of the two legs 613 may be arranged at the left side of the top plate 611. The other one of the two legs 613 may be arranged at the right side of the top plate 611. The two legs 613 may extend downward from the top plate 611. A through hole 6121 and a through hole 6122 may be defined in the middle of the side plate 612. A through hole 6125 may be defined at one side of a middle position of the side plate 612. A through hole 6126 may be defined at the other side of the middle position of the side plate 612. These through holes 6121, 6122, 6125 and 6126 may be configured to receive the camera assembly 70. The through hole 6121 may be adjacent to the through hole 6122. A distance between the through hole 6121 and the through hole 6126 may be equal to a distance between the through hole 6122 and the through hole 6125. The through hole 6121 and the through hole 6122 may overall correspond to the through hole 1131. The through hole 1131 may be defined in the center of the second portion 113 of the primary front shell 11. The through hole 6125 may correspond to one of the two through holes 1132. The through hole 6126 may correspond to the other one of the two through holes 1132. The two through holes 1132 may be defined in the second portion 113 of the primary front shell 11. External light that is to be received by the camera assembly may pass through these through holes 1131 and 1132. A through hole 6131 may be defined at the lower end of each leg 613.

The number of the optical-machines 62 may be two. The number of the waveguide sheets 63 may also be two. The two optical-machines 62 and the two waveguide sheets 63 may be arranged on a connector 64. In other words, the connector 64 may be configured to retain or fix the optical-machines 62 and the waveguide sheets 63. One or more through holes 641 may be defined in the connector 64. Thread may be arranged on the wall of one of these through holes 641, or thread may not be arranged on the wall of one of these through holes 641. Two optical-machines 62 may be arranged symmetrically in the accommodation cavity 17.

A liner 65 may further be provided underneath the connector 64. The liner 65 may be sleeved on the waveguide sheets 63. The liner 65 may abut against the lower surface of the connector 64. During an assembly process, the liner 65 may be sandwiched between the connector 64 and the bottom plate 121 of the primary rear shell 12. In this way, a rigid contact between the connector 64 and the primary rear shell 12 may be avoided by the liner 65, thus a protective effect may be achieved. The liner 65 may be made of flexible rubber, foam, and other compressible or elastic materials.

Figure 28:
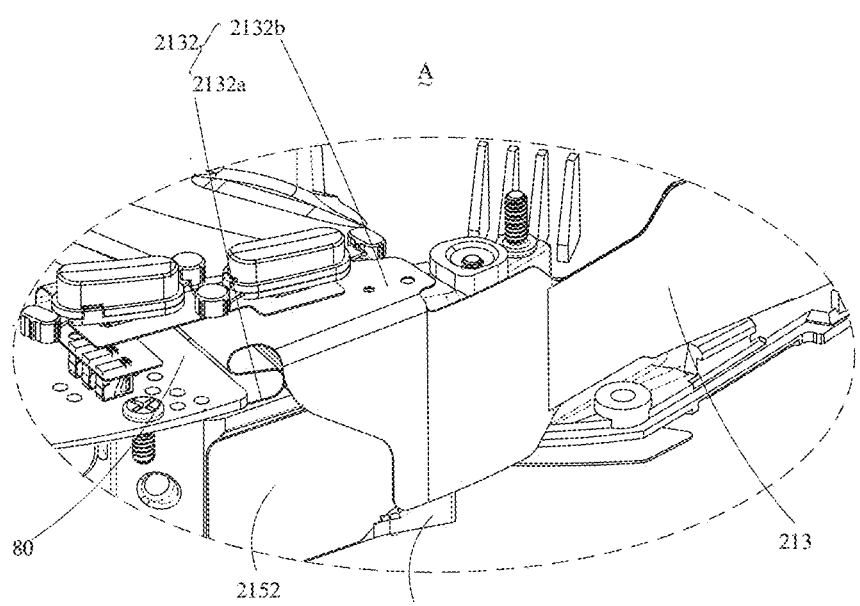
FIG. 28 is an enlarged perspective view of a portion A shown in FIG. 2.
Figure 29:
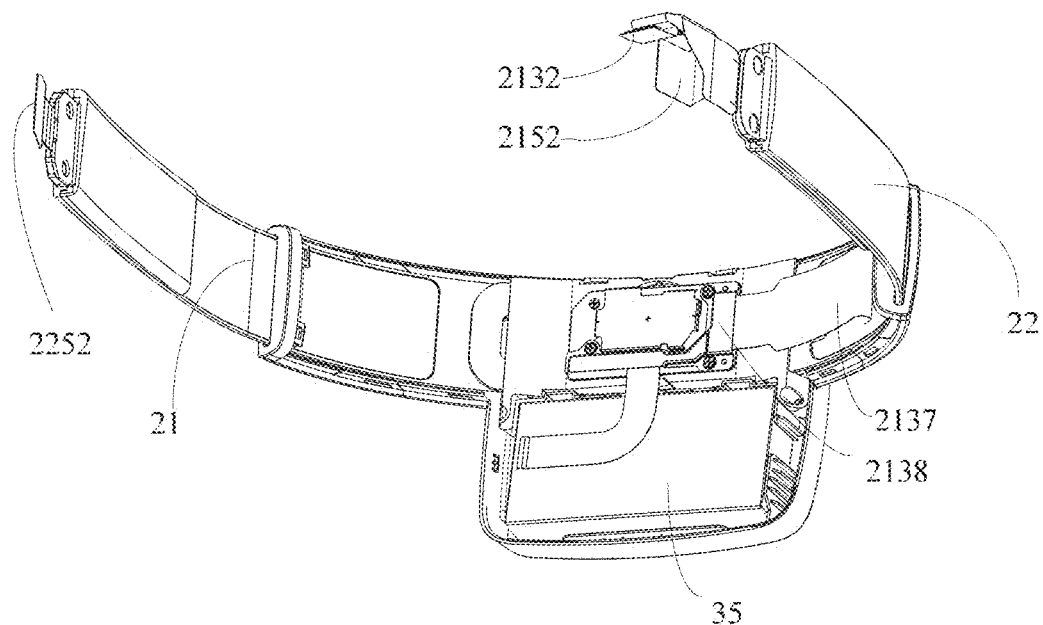
FIG. 29 is similar to FIG. 24, showing engagement between a power source FPC of the lacing assembly and related components of the second housing assembly.
Figure 33:
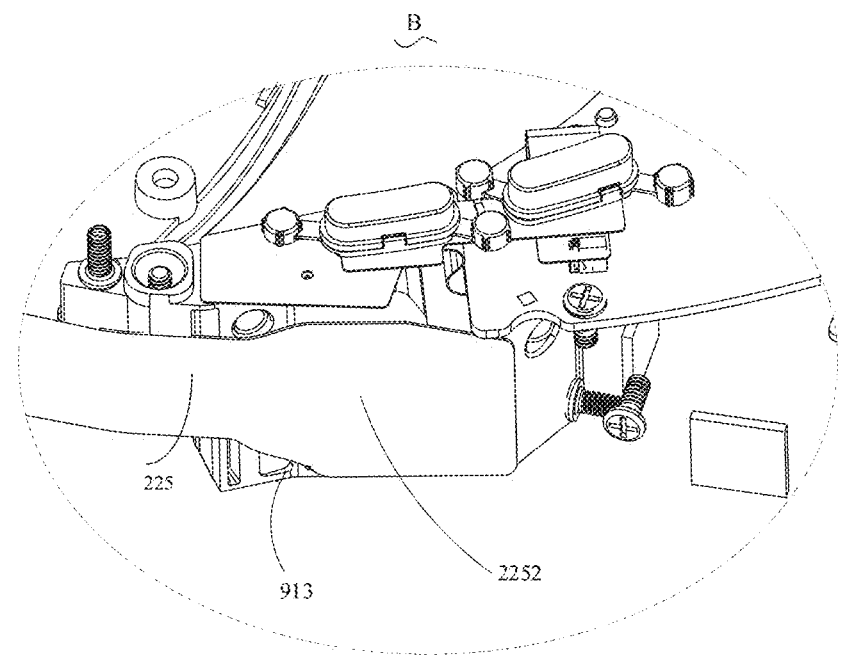
FIG. 33 is an enlarged perspective view of a portion B shown in FIG. 3.

Each optical-machine 62 may further be connected to a heat dissipation sheet 621 within the accommodation cavity 17. In this way, one or more heat sources 622 of the optical-machine 62 may be thermal-conductively connected the heat dissipation sheet 621, and heat of the one or more heat sources 622 may be dissipated. The one or more heat sources 622 may for example be LED lamps. In some embodiments, the heat dissipation sheet 621 may include a first heat dissipation portion 6211, a second heat dissipation portion 6212 and a third heat dissipation portion 6213. The first heat dissipation portion 6211 and the second heat dissipation portion 6212 may be connected together. A top surface of the first heat dissipation portion 6211 and a top surface of the second heat dissipation portion 6212 may be co-plane. The third heat dissipation portion 6213 may extend laterally from a connection of the first heat dissipation portion 6211 with the second heat dissipation portion 6212. For example, the third heat dissipation portion 6213 may extend perpendicularly from the connection of the first heat dissipation portion 6211 with the second heat dissipation portion 6212. The second heat dissipation portion 6212 may be connected to a heat source 622 for heat dissipation. The third heat dissipation portion 6213 may be connected to another heat source 622 for heat dissipation. The first heat dissipation portion 6211, the second heat dissipation portion 6212 and the third heat dissipation portion 6213 of the heat dissipation sheet 621 may be provided separately from each other. In some embodiments, the first heat dissipation portion 6211, the second heat dissipation portion 6212 and the third heat dissipation portion 6213 of the heat dissipation sheet 621 may be provided in a one-piece structure to facilitate assembly. In addition, the heat dissipation sheet 621 may further extend into internal spaces of the optical-mechanical assembly 60 and/or the first housing assembly 10. The heat dissipation sheet 621 may contact with other heat radiating members and provide heat dissipation for more heat radiating members simultaneously. For example, the first heat dissipation portion 6211 of the heat dissipation sheet 621 may extend rearward to be thermal-conductively connected to the power supply FPC 213 of the lacing assembly 20 (as shown in FIG. 28) or the second heat dissipation sheet 225 (as shown in FIG. 33). At least one of the heat dissipation sheet 621 and the second heat dissipation sheet 225 may include a graphite sheet.

Each optical-machine 62 may be a projecting apparatus. The optical-machine 62 may provide light to the waveguide sheet 63. The light may carry information and/or images for providing enhanced user observation of the physical world. The light from the optical-machine 62 may be coupled to the waveguide sheet 63. A total internal reflection of the light may occur in the waveguide sheet 63, then the light may be coupled out from the waveguide sheet 63, making the light visible to the user.

During an assembling process, a screw may be received in the through hole 6111 of the top plate 611 and the through hole 641 of the connector 64, thus the optical-machine support 61, the optical-machine 62 and the waveguide sheet 63 may be fixed together. It should be noted that, in the assembled optical-mechanical assembly 60, a receiving space may be defined between the connector 64 and the side plate 612 of the optical-machine support 61, for receiving a part of the camera assembly 70.

Figure 15:
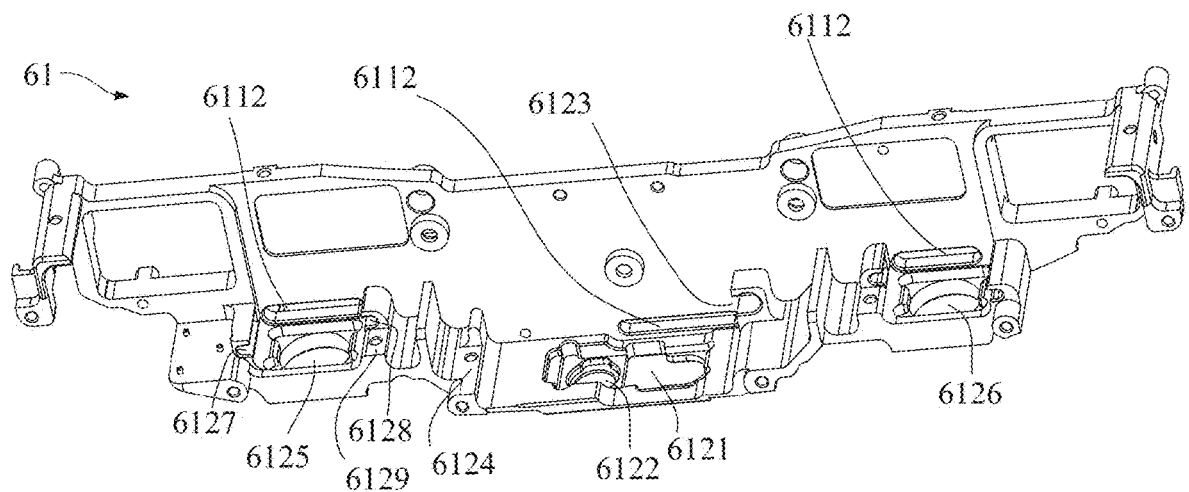
FIG. 15 is a perspective view of an optical-machine support of the optical-mechanical assembly shown in FIG. 14.

As shown in FIG. 15, a perspective view of the optical-machine support 61 of the optical-mechanical assembly 60 in FIG. 14 from another view angle is shown. As shown in FIG. 15, a slot 6123 may be defined on a rear side surface of the side plate 612, on one side of the middle position where the through holes 6121 and 6122 are defined. The abutting portion 6124 may be provided on the rear side surface of the side plate 612, on the other side of the middle position where the through holes 6121 and 6122 are defined. The location of the slot 6123 may be higher than the location of the abutting portion 6124. The abutting portion 6124 may include a flat surface. A threaded hole may be defined in the abutting portion 6124. A slot 6127, a slot 6128 and an abutting portion 6129 may be defined or provided on the rear side surface of the side plate 612. The slot 6127 may be defined on one side of a position where the through hole 6125 is defined. The slot 6128 and the abutting portion 6129 may be defined or provided on the other side of the position where the through hole 6125 is defined. The slot 6128 and the abutting portion 6129 may be immediately adjacent to each other. A top end of the slot 6127 and a top end of the slot 6128 may be flush with each other. A length of the slot 6127 extending downward may be greater than a length of the slot 6128 extending downward. The abutting portion 6129 may include a flat surface. A threaded hole may be defined in the abutting portion 6129. The location of the slot 6128 may be higher than the location of the abutting portion 6129. Slots that are identical or similar to the slot 6127 and the slot 6128, and abutting portions that are identical or similar to the abutting portion 6129 may be defined or arranged on the rear side surface of the side plate 612, on a position where the through hole 6126 is defined, which will be not be detailed here.

The Camera Assembly 70

Figure 16:
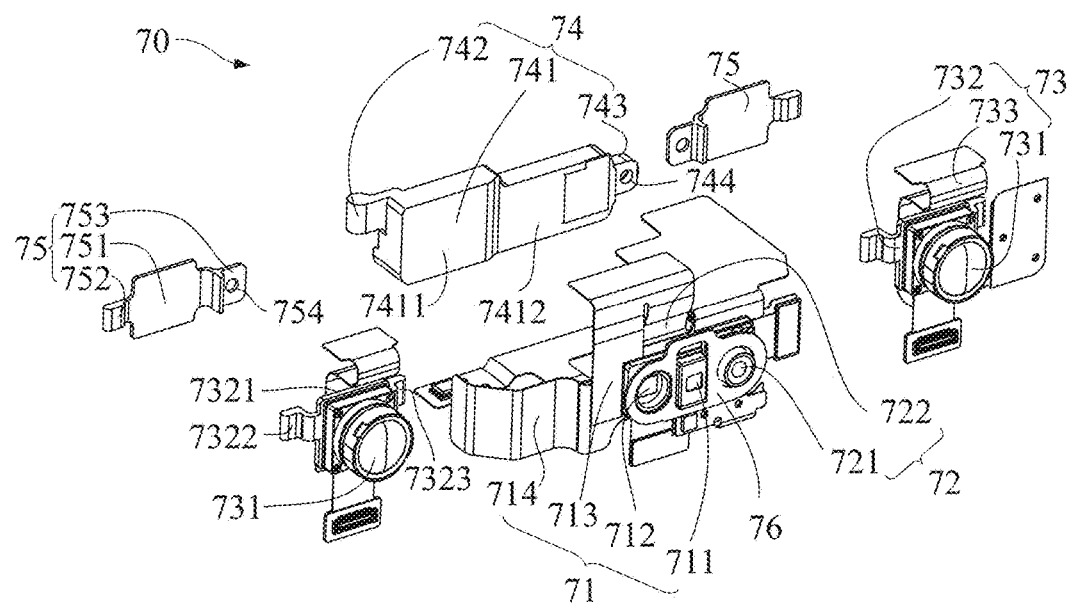
FIG. 16 is an exploded perspective view of a camera assembly of the head-mounted device according to an embodiment of the present disclosure.

As shown in FIG. 16, the camera assembly 70 of the head-mounted device 100 according to one embodiment of the present disclosure is shown. The camera assembly 70 may be mounted to the optical-machine support 61 of the optical-mechanical assembly 60. The camera assembly 70 may include a TOF (Time of flight, TOF for short) camera 71, an RGB camera 72, two fisheye cameras 73, a first camera stand 74 and two second camera stands 75. The first camera stand 74 may be configured to fix the TOF camera 71 and the RGB camera 72. Each of the two second camera stands 75 may be configured to fix one of the two fisheye cameras 73.

The TOF camera 71 may include a light emitting module 711, a light-sensitive receiving module 712, an FPC 713 and a heat dissipation sheet 714. The light emitting module 711 and the light-sensitive receiving module 712 may all be connected to the FPC 713. The light emitting module 711 may include a front end portion. The front end portion may also be regarded as a front end portion of the TOF camera 71. The heat dissipation sheet 714 may be connected to the FPC 713 for heat dissipation. For example, the heat dissipation sheet 714 may be attached to a rear surface of the FPC 713 for heat dissipation. The heat dissipation sheet 714 may include a rear side surface. The rear side surface of the heat dissipation sheet 714 may also be regarded as a rear side surface of the TOF camera 71. When the TOF camera 71 works, the light emitting module 711 may be configured to emit a modulated light beam. The light beam may be reflected by a target object and then be received by the light-sensitive receiving module 712. The light-sensitive receiving module 712 may demodulate the light beam received and obtain a flight time of the light beam in the space, then a distance corresponding to the target object may be calculated. In this way, with the TOF camera 71, when the user wears the head-mounted device 100 and walks around an environment of, for example, a room for a turn, a shape and model of the room may be modeled out. That is, by measuring a distance from each point to the head-mounted device 100 worn by the user, the shape and model of the room in which the user is located can be determined, and the scene can be constructed out.

The RGB camera 72 may be configured to capture two-dimensional color images, obtain chromatic aberration of images captured etc. The RGB camera 72 may be connected to the TOF camera 71 and fixed by the first camera stand 74. The RGB camera 72 may include a camera body 721 and an FPC 722. The camera body 721 may include a front end portion. The front end portion may also be regarded as a front end portion of the RGB camera 72. The camera body 721 may be connected to the FPC 722. A top end of the FPC 722 and a top end of the FPC 713 may be connected together. The heat dissipation sheet 714 may also be connected to the FPC 722 for heat dissipation. For example, the heat dissipation sheet 714 may be attached to the rear surface of the FPC 722 for heat dissipation. The rear side surface of the heat dissipation sheet 714 may also be regarded as the rear side surface of the RGB camera 72.

A liner 76 may further be sleeved on the front end portion of the TOF camera 71 and the front end portion of the RGB camera 72. During an assembly process, the linear 76 may be sandwiched between the TOF camera 71 and the side plate 612 of the optical-machine support 61 and between the RGB camera 72 and the side plate 612 of the optical-machine support 61. In this way, a rigid contact between the TOF camera 71 and the optical-machine support 61 and a rigid contact between the RGB camera 72 and the optical-machine support 61 may be avoided by the linear 76. Thus a protective effect may be achieved. The liner 76 may be made of flexible rubber, foam, and other compressible or elastic materials.

Each fisheye camera 73 may include a camera body 731, a camera mounting plate 732 and an FPC 733. The camera body 731 may include a front end portion. The front end portion may also be regarded as a front end portion of the fisheye camera 73. The camera body 731 may be connected to the FPC 733. The camera body 731 may be mounted to the camera mounting plate 732. The FPC 733 may include a rear side surface. The camera mounting plate 732 may also include a rear side surface. The FPC 733 or the camera mounting plate 732 may be arranged to be adjacent to the second camera stand 75, then the corresponding rear side surface of the FPC 733 or the camera mounting plate 732 may be regarded as the rear side surface of the fisheye camera 73. The camera mounting plate 732 may include a body portion 7321, a first insertion portion 7322 and a second insertion portion 7323. The body portion 7321 may be configured to bear the camera body 731. For example, the camera body 731 may be fixed to the body portion 7321 by an adhesive-dispensing process or screws. The first insertion portion 7322 may be arranged at one side of the body portion 7321. The second insertion portion 7323 may be arranged at the other side of the body portion 7321. With respect to the up-down direction, each of the first insertion portion 7322 and the second insertion portion 7323 may be located at a middle top position of the body portion 7321. In other words, a connection between the first insertion portion 7322 and the body portion 7321 may be located at a position adjacent to a top part of the body portion 7321, a connection between the second insertion portion 7323 and the body portion 7321 may be located at a position adjacent to the top part of the body portion 7321. A semi-cylindrical portion may be provided on a side of the first insertion portion 7322. A semi-cylindrical portion may also be provided on a side of the second insertion portion 7323.

In some embodiments, the TOF camera 71 and the RGB camera 72 may be arranged adjacent to each other. External light may be received by the TOF camera 71 and the RGB camera 72 through the first through hole 1131. One of the two fisheye cameras 73 may be located at one side of the TOF camera 71 and the RGB camera 72. The other one of the two fisheye cameras 73 may be located at the other side of the TOF camera 71 and the RGB camera 72. The two fisheye cameras 73 may mainly be configured to assist the imaging. Of course, the location arrangement of these cameras are not limited hereto and can be adjusted as per actual needs. In addition, the types of cameras are not limited hereto. Different types of cameras may be selected as per actual needs.

Different imaging principles and effects may correspond to different cameras and different location arrangements. For example, the four cameras—the TOF camera 71, the RGB camera 72 and the two fisheye cameras 73—may be complementary to each other. The fisheye cameras 73 may have greater shooting angles. The fisheye cameras 73 may be wide-angle cameras. Resolution of the fisheye cameras 73 may be relatively low. The RGB camera 72 may have a relatively high resolution, but a relatively low shooting angle. By combining the RGB camera 72 and the fisheye cameras 73, an image that has a larger shooting angle and that is clearer may be obtained.

The first camera stand 74 may be located behind the TOF camera 71 and the RGB camera 72, to mount both the TOF camera 71 and the RGB camera 72 to the optical-machine support 61 of the optical-mechanical assembly 60. The first camera stand 74 may include a middle portion 741, an insertion portion 742 and a fixing portion 743. The middle portion 741 may include a pressing surface facing the TOF camera 71 and the RGB camera 72. The pressing surface may include two flat surfaces, i.e., a first flat surface 7411 and a second flat surface 7412. The insertion portion 742 and the fixing portion 743 may be located at either side of the middle portion 741 respectively. With respect to the up-down direction, the insertion portion 742 may be located at a location with a first height on one side of the middle portion 741, the fixing portion 743 may be located at a location with a second height on the other side of the middle portion 741. The first height and the second height may be different. For example, the location of the insertion portion 742 may be higher than the location of the fixing portion 743. A semi-cylindrical portion may be provided at one side of the insertion portion 742, such that the insertion portion 742 may be facilitated to rotate within the slot 6123. A through hole 744 may be defined in the fixing portion 743.

Two second camera stands 75 may be arranged symmetrically. One of the two second camera stands 75 may be located behind one of the two fisheye cameras 73. The other one of the two second camera stands 75 may be located behind the other one of the two fisheye cameras 73. Each of the second camera stands 75 may include a middle portion 751, an insertion portion 752 and a fixing portion 753. The middle portion 751 may be connected between the insertion portion 752 and the fixing portion 753. The middle portion 751 may be provided to be away from the corresponding fisheye camera 73 than the insertion portion 752 and the fixing portion 753. The insertion portion 752 and the fixing portion 753 may be located at either side of the middle portion 751 respectively. With respect to the up-down direction, the insertion portion 752 may be located at a location with a first height on one side of the middle portion 751, the fixing portion 753 may be located at a location with a second height on the other side of the middle portion 751. The first height and the second height may be identical or different. For example, the insertion portion 752 may be at a middle position or a middle bottom position of one side of the middle portion 751. In other words, a connection between the insertion portion 752 and the middle portion 751 may be positioned between a top part and a bottom part of the middle portion 751, or be adjacent to the bottom part of the middle portion 751. The fixing portion 753 may be at a middle position of the other side of the middle portion 751. A semi-cylindrical portion may be provided at one side of the insertion portion 752, such that the insertion portion 752 may be facilitated to rotate within the slot 6127. A through hole 754 may be defined in the fixing portion 753.

Figure 17:
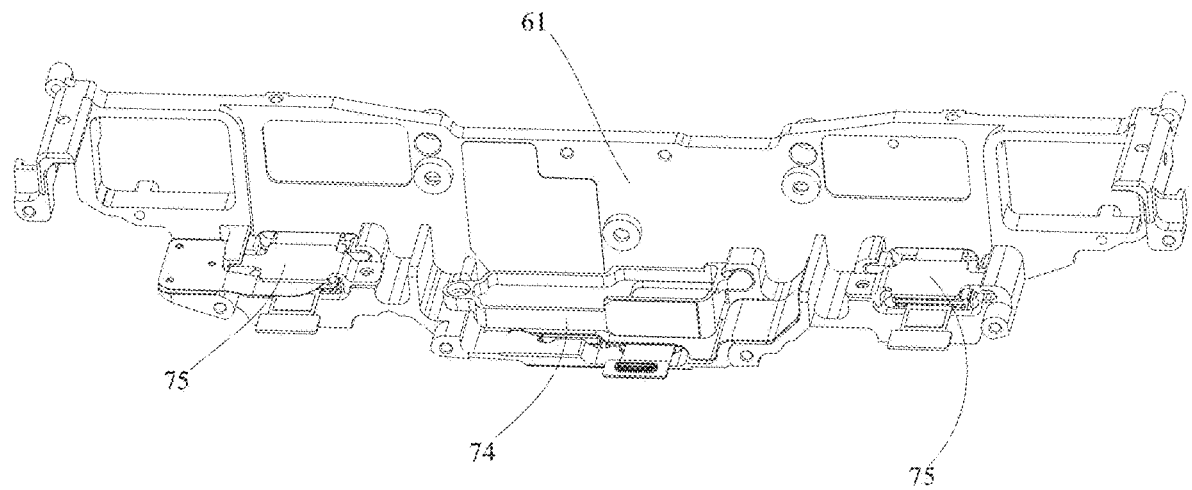
FIG. 17 is a perspective view of the camera assembly and the optical-machine support of the head-mounted device according to an embodiment of the present disclosure.

As shown in FIGS. 15, 16 and 17, during a process of assembling the TOF camera 71 and the RGB camera 72 to the optical-mechanical assembly 60, the TOF camera 71 and the RGB camera 72 may be fixed to the optical-machine support 61 of the optical-mechanical assembly 60 through the first camera stand 74. Specifically, at first, the TOF camera 71 and the RGB camera 72 may be inserted into the through holes 6121 and 6122 of the optical-machine support 61 from the rear of the optical-machine support 61. The insertion portion 742 may then be inserted into the slot 6123 of the optical-machine support 61, and the fixing portion 743 may abut against the abutting portion 6124. Next, a screw may be used to pass through the through hole 744 of the fixing portion 743, and then be screwed into the threaded hole of the abutting portion 6124 of the optical-machine support 61. In this way, the TOF camera 71 and the RGB camera 72 may be mounted to the optical-machine support 61. Further, the middle portion 741 may be pressed on the rear side surfaces of the TOF camera 71 and the RGB camera 72. In an assembled state when the camera assembly 70 and the optical-mechanical assembly 60 are in the first housing assembly 10, the front end portion of the light-sensitive receiving module 712 of the TOF camera 71 may be received in the through hole 6121 of the optical-machine support 61. The front end portion of the light-sensitive receiving module 712 may further correspond to the through hole 1131 of the second portion 113 of the primary front shell 11. The front end portion of the light-sensitive receiving module 712 may further correspond to one lens part 1338 of the second lens 1333 of the lens assembly 133. The front end portion of the light emitting module 711 of the TOF camera 71 may be received in the through hole 6121 of the optical-machine support 61. The front end portion of the light emitting module 711 may further correspond to the through hole 1131 of the second portion 113 of the primary front shell 11. The front end portion of the light emitting module 711 may further correspond to the first lens 1332 of the lens assembly 133. The front end portion of the RGB camera 72 may be received in the through hole 6122 of the optical-machine support 61. The front end portion of the RGB camera 72 may further correspond to the through hole 1131 of the second portion 113 of the primary front shell 11. The front end portion of the RGB camera 72 may further correspond to the other lens part 1338 of the second lens 1333 of the lens assembly 133.

When assembling the fisheye cameras 73 to the optical-mechanical assembly 60, each of the two fisheye cameras 73 may be fixed to the side plate 612 of the optical-machine support 61 of the optical-mechanical assembly 60 through one of the two second camera stands 75. Specifically, the camera body 731 of each fisheye camera 73 may be inserted into the through hole 6125 or 6126 of the optical-machine support 61 from the rear of the optical-machine support 61. The first insertion portion 7322 of the camera mounting plate 732 may then be inserted into the slot 6127 of the optical-machine support 61, at the same time, the second insertion portion 7323 of the camera mounting plate 732 may be inserted into the slot 6128 of the optical-machine support 61. The camera body 731 and the camera mounting plate 732 may then be fixed or secured together by screws. Next, the insertion portion 752 of the second camera stand 75 may be inserted into the slot 6127 of the optical-machine support 61. A screw may be used to pass through the through hole 754 of the fixing portion 753, and then be screwed into the threaded hole of the abutting portion 6129 of the optical-machine support 61. In this way, the fisheye cameras 73 may be mounted to the optical-machine support 61, and the middle portion 751 may be pressed onto the rear side surface of the corresponding fisheye camera 73. The insertion portion 752 of the second camera stand 75 and the first insertion portion 7322 of the camera mounting plate 732 may abut against and contact with each other in the slot 6127.

By fixing the TOF camera 71, the RGB camera 72 and the fisheye cameras 73 through the above-mentioned structures, some fixing screws may be avoided, and the assembling efficiency may be enhanced.

Since the TOF camera 71, the RGB camera 72 and the fisheye cameras 73 are all assembled in the optical-machine support 61, the optical-machine support 61 may also be referred as a mounting base.

In an assembled state when the camera assembly 70 and the optical-mechanical assembly 60 are in the first housing assembly 10, the front end portion of one fisheye camera 73 may be received in the through hole 6125 of the optical-machine support 61, and correspond to one through hole 1132 of the second portion 113 of the primary front shell 11, to receive the external light. The front end portion of another fisheye camera 73 may be received in the through hole 6126 of the optical-machine support 61, and correspond to another through hole 1132 of the second portion 113 of the primary front shell 11, to receive the external light.

In addition, the FPC 722 and the FPC 713 may be connected together to form a top end. The top end may pass through a long strip-shaped through hole 6112 of the top plate 611, and be exposed on top of the top plate 611. Similarly, the FPC 733 of one of the two fisheye cameras 73 may pass through the long strip-shaped through hole 6112 at one side of the top plate 611 and be exposed on top of the top plate 611, the FPC 733 of the other one of the two fisheye cameras 73 may pass through the long strip-shaped through hole 6112 at the other side of the top plate 611 and be exposed on top of the top plate 611.

The Motherboard 80, the Speaker Assembly 91 and the Microphone Assembly 92

Figure 19:
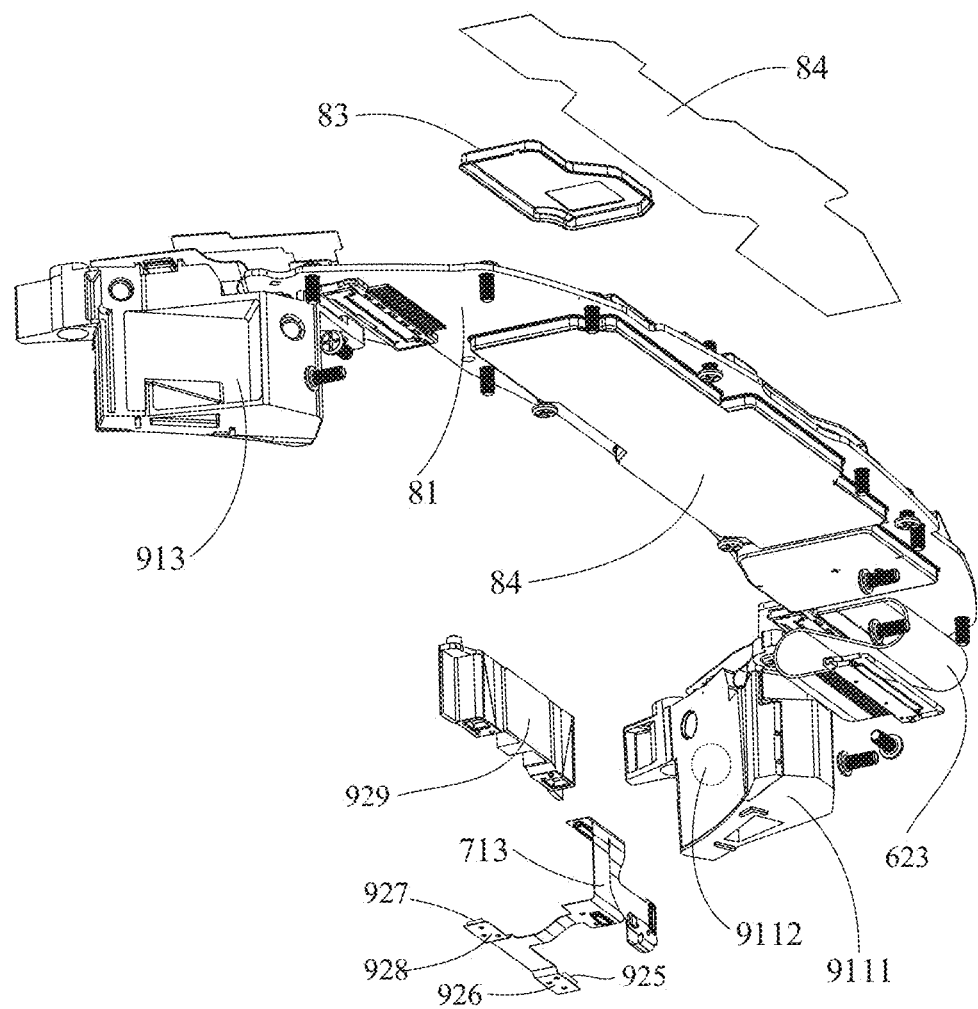
FIG. 19 is an exploded perspective view of the motherboard, the speaker assembly and the microphone assembly shown in FIG. 18 from another view angle.

As shown in FIGS. 18 and 19, perspective exploded views of the motherboard 80, the speaker assembly 91 and the microphone assembly 92 of the head-mounted device 100 according to an embodiment of the present disclosure are illustrated.

The motherboard 80 may be mounted on the optical-mechanical assembly 60. The motherboard 80 may include a PCB (Printed Circuit Board, collectively referred to herein as PCB) and one or more chips 82, one or more protective covers 83 or one or more heat dissipation sheets 84. The one or more chips 82, the one or more protective covers 83 or the one or more heat dissipation sheets 84 may be arranged on the PCB 81.

The PCB 81 may be a substrate with printed cables. The PCB 81 may be configured as a carrier for electrical connection of electronic components. These chips 82 may be mounted on the PCB 81. One or more protective covers 83 may cover some chips 82 to protect them. A heat dissipation sheet 84 may be provided on an outer surface of a protective cover 83 for heat dissipation. The heat dissipation sheet 84 may be graphite heat dissipation sheet.

One key FPC or button FPC 162 may be connected to a left side of the PCB 81. Another key FPC 162 may be connected to a right side of the PCB 81. Each key FPC 162 may include a connection segment 1621, a key segment 1622 and a bending segment 1623. The bending segment 1623 may be arranged between the connection segment 1621 and the key segment 1622. The connection segment 1621 may be configured to connect with the PCB 81. When the motherboard 80 has been assembled in the first housing assembly 10, each key FPC 162 may be folded upward, and the key segment 1622 may be arranged in the accommodating section 1113 of the top plate 111 of the primary front shell 11, so that the key segment 1622 may be pressed by the post 161 below the side key 16.

A left side of the PCB 81 may also be connected to an optical-machine FPC 623. The optical-machine FPC 623 may be configured to connect the left side optical-machine 62 with the PCB 81. Similarly, a right side of the PCB 81 may be connected to an optical-machine FPC (not shown), so that the optical-machine 62 on the right side may be connected to the PCB 81.

As shown in FIG. 18, the speaker assembly 91 may include a first speaker 911 and a second speaker 913. The first speaker 911 may be located on the left side of the motherboard 80, the second speaker 913 may be located on the right side of the motherboard 80. In the assembled structure, the first speaker 911 may be connected to a left end of the PCB 81, and below the key FPC 162 on the left side, the second speaker 913 may be connected to a right end of the PCB 81, and below the key FPC 162 on the right side. The first speaker 911 may extend rearward from the left end of the PCB 81. The second speaker 913 may extend rearward from the left end of the PCB 81.

In some embodiments, the accommodation cavity 17 defined by the first housing assembly 10 may include a first cavity, a second cavity and a third cavity. The first cavity may be configured to house the motherboard 80. The second cavity may be located at a side of the first cavity, the third cavity may be located at another side of the first cavity opposite to the second cavity. The first speaker 911 may be arranged in the second cavity and be connected to an end of the motherboard 80. The second speaker 913 may be arranged in the third cavity and be connected to the other end of the motherboard 80.

The second speaker 913 may include a sound cavity box 9131 and a speaker body 9132 arranged in the sound cavity box 9131. A certain sound cavity may be defined in the sound cavity box 9131, so that the sound emitted by the speaker body 9132 may be echoed inside the sound cavity box 9131, and a better sound effect may be provided to the user. This first speaker 911 may have a same structure as the second speaker 913. That is, the first speaker 911 may include a sound cavity box 9111 and a speaker body 9112 arranged in the sound cavity box 9111 (as shown in FIG. 19). The first speaker 911 may be mounted at a rear end on the left side of the motherboard 80. The first speaker 911 may be connected to the motherboard 80 via wires or an FPC (not shown). Similarly, the second speaker 913 may be mounted at a rear end on the right side of the motherboard 80. The second speaker 913 may be connected to the motherboard 80 via wires or an FPC (not shown). It should be noted that, when the motherboard 80 and the speaker assembly 91 have been assembled in the first housing assembly 10, the first speaker 911 may be arranged in one of two corners of the first housing assembly 10, and the second speaker 913 may be arranged in the other one of the two corners of the first housing assembly 10. The first speaker 911 and the second speaker 913 may correspond to speaker sound output holes 1215 defined in the bottom plate 121 of the first housing assembly 10, so that sound emitted by the first speaker 911 and the second speaker 913 may be output. Each of the first speaker 911 and the second speaker 913 may for example be located at a position below a corresponding side key 16. For example, the first speaker 911 may correspond to at least a side key 16 along a direction perpendicular to the top plate 111, and the second speaker 913 may correspond to at least a side key 16 along a direction perpendicular to the top plate 111. Since the spaces in these two corners of the first housing assembly 10 is utilized, the structure may be more compact, and the sound effect may be improved.

In some embodiments, the microphone assembly 92 may include a first microphone 921, a second microphone 923, a third microphone 925 and a fourth microphone 927. The first microphone 921, the second microphone 923, the third microphone 925 and the fourth microphone 927 may all be arranged in the accommodation cavity 17.

The first microphone 921 may be connected to the PCB 81 through the power supply FPC 213 (as shown in FIG. 28), the second microphone 923 may be connected to the PCB 81 through the FPC 924. In some embodiments, the first microphone 921 may be connected to the PCB 81 by wires or a separate FPC. The first microphone 921 may be arranged at one side of the PCB 81, the second microphone 923 may be arranged at the other side of the PCB 81. For example, when the motherboard 80 has been assembled in the first housing assembly 10, the first microphone 921 may correspond to the exit 1162 of a channel 1160 defined at the front-left side of the first portion 112 of the primary front shell 11, so that the first microphone 921 may receive external sound via the channel 1160, the second microphone 923 may correspond to the exit 1162 of a channel 1160 defined at the front-right side of the first portion 112 of the primary front shell 11, so that the second microphone 923 may receive external sound via the channel 1160. The first microphone 921 may further be supported by the first speaker 911, or the first microphone 921 may be fixed on the first speaker 911. The second microphone 923 may further be supported by the second speaker 913, or the second microphone 923 may be fixed on the second speaker 913.

Each of the third microphone 925 and the fourth microphone 927 may be located at a position below the middle portion of the PCB 81. Each of the third microphone 925 and the fourth microphone 927 may correspond to the exit 1242 of one of the two channels 1240 in the bottom plate 121 of the primary rear shell 12 respectively, so that external sound may be received via a corresponding one of the two channels 1240. Since positions of the third microphone 925 and the fourth microphone 927 are lower than the PCB 81, a supporting member 929 may be provided between the third microphone 925 and the fourth microphone 927. That is, the supporting member 929 may support the third microphone 925 and the fourth microphone 927, and the supporting member 929 may be fixed to the PCB 81. The third microphone 925 may be connected to the PCB 81 through the FPC 926. The fourth microphone 927 may be connected to the PCB 81 through the FPC 928. In some embodiments, the FPC 926 and FPC 928 may be joined with the FPC 713 of the camera assembly 70 before being connected to the PCB 81. In some embodiments, the FPC 926 and the FPC 928 may be connected to the PCB 81 respectively, or the FPC 926 and the FPC 928 may be joined before being connected to the PCB 81.

By arranging the microphone assemblies 92 in this way, interferences between the microphone assemblies 92 may be reduced, and these microphone assemblies 92 may be oriented more differently.

The Vision Regulating Glass 93

As shown in FIG. 20, the mating and mounting relationship between the vision regulating glass 93 and the first housing assembly 10 of the head-mounted device 100 according to an embodiment of the present disclosure is illustrated. The vision regulating glass 93 may include a glass frame 931, a first eyelens 932, a second eyelens 933 and a second magnet 934. The first eyelens 932 may be a left eye eyelens, the second eyelens 933 may be a right eye eyelens 933. The first eyelens 932 and the second eyelens 933 may be mounted on the glass frame 931. The second magnet 934 may be mounted on a position on an upper side of the glass frame 931, the position may be a middle position of the glass frame 931. The second magnet 934 and the first magnet 1216 (as shown in FIG. 8) of the primary rear shell 12 may correspond to and attract with each other. One of two projections 935 may be provided on a left side of the second magnet 934 on the glass frame 931, the other one of the two projections 935 may be provided on a right side of the second magnet 934 on the glass frame 931. One of the two projections 935 may be configured to correspond to one of the two recesses 1217 (as shown in FIG. 9) in the primary rear shell 12, or may be configured to be received in one of the two recesses 1217. The other one of the two projections 935 may be configured to correspond to the other one of the two recesses 1217 in the primary rear shell 12, or may be configured to be received in the other one of the two recesses 1217.

The vision regulating glass 93 may be removable-mounted to the first housing assembly 10 and located between the user's eyes and the rear cover 14 when in use. Specifically, one of the two projections 935 of the vision regulating glass 93 may be received in one of the two recesses 1217 of the primary rear shell 12, the other one of the two projections 935 of the vision regulating glass 93 may be received in the other one of the two recesses 1217 of the primary rear shell 12. At the same time, the second magnet 934 on the glass frame 931 may approach the first magnet 1216 on the primary rear shell 12. The second magnet 934 and the first magnet 1216 may attract with each other. In this way, the vision regulating glass 93 may be connected to the first housing assembly 10.

The positioning of the vision regulating glass 93 may be achieved by the cooperation of the two recesses 1217 with the two projections 935. The fixation of the vision regulating glass 93 may then be achieved by the attraction of the second magnet 934 to the first magnet 1216. For example, the first eyelens 932 and the second eyelens 933 may be near vision lenses or distance vision lenses. A variety of vision adjustment glasses 93 with different degrees may be provided to meet the needs of users with different visions. This kind of structure may allow the removal of the vision regulating glass 93, thus the user may be facilitated to replace the vision regulating glass 93 according to his or her vision.

The Assembly of the Front Portion

Figure 21:
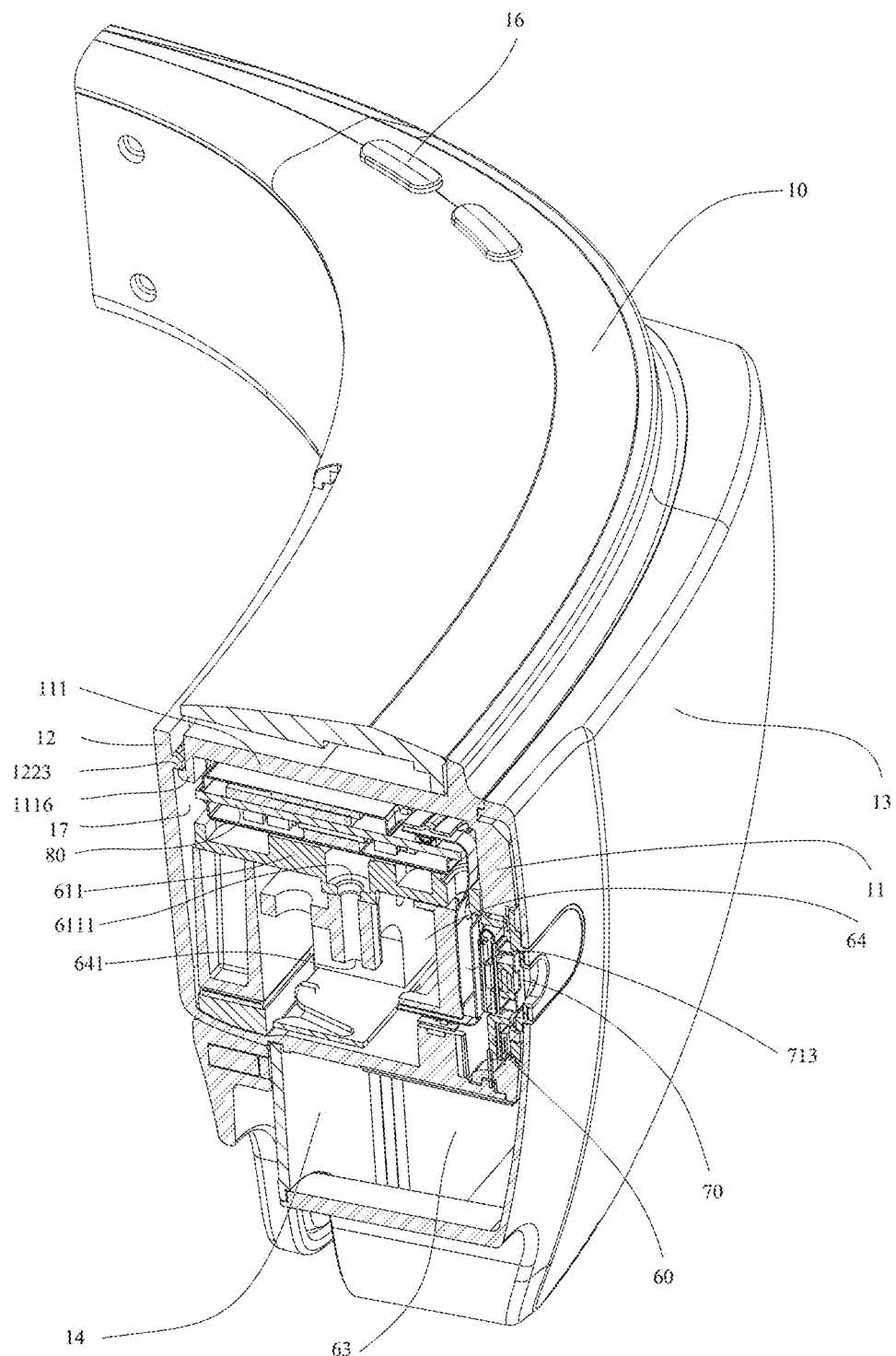
FIG. 21 is a sectional view of the first housing assembly, the optical-mechanical assembly, the camera assembly, the speaker and the motherboard of the head-mounted device shown in FIG. 1.
Figure 23:
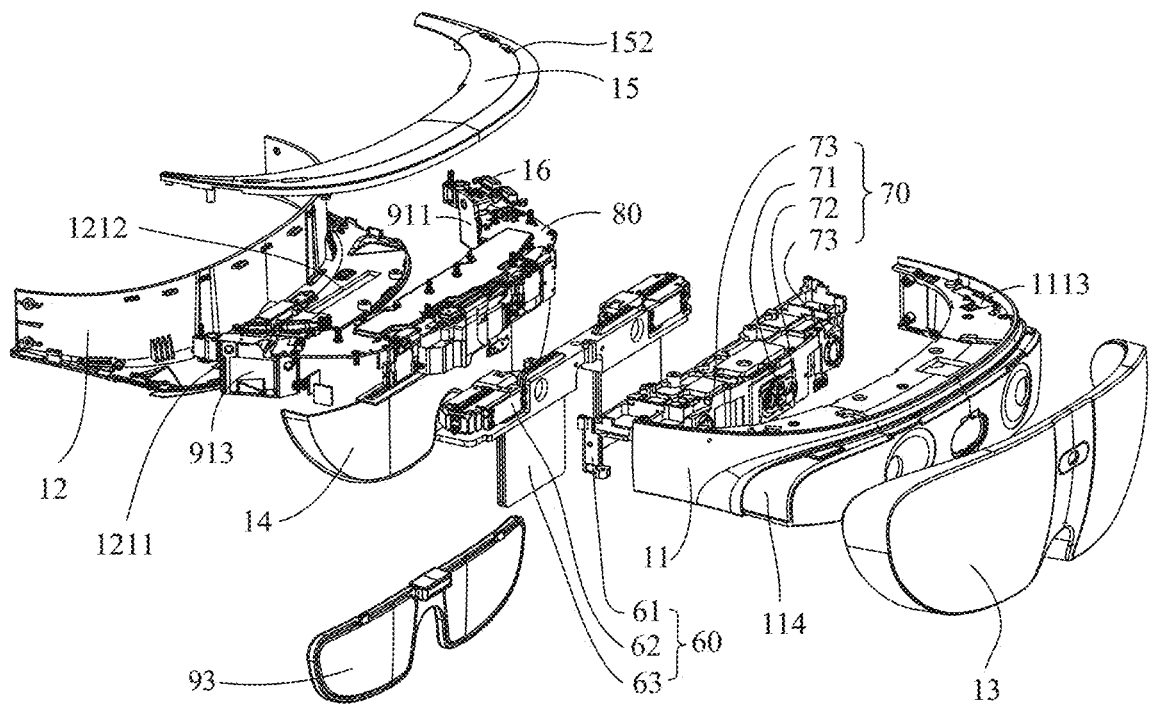
FIG. 23 is a exploded perspective view of the first housing assembly, the optical-mechanical assembly, the camera assembly, the speaker and the motherboard of the head-mounted device shown in FIG. 1.

As shown in FIGS. 21-23, the assembly relationship of the first housing assembly 10, the optical-mechanical assembly 60, the camera assembly 70, the motherboard 80 and the speaker assembly 91 of the head-mounted device 100 according to an embodiment of the present disclosure may be illustrated.

As shown in FIGS. 21 and 22, the TOF camera 71, the RGB camera 72 and the two fisheye cameras 73 of the camera assembly 70 may be fixed to the optical-machine support 61 of the optical-mechanical assembly 60, thus an assembly of the camera assembly 70 to the optical-mechanical assembly 60 may be achieved.

The motherboard 80 may be arranged above the top plate 611 of the optical-machine support 61, and the motherboard 80 and the optical-machine support 61 may be tightly screwed together by screws. As further shown in FIGS. 16, 21 and 22, an upper end formed by the FPC 722 and the FPC 713 connected together and an upper end of the FPC 733 may be connected to the motherboard 80, to enable transmission of electrical current and/or signals.

As shown in FIGS. 21 and 23, the primary front shell 11 and the motherboard 80 may be secured together. For example, as further shown in FIG. 6, screws may pass through some through holes 1114 in the primary front shell 11 and then be tightly screwed into the motherboard 80.

As shown in FIG. 23, the first speaker 911 and the second speaker 913, after being connected to the motherboard 80, may be further fixed to the primary front shell 11 by screws respectively. For example, the first speaker 911 and the second speaker 913 may be fixed to the top plate 111 respectively.

As shown in FIGS. 22 and 23, the rectangular through hole 1211 in the bottom plate 121 of the primary rear shell 12 may be aligned with one of the two waveguide sheets 63 of the optical-mechanical assembly 60, thus the one of the two waveguide sheets 63 of the optical-mechanical assembly 60 may pass through the rectangular through hole 1211 from the accommodation cavity 17 and protrude downward. The rectangular through hole 1212 in the bottom plate 121 of the primary rear shell 12 may be aligned with the other one of the two waveguide sheets 63 of the optical-mechanical assembly 60, thus the other one of the two waveguide sheets 63 of the optical-mechanical assembly 60 may pass through the rectangular through hole 1212 from the accommodation cavity 17 and protrude downward. A screw may then be successively received in the through hole 1114 of the primary front shell 11 (as shown in FIG. 6), the through hole 6131 in the leg 613 of the optical-machine support 61 (as shown in FIG. 14), and then be screwed into the bottom plate 121 of the primary rear shell 12. In this way, the optical-mechanical assembly 60, the camera assembly 70 and the motherboard 80 may be fixed between the primary front shell 11 and the primary rear shell 12. In addition, as shown in FIG. 21, the snap structures 1116 of the primary front shell 11 may be tightly engaged with the snap structures 1223 of primary rear shell 12, thus the primary front shell 11 and the primary rear shell 12 may be secured together. An accommodation cavity 17 may be defined between the primary front shell 11 and the primary rear shell 12. Of course, the connection structure may be strengthened by more screws, the optical-machine support 61 may also be fixed to the top plate 111 of the primary front shell 11 by connection structures such as screws.

As shown in FIGS. 21 and 23, a side key 16 may be arranged at the accommodating section 1113 of the primary front shell 11, then the primary shell ornament 15 may be placed on the top plate 111 of the primary front shell 11. The side key 16 may pass through the key hole 152 of the primary shell ornament 15, and at least a part of the side key 16 may protrude from the primary shell ornament 15. The primary shell ornament 15 may further be secured to the primary front shell 11 by screws.

As shown in FIGS. 21 and 23, the mask 13 may approach toward the primary front shell 11 and be buckled to the connection portion 114. The rear cover 14 may approach toward the mask 13, and be plugged into the lower part of the mask 13. The two waveguide sheets 63 may be received between the mask portion 131 of the mask 13 and the light-transmitting portion 141 of the rear cover 14. Thus the two waveguide sheets 63 may be protected.

As shown in FIG. 23, according to the needs of the user, the vision regulating glass 93 may be mounted to the primary rear shell 12 of the first housing assembly 10, and located between the user's eyes and the rear cover 14 when in use.

The Lacing Assembly 20

Figure 24:
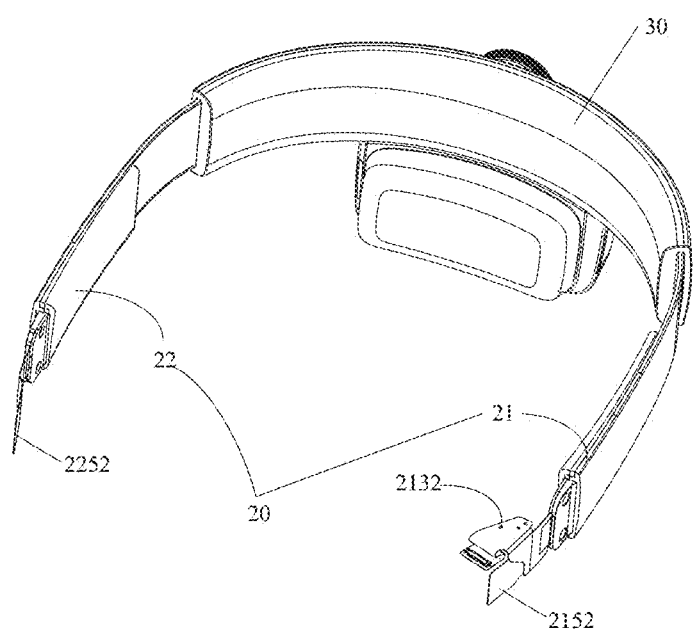
FIG. 24 is a perspective view of a lacing assembly and a second housing assembly shown in FIG. 1.

As shown in FIG. 24, FIG. 24 shows a perspective view of the lacing assembly 20 and the second housing assembly 30 according to an embodiment of the present disclosure. The lacing assembly 20 may include two head bands: a first head band 21 and a second head band 22.

As shown in FIGS. 1 and 4, an end of the first head band 21 is connected to a corresponding end of the first housing assembly 10. The other end of the first head band 21 extends into the second housing assembly 30 from a corresponding end of the second housing assembly 30 and is further connected to the tightness adjustment mechanism 40. The second head band 22 may be configured in a similar manner to the first head band 21.

The Lacing Assembly 20 and the First Head Band 21

Figure 25:
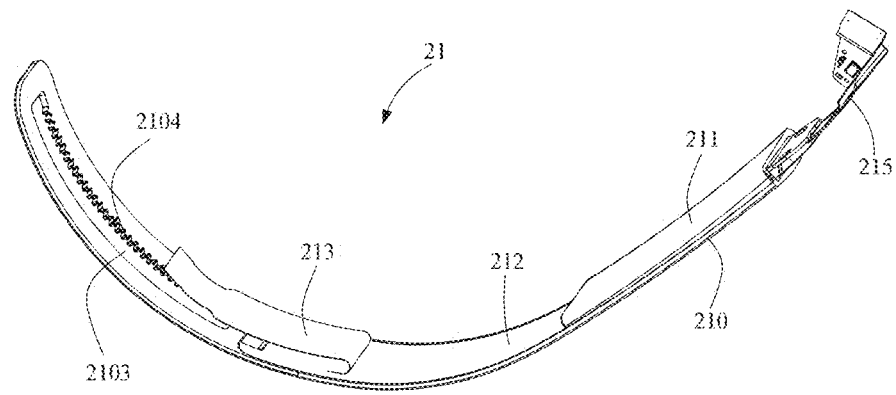
FIG. 25 is a perspective view of a first head band of the lacing assembly shown in FIG. 24.
Figure 26:
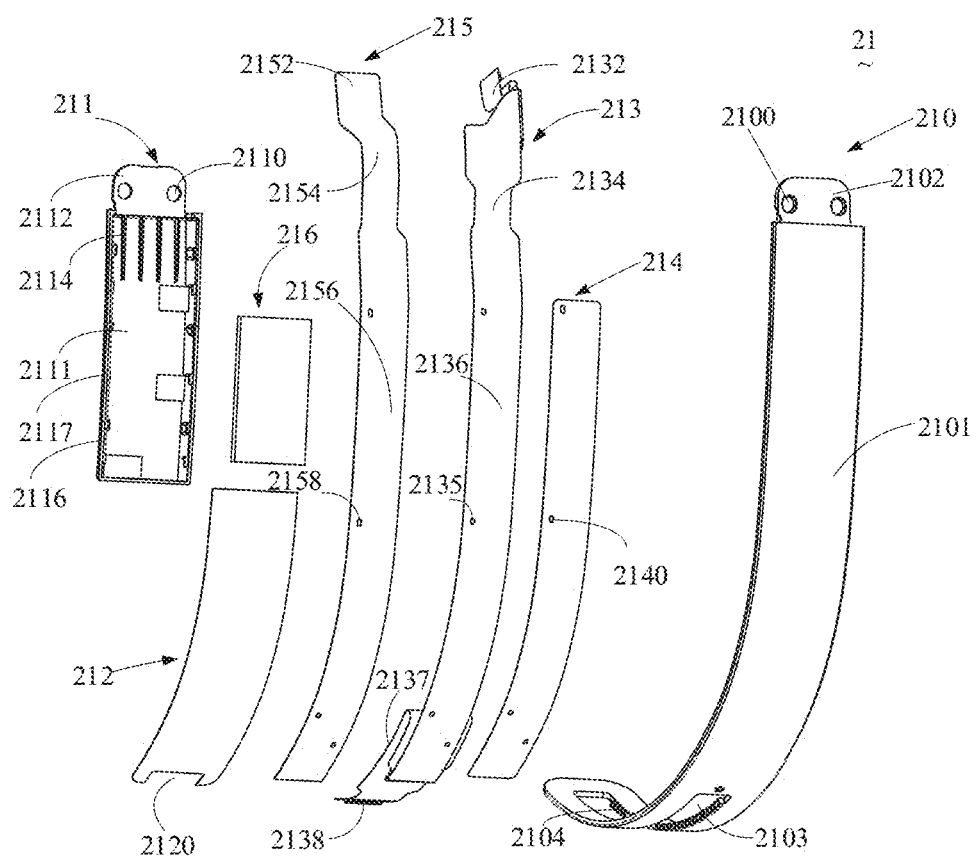
FIG. 26 is an exploded perspective view of the first head band shown in FIG. 25.

As shown in FIGS. 25 and 26, a perspective view and an exploded view of the first head band 21 according to an embodiment of the present disclosure are shown. The first head band 21 may include a first band body 210, a first band cover 211 buckled to the first band body 210, a first flexible strip 212, a power supply FPC 213, a protection sheet 214, and a heat dissipation sheet 215. The first flexible strip 212, the power supply FPC 213, the protection sheet 214, and the heat dissipation sheet 215 are disposed between and pressed by the first band body 210 and the first band cover 211.

The first band body 210 may be made of flexible material and may be arbitrarily bent. The first band body 210 may substantially strip-shaped. The first band body 210 may include a first body portion 2101 and a first mounting portion 2102 extending from an end of the first body portion 2101.

The first body portion 2101 has a uniform width. An end of the first body portion 2101 away from the first mounting portion 2102 may define a length adjustment hole 2103. The length adjustment hole 2103 may be a strip-shaped through hole. A first sawtooth wave 2104 extending along a length of the through hole is arranged on a wall of the length adjustment hole 2103 and is configured to engage with the tightness adjustment mechanism 40.

Figure 27:
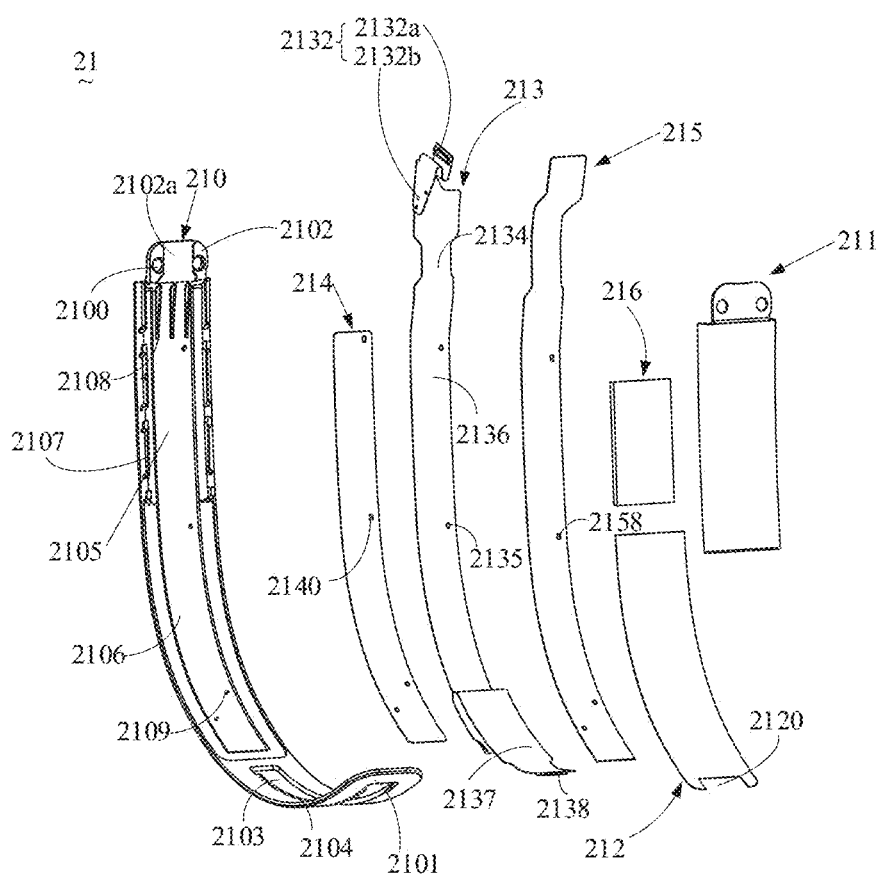
FIG. 27 is similar to FIG. 26, showing an exploded perspective view of the first head band from another view angle.

As shown in FIG. 27, an exploded view of the first head band 21 from another view angle according to the present disclosure is shown. A side of the first body portion 2101 that is pressed against the first band cover 211 may define an elongated recess, and a shape of the elongated recess may be the same as a shape of the first head band 21. The elongated recess may be divided into two recesses: a first recess 2105 and a second recess 2106 communicating with the first recess 2105. A depth of the first recess 2105 is the same as a depth of the second recess 2106, but a width of the first recess 2105 is greater than that of the second recess 2106. The recess extends from a position adjacent to the length adjustment hole 2103 to a position where the first mounting portion 2102 is arranged. The second recess 2106 is a stepped recess. An outermost step of the recess may be configured to receive the first flexible strip 212. Each of two edges of the first body portion 2101 near two side walls of the first recess 2105 is arranged with a first connector 2107. In an embodiment, the first connector 2107 may be a plurality of hooks that are evenly distributed and spaced apart from each other. A first fixing portion 2108 is arranged on the wall of the first recess 2105. The first fixing portion 2108 may be a plurality of ribs, and a thickness of each of the plurality of ribs changes gradually. A top surface of each of the plurality of ribs may be inclined. An end of each of the plurality of ribs abuts against the first mounting portion 2102.

A plurality of first restriction posts 2109 are arranged on the wall of the recess of the first body portion 2101 to fix the power supply FPC 213, the protection sheet 214, and the first heat dissipation sheet 215.

The first mounting portion 2102 may define two first connection holes 2100. The first mounting portion 2102 may define a recess 2102a between the two first connection holes 2100.

As shown in FIG. 26, the first band cover 211 may be made of rigid material. The first band cover 211 may buckle with a side of the first band body 210 near the first mounting portion 2102, and press an end of the first flexible strip 212 near the first mounting portion 2102 tightly.

The first band cover 211 may include a first body 2111 and a first assembly portion 2112 extending from an end of the first body 2111 away from the first flexible strip 212.

A width of the first body 2111 may be uniform. A shape of the first body 2111 may correspond to a shape of the first body portion 2101. A length of the first body 2111 may be less than that of the first body portion 2101. Two side edges along a width direction of the first body 2111 may extend towards the above-mentioned first body portion 2101 to form two first side walls 2116. The two first side walls 2116 have two inner faces that face each other, and each of the two inner faces is arranged with a second connector 2117. The second connector 2117 may be engaged with the first connector 2107 to fix the first band cover 211 to the first band body 210. An end of the first body 2111 connected to the first assembly portion 2112 may be arranged with a second fixing portion 2114. When the first band cover 211 is buckled to the first band body 210, the first fixing portion 2108 of the first band body 210 may be engaged with the second fixing portion 2114 of the first band cover 211 to fix and tightly press the power supply FPC 213 and the first heat dissipation sheet 215 between the first band body 210 and the first band cover 211. A structure of the second fixing portion 2114 may be similar to that of the first fixing portion 2108. The second fixing portion 2114 may also be a plurality of ribs having gradually changed thicknesses. A top surface of each of the plurality of ribs 2114 may be inclined. An end of the plurality of ribs 2114 may abut against the first assembly portion 2112.

A shape of the first assembly portion 2112 may be the same as a shape of the first mounting portion 2102. The first assembly portion 2112 may define a second connection hole 2110. When the first assembly portion 2112 is attached to the first mounting portion 2102, the first connection hole 2100 is aligned to and communicated with the second connection hole 2110, and a penetration hole is defined at a position where the recess 2102a is defined.

The first flexible strip 212 may be made of flexible material and may be arbitrarily bent. The first flexible strip 212 may be substantially strip-shaped. Material of the first flexible strip 212 may be the same as the material of the first band body 210. The first flexible strip 212 may be adhered to a wall of the second recess 2106 of the first band body 210 by glue. In this way, an outer surface of the first flexible strip 212 may align with an outer surface of the first band body 210. That is, a surface near the user's head is smooth. An end of the first flexible strip 212 defines a notch 2120. When the first flexible strip 212 is adhered to the wall of the second recess 2106, the first flexible strip 212 and the first band body 210 cooperatively define a first through hole at a position where the notch 2120 is defined, and the first through hole communicates with the second recess 2106 to allow the power supply FPC 213 to be threaded out.

As shown in FIGS. 25, 26 and 27, a shape of the power supply FPC 213 may fit with the first band body 210. A length of the power supply FPC 213 may be greater than a length of the first band body 210. Two ends of the power supply FPC 213 may extend beyond two ends of the first band body 210. The power supply FPC 213 may include a first electrical connection portion 2132, a power supply FPC neck portion 2134, a power supply FPC body 2136, a movable portion 2137 and a second electrical connection portion 2138. The first electrical connection portion 2132 may extend into the first housing assembly 10 and connect to the motherboard 80 and/or the microphone assembly 92.

The power supply FPC neck portion 2134 may be received in the penetration hole (which is defined at the position where the recess 2102a is defined) and connected to the first electrical connection portion 2132. The power supply FPC body 2136 may be fixedly received in the first recess 2105 and the second recess 2106. The movable portion 2137 extend through the first through hole to be disposed outside the second recess 2106. The second electrical connection portion 2138 may be arranged at an end of the movable portion 2137 and connected to a battery 35.

As shown in FIG. 28, an enlarged view of a portion in a circle A of FIG. 2 is shown. FIG. 8 shows a schematic view of connection between the first electrical connection portion 2132 and circuit elements when the lacing assembly 20 is extended into the first housing assembly 10. The first electrical connection portion 2132 includes a wiring portion 2132a connected to the motherboard 80 and another wiring portion 2132b connected to the microphone assembly 92. Each of the wiring portion 2132a and the second electrical connection portion 2138 may be a plugging interface, and connection may be achieved by plugging. For example, as shown in FIG. 28, the motherboard 80 is connected to the wiring portion 2132a by plugging. For example, as shown in FIG. 9, the second electrical connection portion 2138 is connected to the battery 35 by plugging.

As shown in FIGS. 26 and 27, a width of the power supply FPC neck portion 2134 is less than a width of each of two power supply FPC portions adjacent to the neck portion, such as a width of the power supply FPC body 2136. Further, as shown in FIG. 24, the power supply FPC neck portion 2134 is fixedly received in the penetration hole, preventing the power supply FPC 213 from being loose.

As shown in FIGS. 26 to 27, the power supply FPC body 2136 defines a first insertion hole 2135. When the power supply FPC body 2136 is received in the first recess 2105 and the second recess 2106, the first restriction post 2109 may be received in the first insertion hole 2135 to fix the power supply FPC body 2136.

A shape of the protection sheet 214 may fit with a shape of the first recess 2105 and the second recess 2106, such that the protection sheet 214 may be received in the recesses. For example, the protection sheet 214 may be received in an innermost step of the second recess 2106 and the first recess 2105. The protection sheet 214 may define a plurality of second insertion holes 2140. The first restriction post 2109 may be received in each of the plurality of second insertion holes 2140 to fix the protection sheet 214. The protection sheet 214 may be received in the first recess 2105 and the second recess 2106 to directly contact the first body portion 2101, preventing the power supply FPC body 2136 from being directly contact the first body portion 2101.

A shape of the first heat dissipation sheet 215 may be similar to that of the power supply FPC 213 and may be disposed between the first band cover 211 and the power supply FPC 213. The first heat dissipation sheet 215 may include a first attaching portion 2152 extending into the first housing assembly 10, a first heat dissipating neck portion 2154 received in the penetration hole and connected to the first attaching portion 2152, and a first heat dissipating body 2156 fixedly received in the first recess 2105 and the second recess 2106. For example, as shown in FIG. 28, the first attaching portion 2152 is attached to a side wall of a speaker body 9132.

A width of the first heat dissipating neck portion 2154 is less than a width of each of two portions of the heat dissipation sheet adjacent to the neck portion, such as a width of the first heat dissipating body 2156. Further as shown in FIG. 4, the first heat dissipating neck portion 2154 is fixedly received in the penetration hole, preventing the first heat dissipation sheet 215 from being loose. The first heat dissipating body 2156 may define a third insertion hole 2158. When the first heat dissipating body 2156 is received in the first recess 2105 and the second recess 2106, the first restriction post 2109 is received in the third insertion hole 2158 to fix the first heat dissipating body 2156. The first fixing portion 2108 and the second fixing portion 2114 may cooperatively press tightly against and fix the first heat dissipating body 2156 between the first band body 210 and the first band cover 211.

A filling 216 may be disposed between the first heat dissipation sheet 215 and the first band cover 211. The filling 216 may be a foam to fill a space between the first band cover 211 and the first band body 210. Alternatively, the filling 216 may be thermally conductive material, improving thermal conductivity of the first heat dissipation sheet 215.

When assembling the first head band 21, as shown in FIG. 26 and FIG. 27, the protection sheet 214, the power supply FPC 213, and the first heat dissipation sheet 215 may be laminated in sequence, such that the second insertion hole 2140, the first insertion hole 2135, and the third insertion hole 2158 are aligned in sequence. Subsequently, the protection sheet 214, the power supply FPC 213, and the first heat dissipation sheet 215 may be received in the first recess 2105 and the second recess 2106 of the first band body 210, enabling the first restriction post 2109 to be received into the second insertion hole 2140, the first insertion hole 2135, and the third insertion hole 2158 in sequence. The first flexible strip 212 is embedded in and glued to the outermost step of the second recess 2106, such that the first flexible strip 212 and the first body portion 2101 of the first band body 210 may cooperatively define the first through hole at a position where the notch 2120 is defined. In this way, the movable portion 2137 of the power supply FPC 213 may extend through the first through hole. In addition, the power supply FPC neck portion 2134 of the power supply FPC 213 and the first heat dissipating neck portion 2154 are received in the recess 2102a. The filling 216 may be placed on the first body 2111 of the first band cover 211, and the first band cover 211 may buckle to the first band body 210, allowing the first connector 2107 to be connected to the second connector 2117. In addition, the first mounting portion 2102 may buckle to the first assembly portion 2112 to form a connection portion to connect with the corresponding end of the first housing assembly 10. In this way, assembling the first head band 21 may be completed.

It should be understood that the first band cover 211 is buckled to the first band body 210. The first band cover 211 and a corresponding portion of the first band body 210 cooperatively define a receiving cavity. Further, it is the first body portion 2101 that is buckled to the first band cover 211 at the position of the first recess 2105 to define the receiving cavity. The protection sheet 214, the power supply FPC 213, the first heat dissipation sheet 215 and the filling 216 may be received in the receiving cavity. The second recess 2106 may communicate with the receiving cavity.

The Lacing Assembly 20 and the Second Head Band 22

Figure 30:
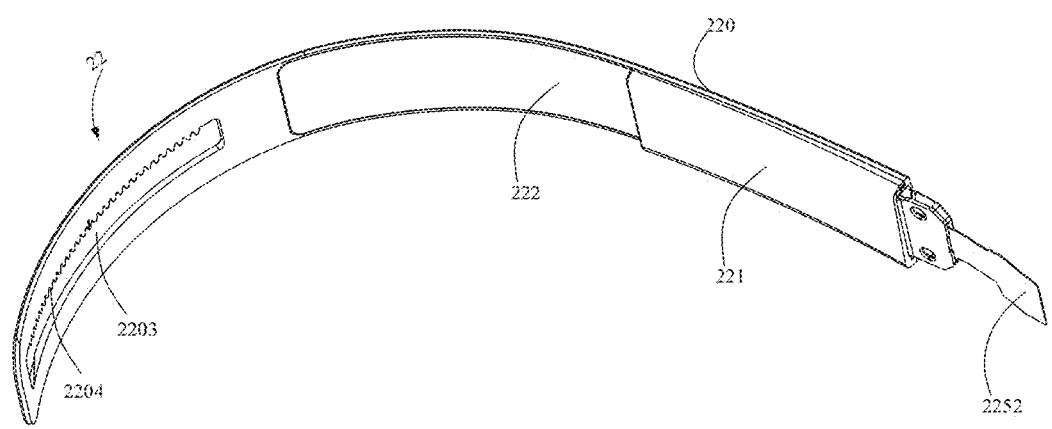
FIG. 30 is a perspective view of the second head band of the lacing assembly shown in FIG. 24.
Figure 31:
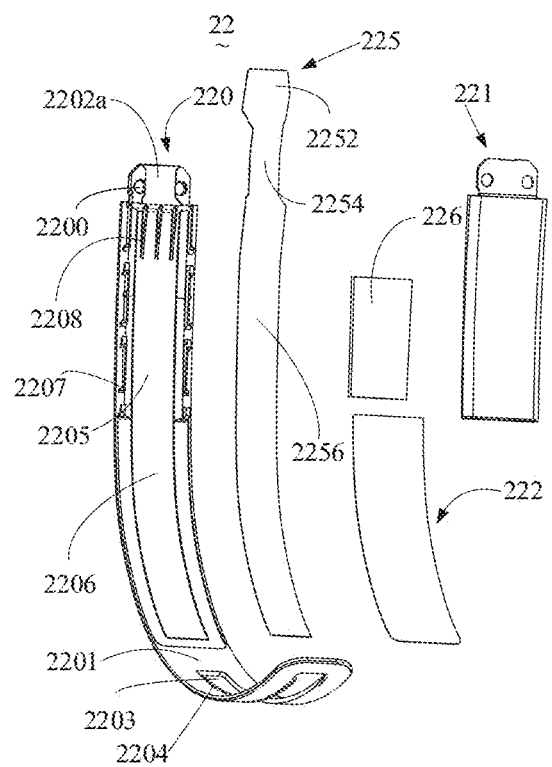
FIG. 31 is an exploded perspective view of the second head band shown in FIG. 30.

As shown in FIG. 30 and FIG. 31, a perspective view and an exploded view of the second head band 22 according to the present disclosure are shown. The second head band 22 may be similar to the first head band 21. However, the second head band 22 is not arranged with the power supply FPC and the protection sheet. The second head band 22 may include a second band body 220, a second band cover 221, a second flexible strip 222, and a second heat dissipation sheet 225. The second flexible strip 222 and the second heat dissipation sheet 225 are pressed between the second band body 220 and the second band cover 221. A structure of the second band body 220 may be substantially the same as that of the first band body 210, as shown in FIG. 11, which will not be described in detail herein, but main components are listed here. Detailed engagement and function of the second band body 220 may refer to that of the first band body 210. The second band body 220 may include a second body portion 2201 and a second mounting portion 2202. The second body portion 2201 defines a length adjustment hole 2203, a second sawtooth wave 2204, a first recess 2205, and a second recess 2206. A first connector 2207 may be arranged on each of two edges of the second body portion 2201 near side walls of the first recess 2205. A first fixing portion 2208 may be arranged on a wall of the first recess 2205 adjacent to the second mounting portion 2202. The second mounting portion 2202 defines two first connection holes 2200 and defines a recess 2202a between the two first connection holes 2200.

Figure 32:
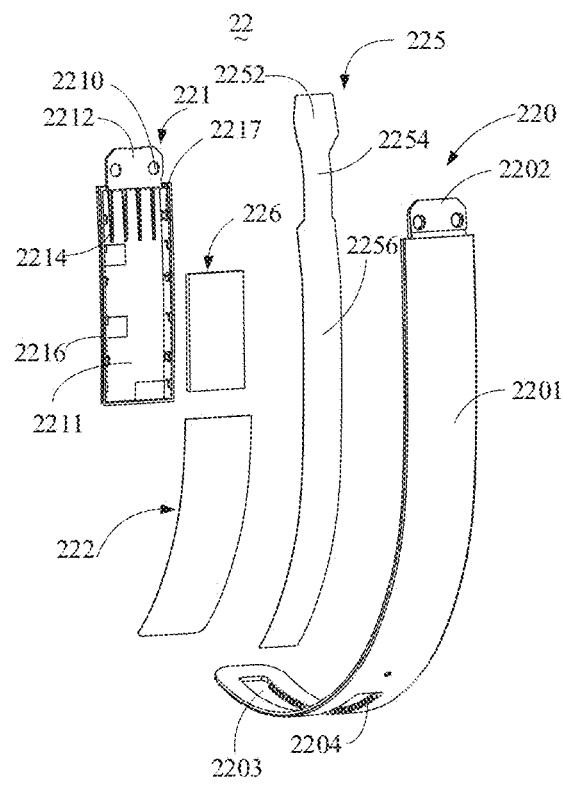
FIG. 32 is similar to FIG. 31, showing an exploded perspective view of the second head band from another view angle.

As shown in FIG. 32, an exploded view of the second head band 22 from another view angle is shown. Configuration of the second band cover 221 may substantially be the same as that of the first band cover 211, and will not be described in details herein, but main components will be listed. Detailed engagement and function of the second band cover 221 may refer to the first band cover 211. The second band cover 221 may include a second body 2211 and a second assembly portion 2212. The second body 2211 has a second fixing portion 2214, a second side wall 2216 and a second connector 2217. The second assembly portion 2212 may define two second connection holes 2210.

The second flexible strip 222 may be made of flexible material and may be arbitrarily bent. The second flexible strip 222 may substantially be strip-shaped. Material of the second flexible strip 222 may be the same as material of the second band body 220. The second flexible strip 222 may be adhered to a wall of the second recess 2206 of the second band body 220 by glue or the like. In this way, an outer surface of the second flexible strip 222 may align with an outer surface of the second band body 220, that is, a surface near the user's head may be smooth.

Configuration of the second heat dissipation sheet 225 may substantially be the same as that of the first heat dissipation sheet 215. The second heat dissipation sheet 225 may include a second attaching portion 2252, a second heat dissipating neck portion 2254, and a second heat dissipating body 2256. The second attaching portion 2252 may extend into the first housing assembly 10. The second heat dissipating neck portion 2254 may be received in the penetration hole and connected to the second attaching portion 2252. The second heat dissipating body 2256 may be fixedly received in the first recess 2205 and the second recess 2206. As shown in FIG. 33, the second attaching portion 2252 is attached to a side wall of a speaker body 9132 of the second speaker 913.

A width of the second heat dissipating neck portion 2254 is less than a width of any portion of the second heat dissipation sheet adjacent to the neck portion, such as a width of the second heat dissipating body 2256. As shown in FIG. 24, the second heat dissipating neck portion 2254 is fixedly received in the penetration hole, preventing the second heat dissipation sheet 225 form being loose.

When the second heat dissipating body 2256 is received in the first recess 2205 and the second recess 2206, the first fixing portion 2208 and the second fixing portion 2214 cooperatively fix the second heat dissipating body 2256 disposed between the second band body 220 and the second band cover 221.

A filling 226 may be disposed in a region of the second band cover 221 where the second connector 2217 is arranged. The filling 226 may be disposed between the second heat dissipation sheet 225 and the second band cover 221. The filling 226 may be a foam to fill a space between the second band cover 221 and the second band body 220. Alternatively, the filling 226 may be thermally conductive material, improving thermal conductivity of the second heat dissipation sheet 225.

When assembling the second head band 22, as shown in FIGS. 31 and 32, the second heat dissipation sheet 225 may firstly be placed in the first recess 2205 and the second recess 2206 of the second band body 220. Subsequently, the second flexible strip 222 is embedded in an outermost step of the second recess 2206 by glue. The second heat dissipating neck portion 2254 is then placed in the recess 2202a. At this moment, the second filling 226 is placed on the second band cover 221, and the second band cover 221 is buckled to the second band body 220, enabling the first connector 2207 to be connected to the second connector 2217. In addition, the second mounting portion 2202 is buckled to the second assembly portion 2212 to form a connection portion to connect to a corresponding end of the first housing assembly 10. In this way, assembling the second head band 22 may be completed.

It should be understood that the second band cover 221 is buckled to the second band body 220, and the second band cover 221 and a corresponding portion of the second band body 220 cooperatively define a receiving cavity. A portion of the second body portion 2201 where the first recess 2205 is defined is buckled to the second band cover 221 to define the receiving cavity. The second heat dissipation sheet 225 and the filling 226 may be received in the receiving cavity. The second recess 2206 is communicated to the receiving cavity.

Assembling relationships between the lacing assembly 20 and the first housing assembly 10 are described as follows.

As shown in FIGS. 1, 5, 6, 7 and 24, when the first head band 21 is assembled to the first housing assembly 10, the post 1123 at an end of the primary front shell 11 of the first housing assembly 10 may firstly pass through the connection portion of the head band 21 successively. For example, the post 1123 may pass through the first connection hole 2100 and the second connection hole 2110. The primary front shell 11 may then be buckled to the primary rear shell 12. With an screw passing through the through hole 1221 and connected to the post 1123, the head band 21 may be assembled to the first housing assembly 10. Similarly, the second head band 22 may be assembled to the first housing assembly 10.

Position relationships and connection relationships of the first heat dissipation sheet 215, the second dissipation sheet 225, and the power supply FPC 213 inside the first housing assembly 10 may be referred to FIG. 2, FIG. 3, FIG. 28, and FIG. 33. The wiring portion 2132a of the power supply FPC 213 may be connected to a PCB 81 of the motherboard 80, such as by soldering and the like. The wiring portion 2132b of the power supply FPC 213 may be connected to a first microphone of the microphone assembly 92, such as by soldering and the like. The first heat dissipation sheet 215 may extend into the first housing assembly 10. The first attaching portion 2152 is attached to the outer side wall of the speaker body 9112 of the first speaker 911. The second heat dissipation sheet 225 may extend into the first housing assembly 10. The second attaching portion 2252 is attached to the outer wall of the speaker body 9132 of the second speaker 913.

It should be noted that, the connection between the first head band 21, the second head band 22 and the first housing assembly 10 may not be limited to the above-mentioned connection between the posts 1123, the connection holes and the through holes 1221. Any form of connector is possible as long as it can attach the lacing assembly 20 to the first housing assembly 10.

The number, structures, and positions of the heat dissipation sheet, the power supply FPC 213, the protection sheet 214 and the filling received in the first head band 21 and the second head band 22 may be adjusted based on actual needs. For example, the first head band 21 and the second head band 22 may be adjusted to be receiving the heat dissipation sheet, the power supply FPC 213, the protection sheet 214 and the filling in an inside of the first head band 21 and the second head band 22. Of course, according to the actual situation, more components may be received in the inside of the first head band 21 and the second head band 22, or some components received in the inside of the first head band 21 and the second head band 22 may be omitted. For example, an isolation sheet may be received between the heat dissipation sheet and the power supply FPC. For example, the first head band 21 and the second head band 22 may be adjusted to be receiving the heat dissipation sheet only. For example, one of the first head band 21 and the second head band 22 may be a normal head band defining the length adjustment hole only. Structures of the first head band 21 and the second head band 22 may also be adjusted according to the components received therein.

It should be understood that the first head band 21 and the second head band 22 may be integrated as a one-piece structure, i.e., configured as one head band. For example, one end may be overlapped with the other end, and a middle portion may be connected to the host housing. A length of the overlapped portion may be adjusted to achieve tightness adjustment of the lacing assembly 20. When the first head band 21 and the second head band 22 are configured as one head band, other connection manners may also be applied, which will not be limited here.

The Second Housing Assembly 30

Figure 34:
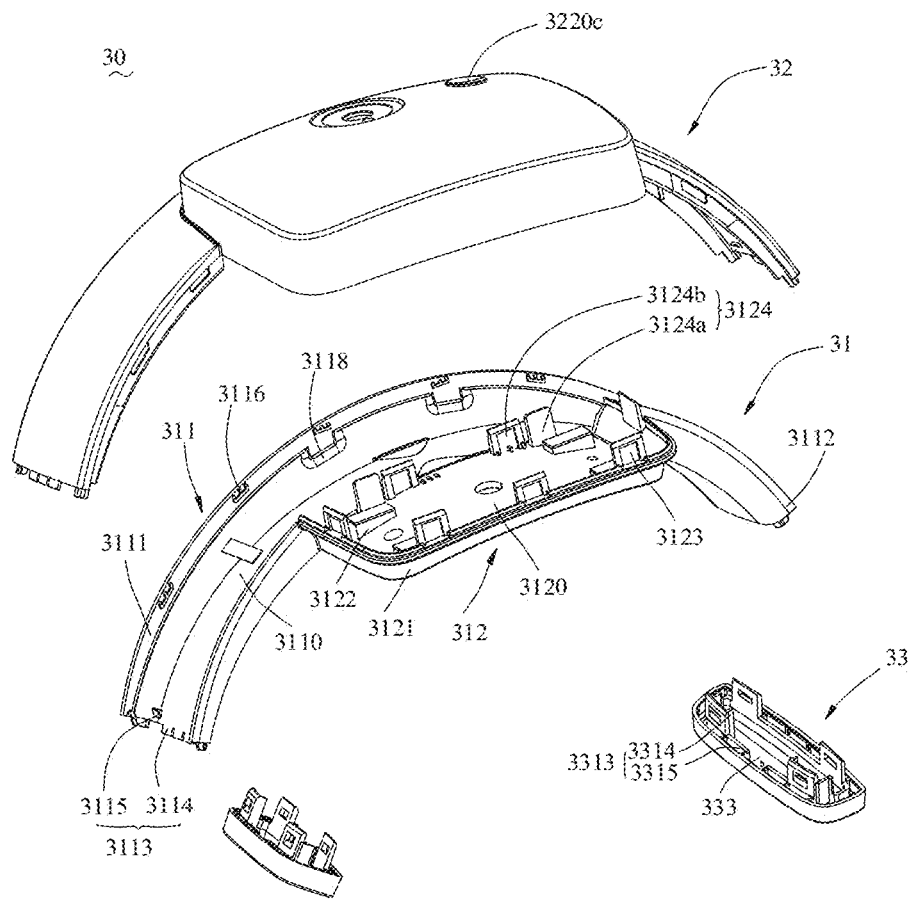
FIG. 34 is an exploded perspective view of the second housing assembly.
Figure 35:
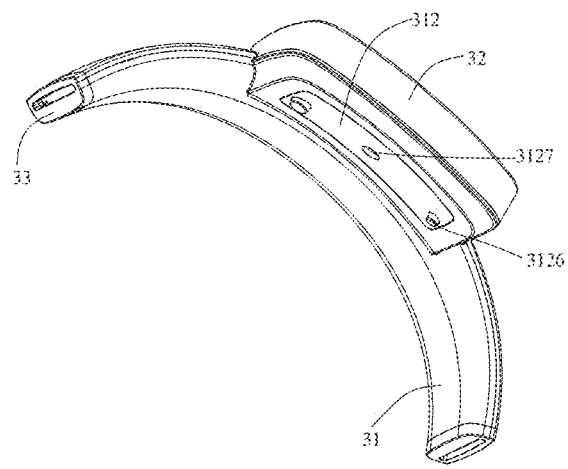
FIG. 35 is a perspective view of the second housing assembly.

As shown in FIG. 34 and FIG. 35, an exploded view and a perspective view of the second housing assembly 30 according to an embodiment are shown. The second housing assembly 30 may include a bottom front housing 31, a bottom rear housing 32, and a connector 33 connecting the bottom front housing 31 and the bottom rear housing 32. The second housing assembly 30 may receive the lacing assembly 20 and the tightness adjustment mechanism 40.

The Second Housing Assembly 30 and the Bottom Front Housing 31

As shown in FIG. 34, the bottom front housing 31 may be made of rigid material. The bottom front housing 31 may include a first channel housing 311 and a first power supply housing 312 extending from the first channel housing 311 downwardly (the downward direction may refer to a direction indication shown in FIG. 1).

The first channel housing 311 may be curved and may be strip-shaped to match a shape of the user's head, facilitating the user to wear the device. An inner surface and an outer surface of the first channel housing 311 may be smooth and curved. The first channel housing 311 may include a strip-shaped and curved body 3110 and a first convex edge 3111 and a second convex edge 3112. The first convex edge 3111 and the second convex edge 3112 may extend from two long edges of the body 3110, bending towards the bottom rear housing 32. The first convex edge 3111 is disposed above the body 3110 and the second convex edge 3112 is disposed below the body 3110.

A third buckling member 3113 may be arranged on each of two opposite ends of the body 3110. The third buckling member 3113 may include a plurality of protrusion 3114 and a plurality of bumps 3115. The plurality of protrusion 3114 extend from an edge end of the body 3110 outwardly. The plurality of bumps 3115 are adjacent to the edge end. The bumps 3115 may be arranged on a surface facing the bottom rear housing 32 or a surface away from the bottom rear housing 32.

A first buckling member 3116 may be arranged on each of an inner side of the first convex edge 3111 facing the second convex edge 3112 and an inner side of the second convex edge 3112 facing the first convex edge 3111. The first buckling member 3116 may be a plurality of protrusions evenly distributed.

An edge of the body 3110 connected to the first convex edge 3111 may define a plurality of recesses 3118.

The plurality of recesses 3118 may locate at a central portion of one of the two long edges of the body 3110 and at a position directly facing the first power supply housing 312. The plurality of recesses 3118 are defined to avoid corresponding components arranged on the bottom rear housing 32.

The first power supply housing 312 may include a first power supply housing body 3120 and a convex edge 3121. The first power supply housing body 3120 may extend outwardly from a middle portion of the other one of the two long edges that is arranged with the second convex edge 3112 of the body 3110. The convex edge 3121 is bent from an outer edge of the first power supply housing body 3120 towards the bottom rear housing 32. That is, the second convex edge 3112 is not arranged at a position where the first power supply housing body 3120 is connected to the body 3110 of the first channel housing 3111. The second convex edge 3112 is interrupted at the middle of the long edge of the body 3110 where the second convex edge 3112 is arranged. The two ends of the second convex edge 3112 are formed at the position where the second convex edge 3112 is interrupted. The two ends are connected to the convex edge 3121 of the first power supply housing 312.

The first power supply housing body 3120 may be rectangular. A surface of the first power supply housing body 3120 facing the bottom rear housing is arranged with a compensation structure. The compensation structure includes four tabs 3122. A thickness of each of the four tabs 3122 gradually changes. The four tabs 3122 are disposed at locations near four corners of the first power supply housing body 3120. Surfaces of the four tabs 3122 facing the bottom rear housing 32 are on a same plane for carrying the battery 35 (as shown in FIG. 9).

The first power supply housing body 3120 is arranged with two pairs of first buckling structures 3124. The two pairs of first buckling structures 3124 are arranged between two tabs 3122 of the body 3110 near the first channel housing 311 and the body 3110. The two pairs of first buckling structures 3124 may include two restriction plates 3124a and two buckling plates 3124b. The two restriction plates 3124a are spaced apart from each other. The two buckling plates 3124b are disposed between the two restriction plates 3124a and misalign with the two restriction plates 3124a. One buckling plate 3124b is disposed near a corresponding restriction plate 3124a. The buckling plate 3124b and an adjacent restriction plate 3124a (the corresponding restriction plate 3124a) serve as a pair of first buckling structure 3124 for positioning and buckling with corresponding components on the bottom rear housing 32, such that the first power supply housing 312 may be separated from the first channel housing 311.

The convex edge 3121 at a lower portion of the first power supply housing may be arranged with a second buckling member 3123 facing the bottom rear housing 32. The second buckling member 3123 may be a plurality of tabs, and the plurality of tabs may define a plurality of recesses.

As shown in FIG. 35, a face of the first power supply housing body 3120 facing the first housing assembly 10 may be arranged with a connection member 3126. In an embodiment, the connection member 3126 may be two posts. The face of the first power supply housing body 3120 may define a through hole 3127 between the two posts.

The Bottom Rear Housing 32 of the Second Housing Assembly 30

Figure 36:
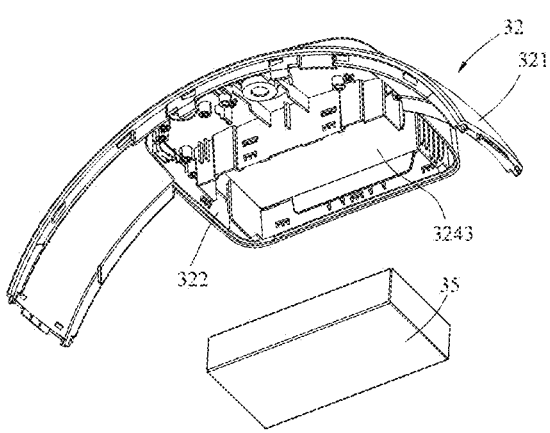
FIG. 36 is a perspective view of a bottom rear shell of the second housing assembly and shows engagement between the bottom rear shell and a battery.

As shown in FIG. 36, the bottom rear housing 32 may be made of rigid material. The bottom rear housing 32 may include a second channel housing 321 corresponding to the above-mentioned first channel housing 311 and a second power supply housing 322 corresponding to the above-mentioned first power supply housing 312. The battery 35 may be mounted inside the second power supply housing 322. The second power supply housing 322 and the battery 35 mounted therein may form a power supply assembly.

Figure 37:
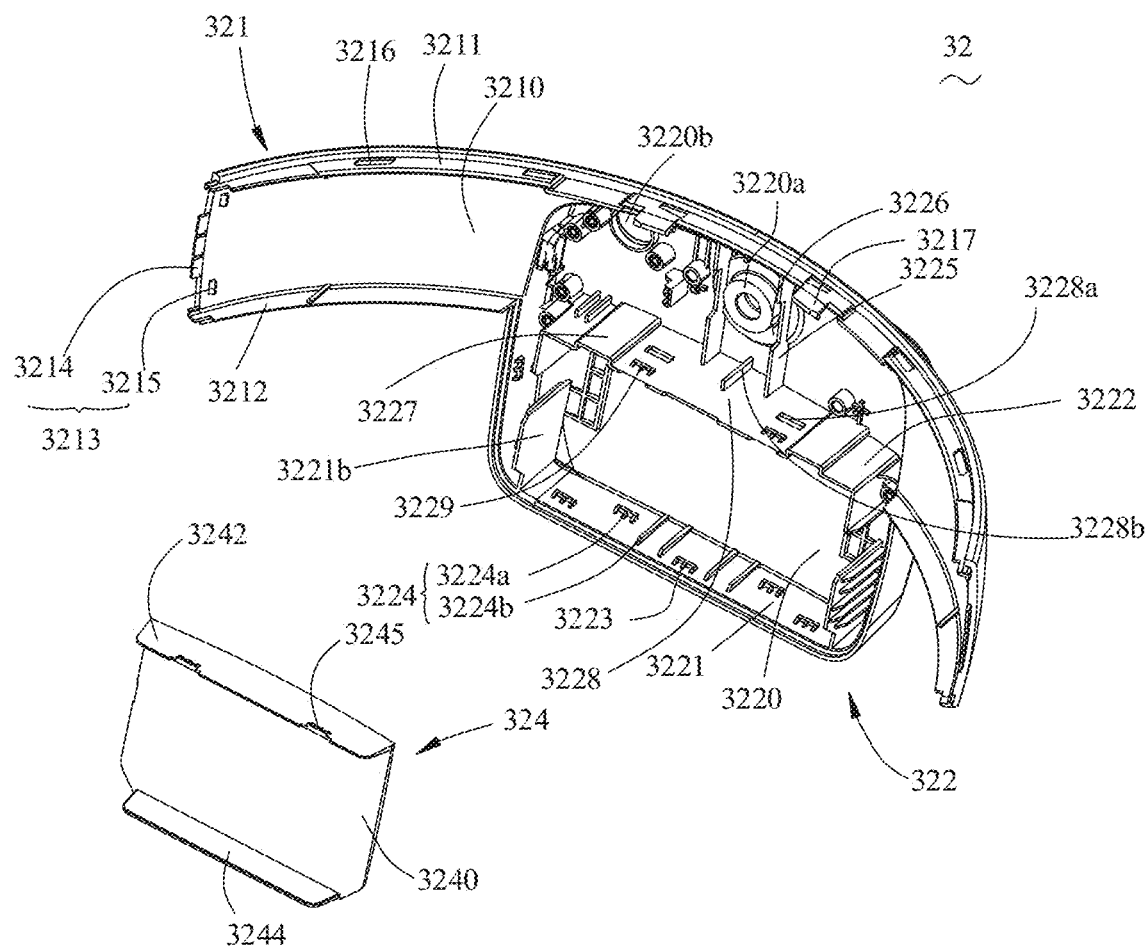
FIG. 37 shows engagement between the bottom rear shell and a battery support shown in FIG. 36.

As shown in FIG. 37, a shape and configuration of the second channel housing 321 may substantially be similar to that of the first channel housing 311, such that the first channel housing 311 and the second channel housing 321 may be engaged with each other. The second channel housing 321 may be strip-shaped and curved. The second channel housing 321 may include a strip-shaped and curved body 3210, a first convex edge 3211 and a second convex edge 3212. The first convex edge 3211 and the second convex edge 3212 may extend from two long edges of the body 3210, bending towards the bottom front housing 31. The first convex edge 3211 is disposed above the body 3210, and the second convex edge 3212 is disposed below the body 3210.

A third buckling member 3213 may be arranged on each of two opposite ends of the body 3210. Configuration of the third buckling member 3213 may be identical with that of the third buckling member 3113 arranged on the first channel housing 311. The third buckling member 3213 may include a protrusion 3214 and a bump 3215, which will not be repeatedly described herein. The third buckling member 3113 arranged on the first channel housing 311 and the third buckling member 3213 arranged on the second channel housing 321 may be buckled to corresponding structures of the connector 33 to fix the two ends of the first channel housing 311 with the two ends of the second channel housing 321.

A first buckling member 3216 may be arranged on each of an outer side of the first convex edge 3211 away from the second convex edge 3212 and an outer side of the second convex edge 3212 away from the first convex edge 3211. The first buckling member 3216 may be a plurality of recesses evenly distributed for engaging with a plurality of first buckling members 3116, i.e., a plurality of protrusion. In this way, the first channel housing 311 may be buckled with the second channel housing 321 to cooperatively define a channel for the lacing assembly 20 to extend through.

A hook 3217 may be arranged on the first convex edge 3211 at a position corresponding to the recess 3118 defined in the first convex edge 3111 of the bottom front housing 31, and the hook 3217 may extend towards the bottom front housing 31 to buckle with a relevant element of the tightness adjustment mechanism 40. The corresponding recess 3118 defined in the bottom front housing 31 may avoid the hook 3217 and the relevant element of the tightness adjustment mechanism 40 while the hook 3217 is buckling with the relevant element of the tightness adjustment mechanism 40.

The second power supply housing 322 may include a second power supply housing body 3220, a side wall 3221, a partition plate 3222, and a power supply bracket 324. The second power supply housing body 3220 may be recessed outwardly from a middle of the body 3210 of the second channel housing 321 and may extend downwardly. The side wall 3221 may extend from an edge of the second power supply housing body 3220, bending towards the bottom front housing 31. The partition plate 3222 may be disposed inside the second power supply housing 322. The power supply bracket 324 may be disposed below the partition plate 3222 and mounted inside the second power supply housing 322.

A length of the second power supply housing body 3220 may be the same as a length of the first power supply housing body 3120. A width of the second power supply housing body 3220 may substantially be a sum of a width of the first power supply housing body 3120 and a width of the body 3210 of the second channel housing 321.

A perforated tab 3220a may be arranged at a central portion of the second power supply housing body 3220 near an upper portion of the side wall 3221. Two isolation plates 3225 may be symmetrically disposed at two sides of the perforated tab 3220a. Each of the two isolation plates 3225 defines a notch 3226, and the notch 3226 is recessed away from the bottom front housing 31 to receive the relevant element of the tightness adjustment mechanism 40.

A perforation 3220b is further defined in the second power supply housing body 3220 to receive a power button 3220c (see FIG. 14 for details).

A second buckling member 3223 is arranged on a lower portion of the side wall 3221 below the second power supply housing 322 near an edge of the side wall 3221. The second buckling member 3223 may be a plurality of bumps spaced apart from each other. Positions of the plurality of bumps may correspond to positions of the second buckling members 3123 (such as the plurality of tabs) of the first power supply housing 312, such that the second buckling member 3123 of the first power supply housing 312 may be buckled with the second buckling member 3223 of the second power supply housing 322.

A buckling structure 3224 may be arranged on the side wall 3221 below the second power supply housing 322. The buckling structure 3224 may include two symmetrically disposed protrusions 3224a and a plurality of restriction plates 3224b disposed between the two protrusions 3224a. A width of each of the plurality of restriction plates 3224b may gradually change. Compared to each protrusion of the second buckling member 3223, the protrusions 3224a may be disposed further away from the outer edge of the side wall 3221 below the second power supply housing 322.

Figures 38, 39:
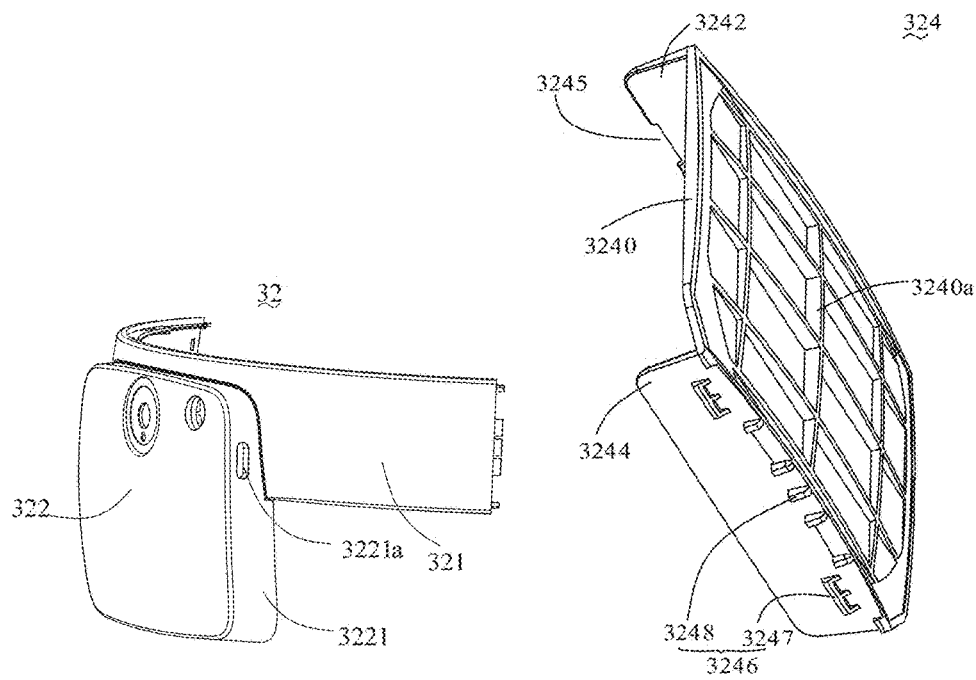
FIG. 38 is similar to FIG. 34, showing a perspective view of the bottom rear shell in FIG. 34 from another view angle.
FIG. 39 is an enlarged perspective view of the battery support in FIG. 37.

As shown in FIG. 38, a side wall 3221 of the second power supply housing 322 adjacent to the second channel housing 321 may define a heat dissipation hole 3221a.

As shown in FIG. 37, two parallel positioning plates 3221b are arranged on the side wall 3221 below the second power supply housing 322, near the side wall 3221 on a left and a right of the second power supply housing 322.

The partition plate 3222 separates a space of the second power supply housing 322 into two chambers. An upper chamber is defined for receiving the tightness adjustment mechanism 40 and allowing the lacing assembly 20, i.e., the first head band 21 and the second head band 22, to extend through. A lower chamber is defined for receiving the battery 35.

The partition plate 3222 may be bent several times, obtaining two bending portions 3227 and a carrying portion 3228 connected to the two bending portions 3227.

The two bending portions 3227 may be disposed at two opposite sides of the carrying portion 3228 and away from a central portion of the partition plate 3222. A top of each of the two bending portions 3227 may be higher than the carrying portion 3228. In this way, a space may be defined in a bottom of each of the two bending portions 3227 to receive the restriction plate 3124a of the first buckling structure 3124 of the bottom front housing 31 and to allow the restriction plate 3124a to contact the bottom of each of the two bending portions 3227.

A first buckling structure 3229 may be arranged on the carrying portion 3228 disposed between the two bending portions 3227, and may be disposed near the two bending portions 3227. The first buckling structure 3229 may be two protrusions. Positions of the two protrusions may correspond to positions of the two buckling plates 3124b of the first buckling structure 3124 of the first power supply housing 312, such that the two protrusions may be buckled to the two buckling plates 3124b. In this way, the first power supply housing 312 may be buckled to the partition plate 3222.

The carrying portion 3228 may define two openings 3228a, and each of the two openings is at a rear of the first buckling structure 3229 correspondingly, such that relevant structures of the power supply bracket 324 may be buckled with the two openings 3228a.

A carrying rib 3228b may be arranged at a central portion of the carrying portion 3228. The carrying rib 3228b may be disposed between the carrying portion 3228 and the second power supply housing body 3220, and may be perpendicular to the carrying portion 3228 and the second power supply housing body 3220. In this way, a strength of an attached surface between the carrying portion 3228 and the second power supply housing body 3220 may be improved, and the tightness adjustment mechanism 40 may be supported by carrying rib 3228b.

As shown in FIG. 37 and FIG. 39, the power supply bracket 324 is received in the lower chamber defined in the second power supply housing 322. The power supply bracket 324 may have a bracket body 3240, a first mounting plate 3242 and a second mounting plate 3244. The bracket body 3240 may be mounted on the second power supply housing body 3210. The first mounting plate 3242 and the second mounting plate 3244 may extend from two opposite sides of the bracket body 3240.

Longitudinal and transverse reinforcing ribs 3240a may be arranged on a face of the bracket body 3240 facing the second power supply housing body 3210. A height of each reinforcing rib 3240a may gradually decrease from a center to two sides. In this way, after the bracket body 3240 contacts the curved second power supply housing body 3210, a face of the bracket body 3240 facing the bottom front housing 31 may be flat to carry a battery pad 3243 (as shown in FIG. 36). A length of the battery pad 3243 may be equal to a distance between the two positioning plates 3221b and may be equal to a length of the battery 35. The battery pad 3243 may be mounted on the bracket body 3240. Two ends of the battery pad 3243 may extend beyond the bracket body 3240 to abut against the two positioning plates 322b to carry the battery 35 stably.

The first mounting plate 3242 and the second mounting plate 3244 may be parallel to each other. The first mounting plate 3242 may be mounted on the partition plate 3222, and the second mounting plate 3244 may be mounted on the side wall 3221 below the second power supply housing 322.

A buckling portion 3245 may be arranged at an edge of the first mounting plate 3242 and at a position corresponding to the opening 3228a defined in the partition plate 3222. The buckling portion 3245 may be buckled into the opening 3228a, such that the first mounting plate 3242 is mounted to the partition plate 3222.

A buckling structure 3246 may be arranged on a face of the second mounting plate 3244 facing the side wall 3221 below the second power supply housing 322 and may be buckled to the buckling structure 3224 arranged on the side wall 3221. The buckling structure 3246 may include a protrusion 3247 and a restriction plate 3248. The protrusion 3247 may engage with the protrusion 3224a of the buckling structure 3224. The restriction plate 3248 may engage with the restriction plate 3224b of the buckling structure 3224.

The Connector 33 of the Second Housing Assembly 30

Figures 40, 41:
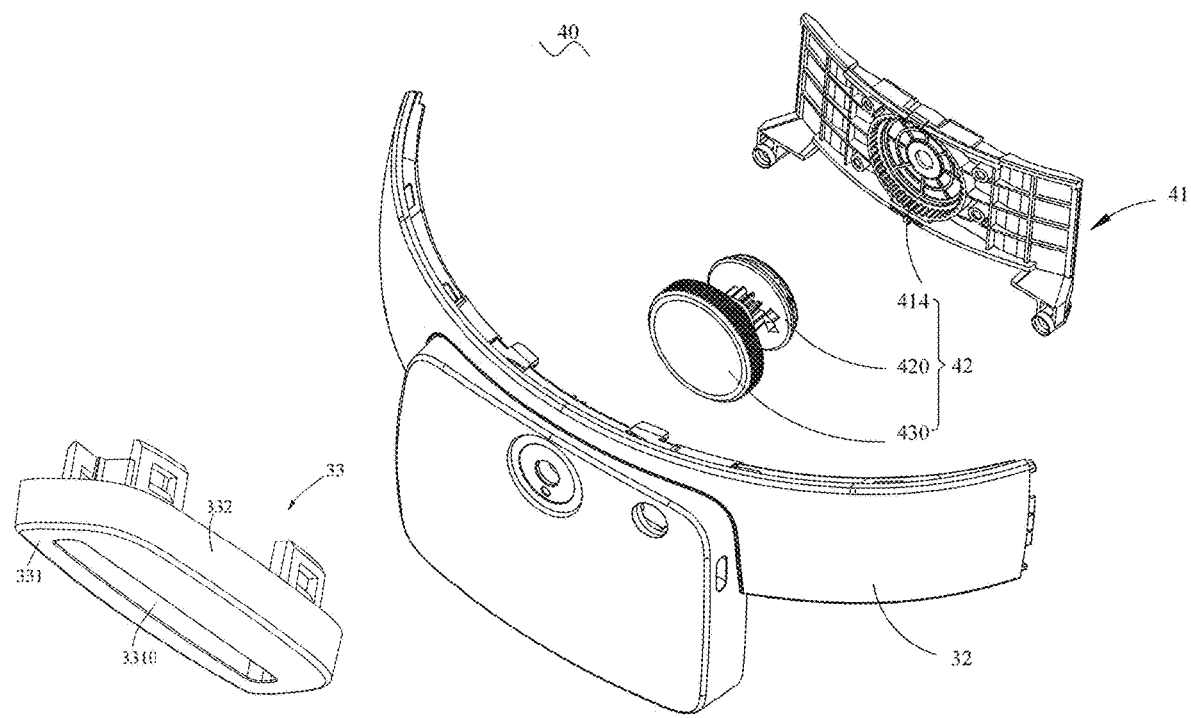
FIG. 40 is a perspective view of a connection member in FIG. 34.
FIG. 41 is an exploded perspective view of a tightness adjustment mechanism.

As shown in FIG. 34 and FIG. 40, the connector 33 may include a connector body 331 and a side wall 332 extending from an edge of the connector body 331.

As shown in FIG. 34 and FIG. 40, the connector body 331 may substantially be rectangular, having rounded corners. The connector body 331 and four side walls 332 cooperatively define a housing cavity 333. The connector body 331 may define a through hole 3310 for the lacing assembly 20 to extend through. The connector body 331 is arranged with a buckling member 3313, and the buckling member 3313 may be received in the housing cavity 333. The buckling member 3313 may be buckled to the third buckling member 3113 of the first channel housing 311 and the third buckling member 3213 of the second channel housing 321. In detail, the buckling member 3313 may include a slot 3315 corresponding to the protrusion 3114 of the third buckling member 3113, another slot 3315 corresponding to the protrusion 3214 of the third buckling member 3213, a buckling tab 3314 corresponding to the bump 3115 of the third buckling member 3113, and another buckling tab 3314 corresponding to the bump 3215 of the third buckling member 3213.

When the bottom front housing 31 and the bottom rear housing 32 are buckled, the body 3110 of the first channel housing 311 and the body 3210 of the second channel housing 321 may cooperatively define the channel to receive the lacing assembly 20. When the first power supply housing 312 and the second power supply housing 322 are engaged, a space defined above the partition plate 3222 may be referred to as a first receiving cavity, and a space defined below the partition plate 3222 may be referred to as a second receiving cavity. The first receiving cavity may be communicated with the channel, serving as a first channel. As mentioned above, the first channel housing 311 may be buckled with the second channel housing 321 to cooperatively define a channel for the lacing assembly 20 to extend through. The channel may be referred to as a third receiving cavity. One third receiving cavity is at the right side of the first receiving cavity. Another receiving cavity is at a left side of the first receiving cavity. In addition to receiving the first head band 21 and the second head band 22 overlapping with the first head band 21, the first receiving cavity may further receive the tightness adjustment mechanism 40 to adjust a length of an overlapping portion between the first head band 21 and the second head band 22. Therefore, a solid portion that defines the channel and the first receiving cavity may be referred to as a housing (may be referred to as a first housing) of the head band and the tightness adjustment mechanism. The second receiving cavity may be defined to receive the power supply, such as the battery 35, and may be referred to as a power supply housing (may be referred to as a second housing).

It should be understood that, when the bottom front housing 31 and bottom rear housing 32 are engaged, the first power supply housing 312, the second power supply housing 322, and the body 3110 of the first channel housing 311 may be referred to as the first housing. A portion of the first channel housing 311 and the second channel housing 321 disposed on two sides of the first housing may be referred to as the second housing.

The above terms, such as the channel, the receiving cavity, the first receiving cavity, the second receiving cavity, the first housing, the second housing, the housing of the head band and the tightness adjustment mechanism, the power supply housing, may be adjusted according to actual situations. The present disclosure does not limit the above terms. According to actual situations, terms of similar structures may be interchangeable. For example, the channel may also be named as the first receiving cavity, and in this case, the previous first receiving cavity may be named as the second receiving cavity, and the previous second receiving cavity may be named as the third receiving cavity. Terms of the first housing and the second housing may also be interchanged.

The Tightness Adjustment Mechanism 40

As shown in FIG. 41, an exploded view of the tightness adjustment mechanism 40 according to an embodiment of the present disclosure is shown. The tightness adjustment mechanism 40 may include a first housing 41, a second housing engaging with the first housing 41 (in this case, the second housing may be the bottom rear housing 32 of the second housing assembly 30 described in the above. The bottom rear housing may be a shared element of the tightness adjustment mechanism 40 and the second housing assembly 30), and a ratchet pawl mechanism 42. The first housing 41 and the second housing may be engaged to form a cassette. A body portion of the ratchet pawl mechanism 42 may be received in the cassette. The two head bands (i.e., the first head band 21 and the second head band 22) of the lacing assembly 20 may be overlappingly connected to each other, further connecting to the ratchet pawl mechanism 42. The ratchet pawl mechanism 42 may adjust a length of the overlapping portion between the first head band 21 and the second head band 22. In this case, the second housing is not a necessary component. The ratchet pawl mechanism 42 may be mounted to the first housing 41 only, serving as the tightness adjustment mechanism 40.

The First Housing 41 of the Tightness Adjustment Mechanism 40

Figure 42:
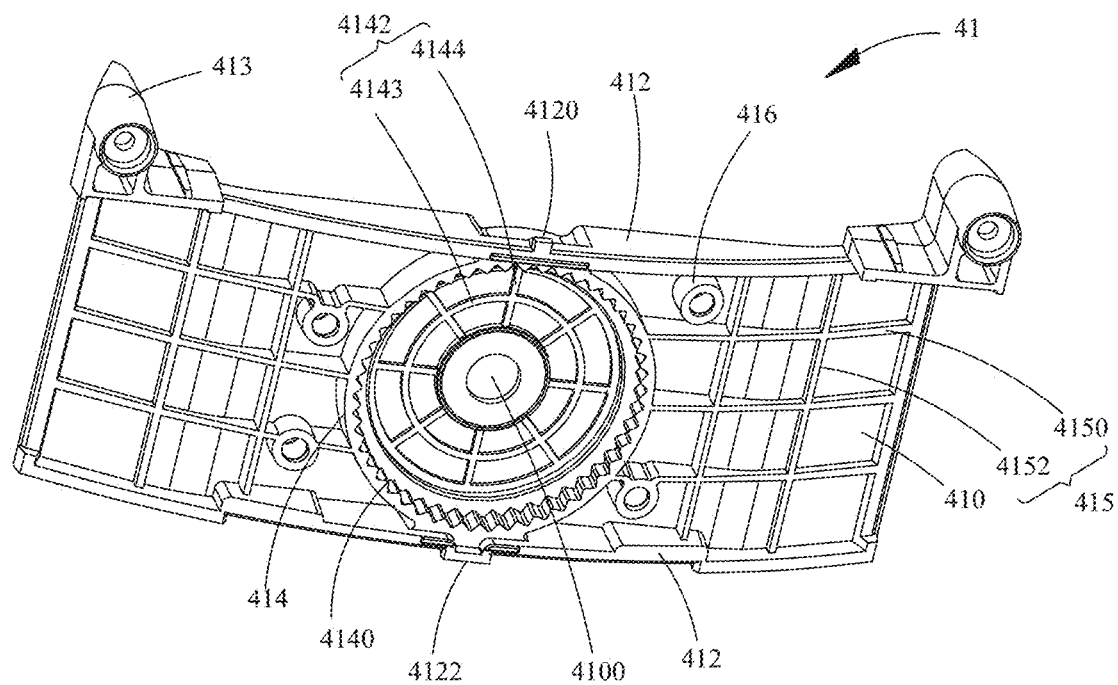
FIG. 42 is a perspective view of the first housing in FIG. 41.

As shown in FIG. 42, a perspective view of the first housing 41 from another view angle is shown. The first housing 41 may include a bottom plate 410. The bottom plate 410 may be a rectangular plate having a uniform thickness. A center of the bottom plate 410 may define a central hole 4100. The bottom plate 410 may be referred as a mounting plate for mounting the ratchet pawl mechanism 42.

Two side plates 412 may be arranged on two opposite long sides of the bottom plate 410, extending towards the second housing (i.e., the bottom rear housing 32). A height of each of the two side plates 412 is gradually decreased from a middle to two sides, such that a surface of the side plate 412 facing the second housing is curved, enabling the side plate to tightly contact the second housing. A first mounting portion 413 may be arranged on each of two ends of one of the two side plates 412. The first mounting portion 413 may face the second housing and may be column shaped. The first mounting portion 413 may be arranged with internal threads, such that a bolt may be applied to extend through the first mounting portion 413 to fix the first housing 41 to the bottom rear housing 32. The side plate 412 arranged with the first mounting portion 413 may further be arranged with a first buckling structure 4120 at a middle of the side plate 412. In one embodiment, the first buckling structure 4120 may include a recess and a bump disposed above the recess, such that the bump may be placed on the carrying rib 3228b to support the first housing 41 when the first housing 41 is fixed to the bottom rear housing 32. The other side plate 412 without the first mounting portion 413 may be arranged with a second buckling structure 4122. In one embodiment, the second buckling structure 4122 may include three recesses spaced apart from each other and a bump disposed above a middle recess of the three recesses, such that each hook 3217 on the bottom rear housing 32 may be buckled with one of the three recesses. In this way, the first housing 41 is fixed to the bottom rear housing 32.

A ring-shaped ratchet 414, reinforcing ribs 415, and second mounting portions 416 may be arranged on a surface of the bottom plate 410 facing the second housing (i.e., the bottom rear housing 32). The reinforcing ribs 415 may be disposed around the ratchet 414. The second mounting portions 416 may be distributed at a periphery of the ratchet 414.

An inner wall of the ratchet 414 is arranged with internal teeth 4140. The central hole 4100 may be coaxial with the ratchet 414. A bottom of the ratchet 414 may be recessed away from the second housing and arranged with a rib 4142. The rib 4142 may include a plurality of circular first ribs 4143 and a plurality of strip-shaped second ribs 4144. The plurality of circular first ribs 4143 are coaxial with the central hole 4100. The plurality of strip-shaped second ribs 4144 intersect with the first ribs 4143 and extend from a center of the central hole 4100 towards various directions.

The reinforcing ribs 415 may include a plurality of first reinforcing ribs 4150 and a plurality of second reinforcing ribs 4152. The plurality of first reinforcing ribs 4150 may extend from an outer peripheral wall of the ratchet wheel 414 and may be parallel to each other. The plurality of second reinforcing ribs 4152 may intersect with the plurality of first reinforcing ribs 4150 and may be parallel to each other. The plurality of first reinforcing ribs 4150 extend from the outer peripheral wall of the ratchet 414 to edges of two relatively short sides of the bottom plate 410. A height of each of the plurality of first reinforcing ribs 4150 decreases from the outer peripheral wall of the ratchet 414 to the edges of the shorter sides of the bottom plate 410, such that an entire top surface of the plurality of first reinforcing ribs 4150 facing the second housing may be curved. In this way, when buckling with the bottom rear housing 32, the first head band 21 and the second head band 22 received in the cassette may fit with the first reinforcing ribs 4150, such that the first head band 21 and the second head band 22 may not be bent or folded. The second reinforcing ribs 4152 may be perpendicular to the first reinforcing ribs 4150, i.e. arranged to be perpendicular to the two relatively long sides of the bottom plate 410.

The Ratchet Pawl Mechanism 42 of the Tightness Adjustment Mechanism 40

As shown in FIG. 41, the ratchet pawl mechanism 42 may include the ratchet 414, a pawl assembly 420, and a knob assembly 430. The ratchet pawl mechanism 42 may be arranged on the first housing 41. The pawl assembly 420 may engage with the ratchet 414 and may be received in the ratchet 414. The knob assembly 430 may be mounted on and secured to the pawl assembly 420, may drive the pawl assembly 420 to rotate, and slidingly connected to the central hole 4100.

Figure 43:
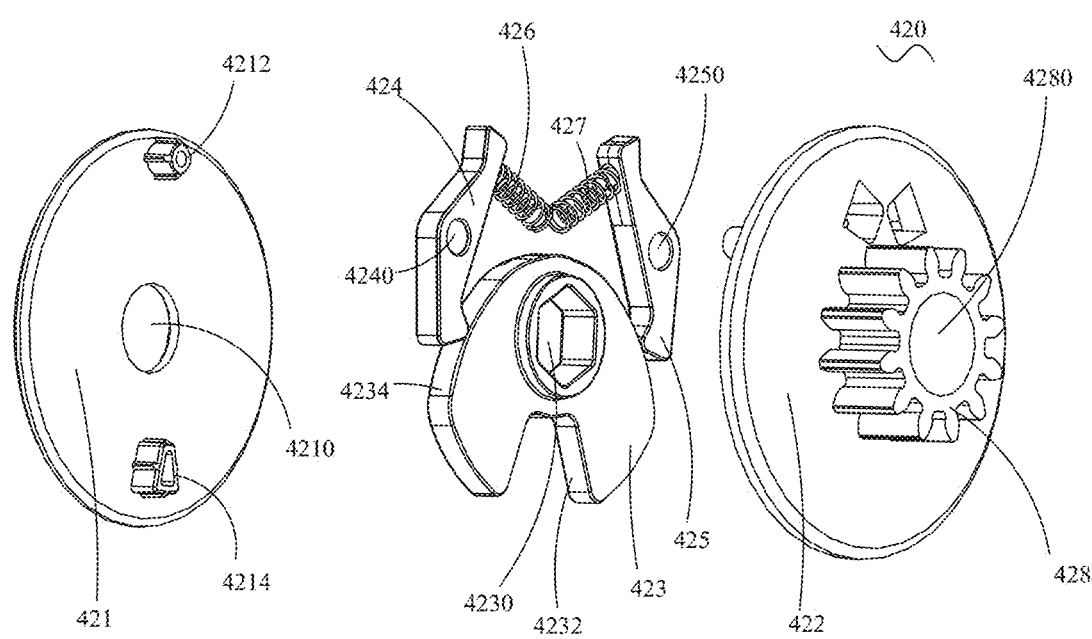
FIG. 43 is an exploded perspective view of a pawl assembly in FIG. 41.

As shown in FIG. 43, the pawl assembly 420 may include a first shielding plate 421, a second shielding plate 422, a rotating plate 423, a first pawl 424, a second pawl 425, a first spring 426, a second spring 427, and a gear 428. The second shielding plate 422 may be fixedly connected to the first shielding plate 421. The rotating plate 423 may be disposed between the first shielding plate 421 and the second shielding plate 422. The first pawl 424, the second pawl 425, the first spring 426 and the second spring 427 may be assembled on the second shielding plate 422. The gear 428 may be fixedly mounted on a side of the second shielding plate 422 away from the first shielding plate 421.

The first shielding plate 421 may be a circular plate and may define a central hole 4210 at a middle of the first shielding plate 421. The central hole 4210 may be aligned and coaxial with the central hole 4100 in the ratchet 414. A face of the first shielding plate 421 facing the second shielding plate 422 may be arranged with a first connection portion 4212 and a second connection portion 4214. The second connection portion 4214 may be column-prism shaped. The first connection portion 4212 may be cylindrical. A periphery of each of the first connection portion 4212 and the second connection portion 4214 may be arranged with stripped ribs to tightly engage with corresponding structures on the second shielding plate 422, such that the first shielding plate 421 may be fixedly connected to the second shielding plate 422.

Figure 44:
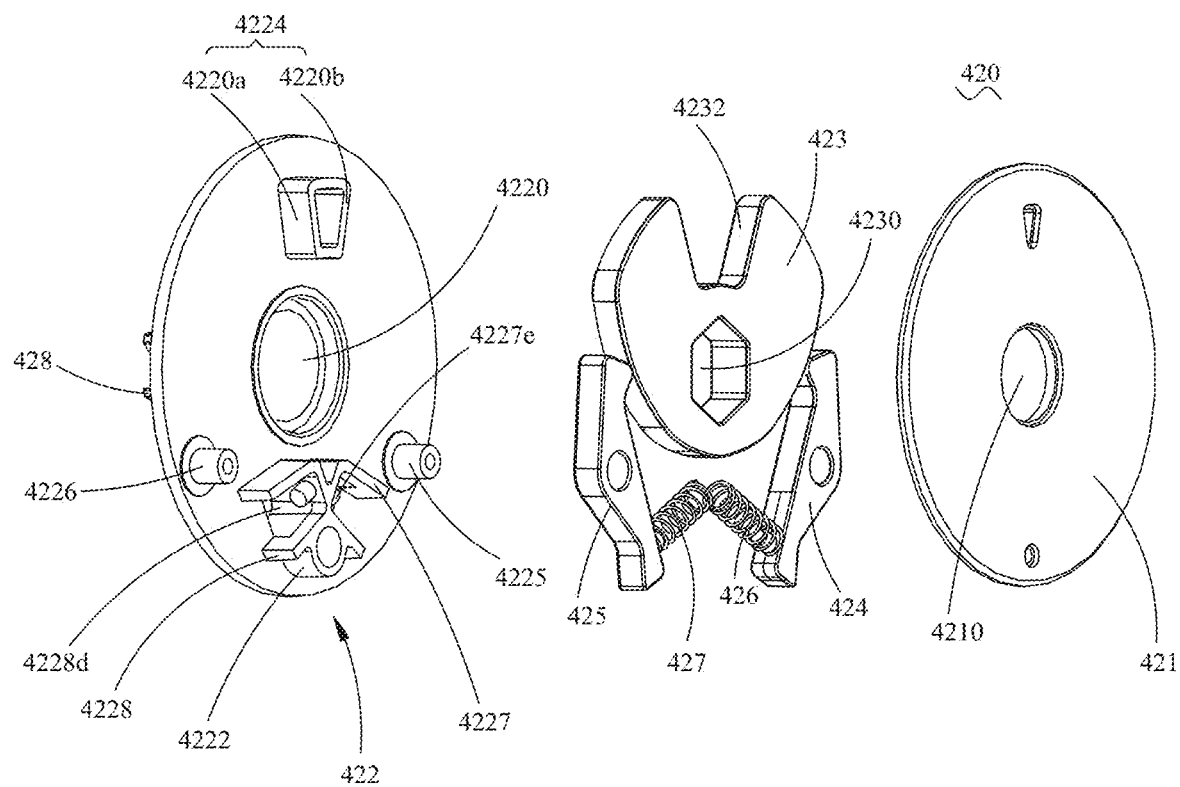
FIG. 44 is similar to FIG. 43, showing an exploded perspective view of the pawl assembly in FIG. 41 from another view angle.

As shown in FIG. 44, a shape and a size of the second shielding plate 422 may be substantially the same as a shape and a size of the first shielding plate 421. A middle portion of the second shielding plate 422 may define a central hole 4220. The central hole 4220 may be aligned with the central hole 4210 of the first shielding plate 421. A face of the second shielding plate 422 facing the first shielding plate 421 may be arranged with a first buckling portion 4222 and a second buckling portion 4224. A shape of the second buckling portion 4224 may be the same as a shape of the second connection portion 4214 of the first shielding plate 421, but a size of the second buckling portion 4224 may be the different from that of the second connection portion 4214 of the first shielding plate 421, such that the second connection portion 4214 of the first shielding plate 421 may be inserted into the second buckling portion 4224. The second buckling portion 4224 may include a first buckling wall 4220a and a second buckling wall 4220b arranged with a certain angle relative to the first buckling wall 4220a. That is, a distance between the first buckling wall 4220a and the second buckling wall 4220b may increase gradually in a direction from the central hole 4220 outwardly. A shape of the first bucking portion 4222 may be the same as a shape of the first connection portion 4212 of the first shielding plate 421, but a size of the first bucking portion 4222 may be the different from that of the first connection portion 4212 of the first shielding plate 421, such that the first connection portion 4212 of the first shielding plate 421 may be inserted into the first buckling portion 4222. The side of the second shielding plate 422 facing the first shielding plate 421 may further be arranged with a first mounting shaft 4225, a second mounting shaft 4226, a first mounting frame 4227, and a second mounting frame 4228. The first mounting shaft 4225 may be configured for mounting the first pawl 424. The second mounting shaft 4226 may be configured for mounting the second pawl 425. The first mounting frame 4227 may be configured for mounting the first spring 426. The second mounting frame 4228 may be configured for mounting the second spring 427.

The first shielding plate 421 and the second shielding plate 422 may also be used as a mounting member. The second buckling portion 4224 and the second connection portion 4214 may serve as a restriction portion to engage with the rotating plate 423, or serve as a fixing portion to fix the first shielding plate 421 with the second shielding plate 422. The first buckling portion 4222 and the first connection portion 4212 may serve as another fixing portion to fix the first shielding plate 421 with the second shielding plate 422.

The mounting member may not be limited to an assembly of the first shielding plate 421 and the second shielding plate 422. Any component that allows the first pawl 424 and the second pawl 425 to contact and engage with the ratchet 414 may be taken as the mounting member. That is, the mounting member may define a notch or any structure similar to the notch, enabling the first pawl 424 and the second pawl 425 to extend out of a space defined by the mounting member to contact the ratchet 414. Therefore, the mounting member may be a cassette having a notch or a structure similar to the notch.

Of course, the mounting member may be only the first shielding plate 421 or only the second shielding plate 422. For example, the mounting member is the second shielding plate 422, and the second buckling portion 4224 and the second connection portion 4214 may be formed on the first shielding plate 421 or on the second shielding plate 422, serving as the restriction portion.

The first mounting shaft 4225 and the second mounting shaft 4226 may be disposed on two sides of the first buckling portion 4222, respectively. The first mounting shaft 4225 and the second mounting shaft 4226 may be symmetrically arranged with respect to the first buckling portion 4222.

The first mounting frame 4227 and the second mounting frame 4228 may be disposed symmetrically with respect to the first buckling portion 4222. A shape, configuration, and a size of first mounting frame 4227 may be the same as those of the second mounting frame 4228.

Figure 45:
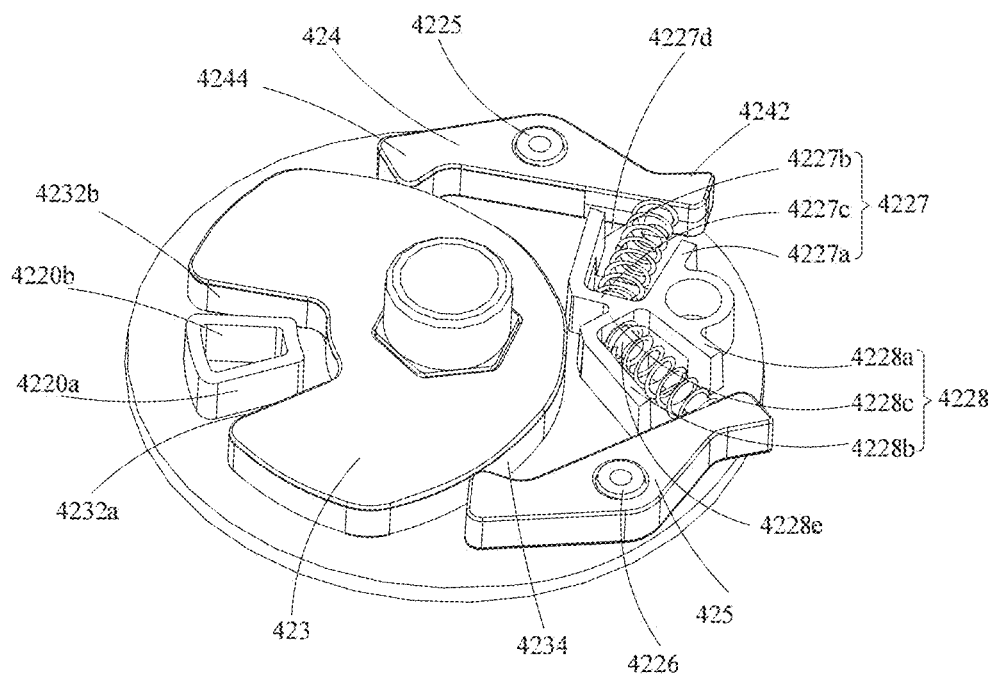
FIG. 45 is a perspective view of a portion of FIG. 44.

As shown in FIGS. 44 and 45, the first mounting frame 4227 may include a first retaining wall 4227a, a second retaining wall 4227b, and a connecting wall 4227c. The second retaining wall 4227b may be arranged at a certain angle relative to the first retaining wall 4227a. The connecting wall 4227c may connect an end of the first retaining wall 4227a to an end of the second retaining wall 4227b. The first retaining wall 4227a, the second retaining wall 4227b, and the connecting wall 4227c cooperatively define a receiving space 4227d to receive the first spring 426. The first retaining wall 4227a may extend from the outer peripheral wall of the first buckling portion 4222. A side of the connecting wall 4227c facing the receiving space 4227d may be arranged with a buckling shaft 4227e. The first spring 426 sleeves the buckling shaft 4227e.

Since the configuration of the second mounting frame 4228 may be the same as that of the first mounting frame 4227, the configuration of the second mounting frame 4228 may not be described in detail herein, and only elements are listed. The second mounting frame 4228 may include a first retaining wall 4228a, a second retaining wall 4228b, a connecting wall 4228c, a receiving space 4228d, and a buckling shaft 4228e. The first retaining wall 4227a of the first mounting frame 4227 is connected to the first retaining wall 4228a of the second mounting frame 4228, and an end of the connecting wall 4227c may be connected to an end of the connecting wall 4228c.

To be noted that the first spring 426 and the second spring 427 may also be other elastic members, such as tension springs, compression springs, objects providing extending and retracting forces, and so on. In this way, the first pawl 424 and the second pawl 425 may be engaged with the ratchet 414 to achieve switching between a buckled state and a non-buckled state. The corresponding first mounting frame 4227 and the second mounting frame 4228 may be replaced, depending on the elastic member, by other structures that can fix the elastic members The rotating plate 423 may be an eccentric wheel structure, having a through hole 4230. Of course, the rotating plate 423 and the knob assembly 430 may be an integral structure at the through hole 4230. The through hole 4230 may be aligned and coaxial with the central hole 4220 of the second shielding plate 422. In an embodiment, an inner surface of the through hole 4230 may be polygonal, such as hexagonal. An end of the rotating plate 423 away from the through hole 4230 may define a notch 4232. A shape of the notch 4232 may be the same as a shape of the first buckling portion 4222 of the second shielding plate 422, but a size of the notch 4232 may be the different from that of the first buckling portion 4222 of the second shielding plate 422. The size of the notch 4232 may be greater than the size of the first buckling portion 4222, such that the first buckling portion 4222 may be received in the notch 4232. In the present embodiment, the second buckling portion 4224 and the second connection portion 4214 serve as a restriction portion to engage in the notch 4232. The notch 4232 has two opposite inner walls, a first inner wall 4232a and a second inner wall 4232b opposite to the first inner wall 4232a. A circumferential surface of the rotating plate 423 includes an outer wall surface 4234. When the rotating plate 423 rotates around an axis of the through hole 4230, only three states exist between the rotating plate 423 and the second buckling portion 4224. In a first state, only the first inner wall 4232a contacts the first buckling wall 4220a. In a second state, the rotating plate 423 has no contact with the second buckling portion 4224. In a third state, only the second inner wall 4232b contacts the second buckling wall 4220b. That is, the restriction portion is configured to contact the inner wall of the notch 4232 or have no contact with the inner wall of the notch 4232, such that the rotating plate 423 rotates around a rotation axis (the axis of the through hole 4230) by a certain angle.

Figure 46:
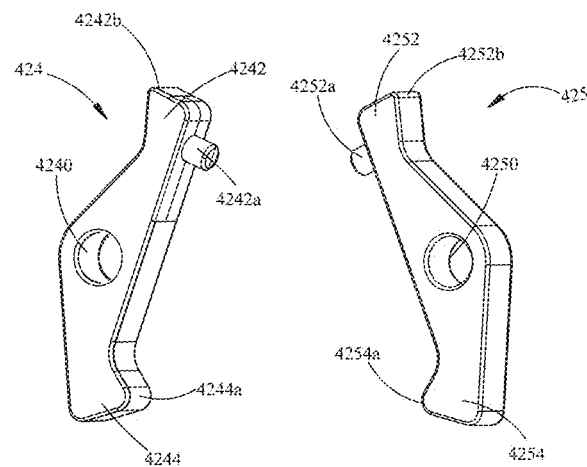
FIG. 46 is a perspective view of two pawls in FIG. 45.
Figure 47:
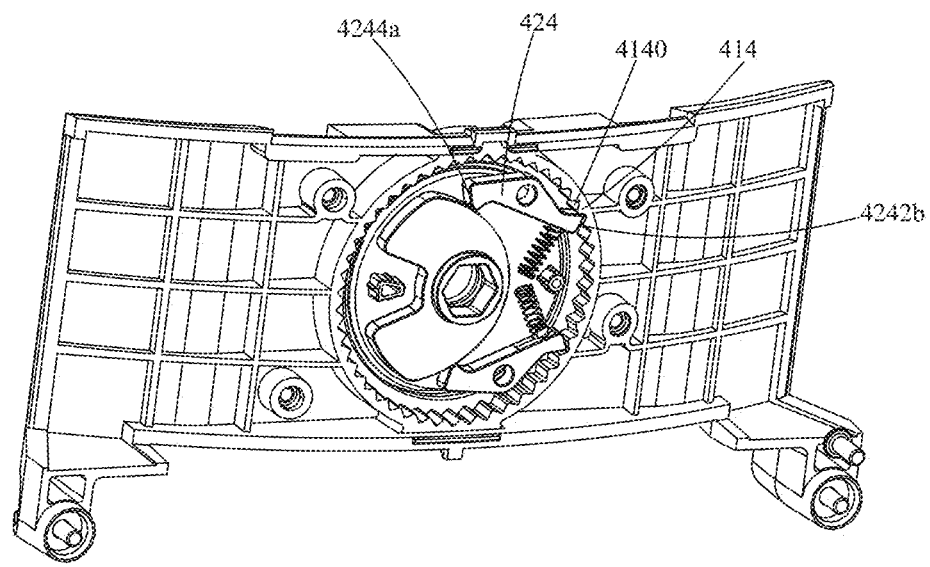
FIG. 47 is a perspective view of a portion of components of the pawl assembly and the first housing shown in FIG. 41.

As shown in FIGS. 44 to 46, the first pawl 424 may be pivotally mounted on and rotatable around the first mounting shaft 4225 arranged on the second shielding plate 422. A middle portion of the first pawl 424 may define a pivot hole 4240, such that the first mounting shaft 4225 may be pivotally received in the pivot hole 4240. The first pawl 424 has two opposite ends: a first end 4242 connected to the first spring 426 and a second end 4244 abutting against the outer wall surface 4234 of the rotating plate 423. A side of the first end 4242 facing the receiving space 4227d of the first mounting frame 4227 may be arranged with a mounting shaft 4242a, and the first spring 426 may sleeve the mounting shaft 4242a. A side of the first end 4242 away from the first mounting frame 4227 has a corner 4242b, and the corner 4242b may be configured to engage with the inner teeth 4140 of the ratchet 414 (see FIG. 47). A side of the second end 4244 facing the rotating plate 423 has a contact surface 4244a. In an embodiment, the contact surface 4244a may be curved, taking a line to contact the outer wall surface 4234 of the rotating plate 423, such that a pressure between the contact surface 4244a and the rotating plate 423 may be reduced.

The second pawl 425 and the first pawl 424 may be symmetrically disposed relative to the first buckling portion 4222. A shape and configuration of the second pawl 425 may be the same as those of the first pawl 424, and the present disclosure will not describe the second pawl 425 in detail, but will list components of the second pawl 425. The second pawl 425 may define a pivot hole 4250 and may include a first end 4252, a second end 4254, a mounting shaft 4252a, a corner 4252b, and a contact surface 4254a.

When mounting the first spring 426, an end of the first spring 426 may sleeve the buckling shaft 4227e in the first mounting frame 4227, and the other end of the first spring 426 may sleeve the mounting shaft 4242a of the first pawl 424. In this way, the first spring 426 may be mounted inside the first mounting frame 4227, and the first pawl 424 may rotate around the first mounting shaft 4225. When the first pawl 424 is rotating, the first pawl 424 may drive the first end 4242 of the first pawl 424 to move, pushing the first spring 426, such that the first spring 426 may be compressed in various extent in the first mounting frame 4227.

Configuration and functions of the second spring 427 may be the same as those of the first spring 426. The second spring 427 may be mounted in the second mounting frame 4228, and will not be repeatedly described here.

The outer wall surface 4234 of the rotating plate 423 may be curved. The outer wall surface 4234 may be configured as follows. When the rotating plate 423 rotates around the rotation axis, the outer wall surface 4234 may drive the first pawl 424 and the second pawl 425 to rotate, such that a state of the first pawl 424 and the second pawl 425 engaged with the ratchet 414 and a state of the first pawl 424 and the second pawl 425 unengaged with the ratchet 414 may be inter-switched. As shown in FIG. 45, no external force is applied to force the rotating plate 423 or the mounting member (combination of the first shielding plate 421 and the second shielding plate 422) to rotate. Due to actions of the first spring 426 and the second spring 427, when the rotating plate 423 does not contact the outer surface of the restriction portion (i.e., the outer surface of the second buckling portion 4224), the pawl assembly 420 may be buckled with the ratchet 414. When the external force is applied to drive the rotating plate 423 to rotate around the axis of the through hole 4230, two following states may occur.

(1) the state of the rotating plate 423 having no contact with the second buckling portion 4224 may be switched into the state of only the first inner wall 4232a contacting the first buckling wall 4220a. In this case, in a direction of the rotating plate 423 rotating around the through hole 4230, a distance from a contact position between the first pawl 424 and the outer wall surface 4234 to the through hole 4230 may gradually increase, allowing the first end 4242 of the first pawl 424 to move and allowing the first end 4242 to be disengaged with the inner teeth 4140 of the inner wall of the ratchet 414. A distance from a contact position between the second pawl 425 and the outer wall surface 4234 to the through hole 4230 may gradually decrease, and the ratchet 414 compresses the second spring 427 of the second pawl 425, such that the second pawl 425 may be unbuckled with the inner teeth 4140 of the inner wall of the ratchet 414. Finally, the pawl assembly 420 is disengaged from the ratchet 414.

(2) the state of the rotating plate 423 having no contact with the second buckling portion 4224 may be switched into the state of only the second inner wall 4232b contacting the second buckling wall 4220b. In this case, in the direction of the rotating plate 423 rotating around the through hole 4230, the distance from the contact position between the second pawl 425 and the outer wall surface 4234 to the through hole 4230 may gradually increase, such that the second end 4254 of the second pawl 425 may move, and the second end 4254 may be disengaged with the inner teeth 4140 of the inner wall of the ratchet 414. The distance from the contact position between the first pawl 424 and the outer wall surface 4234 to the through hole 4230 may gradually decrease, and the ratchet 414 may compress the first spring 426 of the first pawl 424, such that the first pawl 424 may be disengaged with the inner teeth 4140 of the inner wall of the ratchet 414. Finally, the pawl assembly 420 is disengaged from the ratchet 414.

As shown in FIG. 43, the gear 428 has a central hole 4280. The central hole 4280 may be aligned and coaxial with the central hole 4220 of the second shielding plate 422. The gear 428 may be fixed on a side of the second shielding plate 422 away from the first shielding plate 421.

Figure 48:
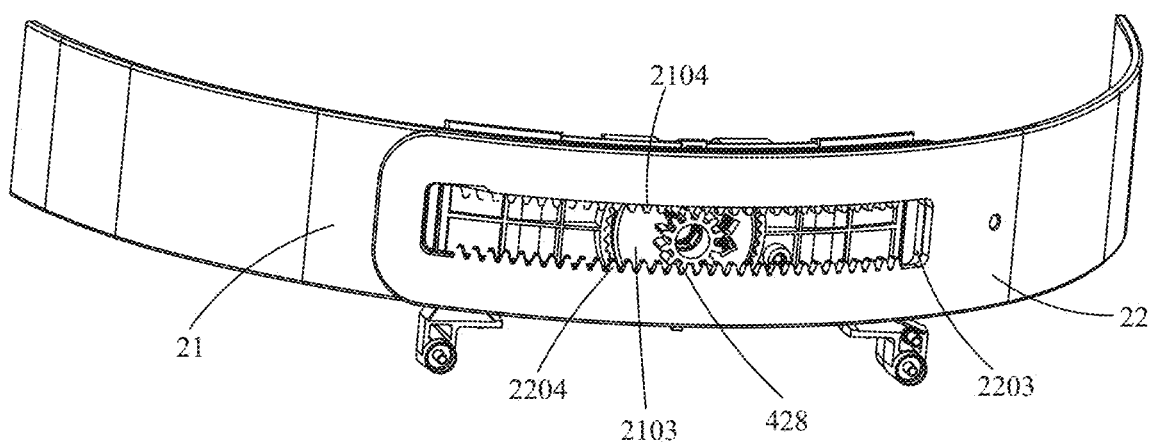
FIG. 48 is a perspective view of the lacing assembly and a portion of the tightness adjustment mechanism.

As shown in FIG. 48, when the lacing assembly 20 is connected to the tightness adjustment mechanism 40, the end of the first head band 21 that defines the length adjustment hole 2103 may overlap with the end of the second head band 22 that defines the length adjustment hole 2203. In this case, the first sawtooth wave 2104 and the second sawtooth wave 2204 may be received in the two overlapped length adjustment holes 2103 and 2203, and may be disposed on two opposite sides of the overlapped length adjustment holes. The gear 428 may be received in the two overlapped length adjustment holes 2103 and 2203, and may engage with the first sawtooth wave 2104 and the second sawtooth wave 2204.

Figures 49, 50:
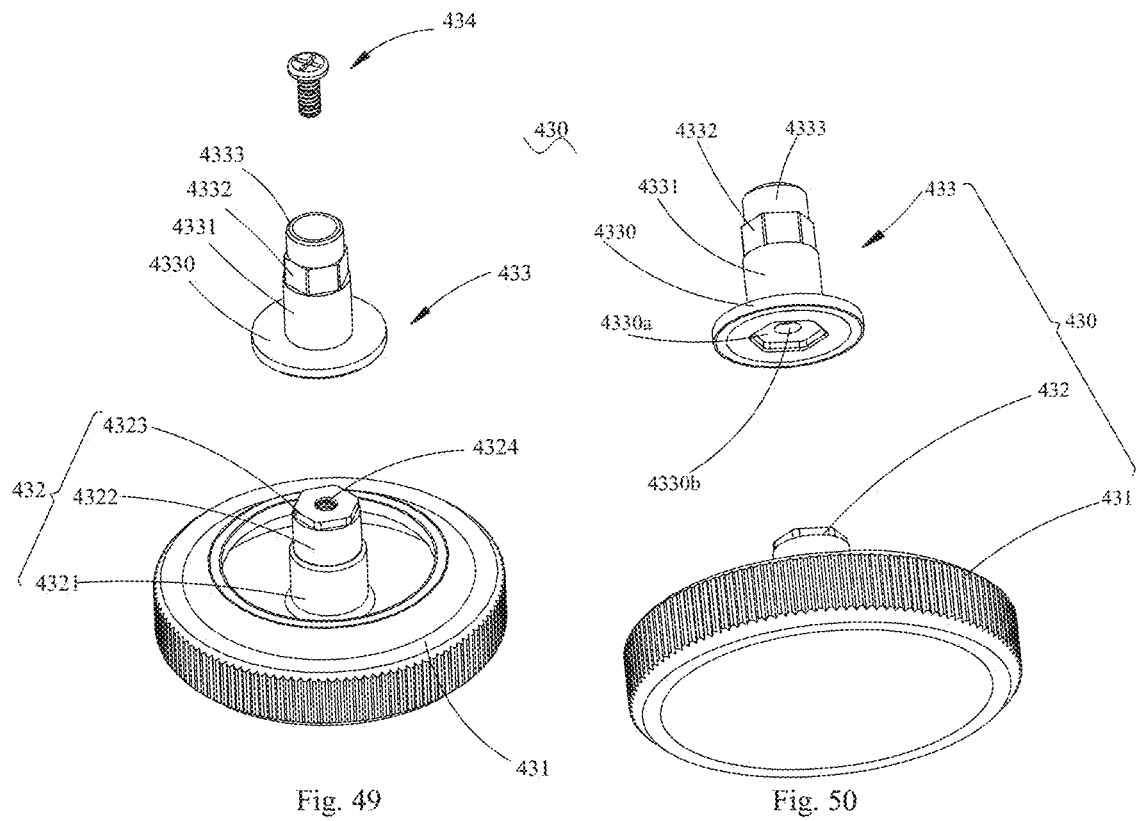
FIG. 49 is an exploded perspective view of a knob assembly in FIG. 41.
FIG. 50 is similar to FIG. 49, showing an exploded perspective view of the knob assembly in FIG. 41 from another view angle.

As shown in FIG. 49 and FIG. 50, the knob assembly 430 may include a rotating disk 431, a first drive shaft 432, and a second drive shaft 433. The first drive shaft 432 may extend from an inner surface of the rotating disk 431. The second drive shaft 433 may be mounted on the first drive shaft 432.

A side surface of the rotating disk 431 may be rough. In an embodiment, the outer surface of the rotating disk 431 may define a plurality of recesses. The plurality of recesses may be parallel to each other, and a convex rib may be formed between two adjacent recesses.

The first drive shaft 432 and the second shielding plate 422 may have a same central axis. The first rotation shaft 432 may include a first connection shaft 4321, a second connection shaft 4322 and a third connection shaft 4323. The first connection shaft 4321, the second connection shaft 4322, and the third connection shaft 4323 may be coaxial and may be arranged in sequence along a direction approaching the central axis of the second shielding plate 422. Each of the first connection shaft 4321 and the second connection shaft 4322 may be a circular shaft, that is, an outer circumferential surface of the shaft may be circular. An outer diameter of the first connection shaft 4321 may be greater than an outer diameter of the second connection shaft 4322. An outer circumferential surface of the third connection shaft 4323 may be polygonal. In an embodiment, the outer circumferential surface of the third connection shaft 4323 may be hexagonal. A distance between a center of the hexagon and any one of six sides of the hexagonal may be less than a radius of the second connection shaft 4322. A center of the third connection shaft 4323 may define a central hole 4324, and internal threads may be arranged on a wall of the central hole 4324

The second drive shaft 433 and the first drive shaft 432 may have a same central axis. The second drive shaft 433 includes a disk 4330, a first connection shaft 4331, a second connection shaft 4332, and a third connection shaft 4333. The disk 4330, the first connection shaft 4331, the second connection shaft 4332, and the third connection shaft 4333 may be coaxial and may be arranged in sequence along a direction away from the axis of the rotating disk 431. The first connection shaft 4331 may be connected to the disk 4330. The second connection shaft 4332 may be connected to the first connecting shaft 4331. The third connection shaft 4333 may be connected to the second connecting shaft 4332.

An outer diameter of the disk 4330 may be greater than an outer diameter of the first connection shaft 4331 and greater than an outer diameter of the gear 428. A bottom of the disk 4330 may define a recess 4330a. A middle portion of a bottom wall of the recess 4330a may define a through hole 4330b. An inner wall of the recess 4330a may be polygonal. In an embodiment, the inner wall of the recess 4330a may be hexagonal, such that the third connection shaft 4323 of the first drive shaft 432 may be engaged into the recess 4330a. When the gear 428 is received in the second length adjustment holes 2103 and 2203 of the overlapped portion of the first head band 21 and the second head band 22, the disk 4330 may engage with the gear 428 and the second shielding plate 422 to restrict positions of the first head band 21 and the second head band 22, preventing the first head band 21 and the second head band 22 from being disengaged with the gear 428.

Each of the first connection shaft 4331 and the third connection shaft 4333 may be a circular shaft, that is, an outer circumferential surface may be circular. An outer diameter of the first connection shaft 4331 may be greater than an outer diameter of the third connection shaft 4333. The outer circumferential surface of the second connection shaft 4332 may be polygonal. In an embodiment, outer circumferential surface of the second connection shaft 4332 may be hexagonal. A distance between a center of the hexagon and any one of six sides of the hexagonal may be less than a radius of the first connection shaft 4331 and greater than a radius of the third connection shaft 4333. A shape and dimensions of the second connection shaft 4332 may match with a shape and dimensions of the through hole 4230 of the rotating plate 423, such that the rotating plate 423 may be fixedly connected to the second connection shaft 4332.

When assembling the lacing assembly 20, the second housing assembly 30, and the tightness adjustment mechanism 40, the lacing assembly 20 may be firstly assembled. Each of the first head band 21 and the second head band 22 of the lacing assembly 20 may extend through the through hole 3310 of one connector 33. At the same time, the first drive shaft 432 of the rotating disk 431 may extend through the perforated tab 3220a from a rear of the bottom rear housing 32. Subsequently, the disk 4330 may be mounted on the third connection shaft 4323. In this way, the second drive shaft 433 may be engaged with the first drive shaft 432. A screw 434 may extend through the through hole 4330b in the bottom of the disk 4330 and threadedly connect to the center hole 4324 of the third connection shaft 4323 of the first drive shaft 432, such that the second drive shaft 433 may be stably connected to the first drive shaft 432.

A portion of the first head band 21 that defines the length adjustment hole 2103 may overlap with a portion of the second head band 22 that defines the length adjustment hole 2203. The gear 428 may be placed inside the length adjustment hole 2103 and the length adjustment hole 2203. The second drive shaft 433 may extend through the gear 428, the central hole 4210 and the central hole 4220 of the second shielding plate 422. The first pawl 424, the second pawl 425, the first spring 426, the second spring 427, and the rotating plate 423 may be mounted on the second shielding plate 422. For example, the third connection shaft 4333 of second drive shaft 433 may extend through the rotating plate 423, allowing the rotating plate 423 to sleeve the second connection shaft 4332. In this way, the rotating plate 423 may be fixedly arranged relative to the first rotation shaft 432 and the second rotation shaft 433, and at the same time, the second buckling portion 4224 on second shielding plate 422 may be received in the notch 4232 of the rotating plate 423. The first end 4242 of the first pawl 424 and the first end 4252 of the second pawl 425 may contact the outer wall surface 4234 of the rotating plate 423.

Figure 51:
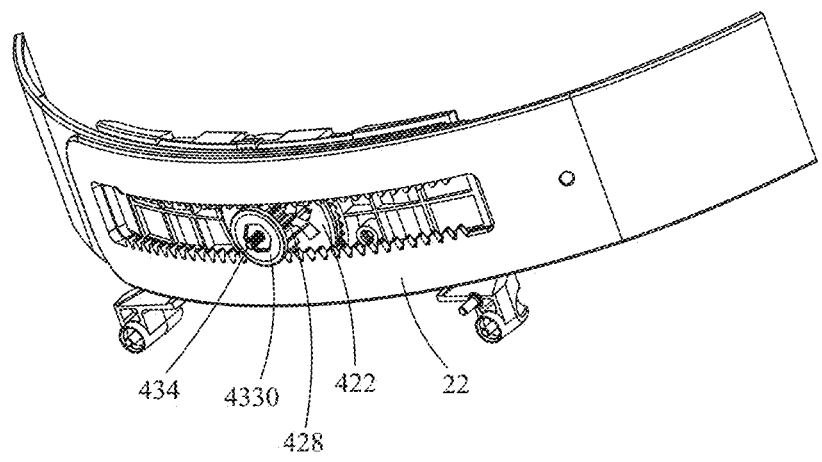
FIG. 51 is similar to FIG. 48, showing a perspective view of the lacing assembly and a portion of the tightness adjustment mechanism.

The first shielding plate 421 may be buckled to the second shielding plate 422. The first connection portion 4212 of the first shielding plate 421 may be buckled with the first buckling portion 4222 of the second shielding plate 422. In this way, the first shielding plate 421 may be assembled with the second drive shaft 433, and at the same time, the first shielding plate 421 may be fixed relative to the second shielding plate 422. That is, the first shielding plate 421 and the second shielding plate 422 may simultaneously radially rotate relative to the second drive shaft 433. The first pawl 424, the second pawl 425, the first spring 426, the second spring 427 and the rotating plate 423 may be fixed between the first shielding plate 421 and the second shielding plate 422. The pawl assembly 420 may be received in the ratchet 414, and the third connection shaft 4333 of the second drive shaft 433 may extend into and engaged with the central hole 4100 of the ratchet 414. The first housing 41 may be buckled with the bottom rear housing 32. At this time, the bottom of the gear 428 may abut against the disk 4330. The disk 4330 may compress and limit positions of the first head band 21 and the second head band 22 (as shown in FIG. 51). The bump of the first buckling structure 4120 may be placed on the carrying rib 3228b to support the first housing 41. The second buckling structure 4122 may be buckled with and fixed to the hook 3217 on the bottom rear housing 32, and a screw is taken to fix the first mounting portion 413 to the bottom rear housing 32. In this way, the first head band 21 and the second head band 22 may be fixedly arranged inside the tightness adjustment mechanism 40. Assembly of the lacing assembly 20 and the tightness adjustment mechanism 40 may be completed.

The buckling portion 3245 of the power supply bracket 324 may be buckled to a corresponding opening 3228a of the carrying portion 3228. The buckling structure 3246 of the power supply bracket 324 may be buckled to a corresponding buckling structure 3224 on the side wall 3221. The battery pad 3243 may be disposed on the power supply bracket 324 for the battery 35 to be placed. The bottom front housing 31 and the bottom rear housing 32 may be assembled. The first buckling member 3216 on the bottom rear housing 32 may be buckled to a corresponding first buckling member 3116 on the first channel housing 311. The second buckling member 3223 on the bottom rear housing 32 may be buckled to a corresponding second buckling member 3123 on the convex edge 3121. Subsequently, two connectors 33 may be mounted. The buckling member 3313 of the connector 33 may be buckled to the third buckling member 3113 of the bottom front housing 31 and the third buckling member 3213 of the bottom rear housing 32. In this way, the bottom front housing 31 and bottom rear housing 32 may be fixed. Assembly of the lacing assembly 20 with the second housing assembly 30 and the tightness adjustment mechanism 40 may be completed.

While adjusting the lacing assembly 20, as shown in FIG. 45, in an initial state, the first spring 426 raises the first pawl 424, such that the first end 4242 may be buckled with the inner teeth 4140 of the ratchet 414; and the second spring 427 raises the second pawl 425, such that the first end 4252 may be buckled with the inner teeth 4140 of the ratchet 414. At this moment, the first pawl 424 and the second pawl 425 may contact the rotating plate 423, such that the rotating plate 423 does not contact the second buckling portion 4224. The lacing assembly 20 may apply a force on the mounting member, such that when the mounting member rotates in either direction, one pawl may be buckled with the inner teeth 4140 of the ratchet 414. In this way, the restriction portion of the mounting member cannot directly contact the rotating plate 423, forcing the first shielding plate 421 to be unable to perform rotation, such that the head band assembly 20 may be buckled, preventing the lacing assembly 20 from being loose.

When taking the knob assembly 430 to adjust the length of the lacing assembly 20, the knob assembly 430 drives the rotating plate 423 to rotate, such that the state of no contact between the rotating plate 423 and the second buckling portion 4224 may be switched to the state of only the first inner wall 4232a contacting the first buckling wall 4220a or to the state of only the second inner wall 4232b contacting the second buckling wall 4220b. In either state, the pawl assembly 420 may be disengage from the ratchet 414, driving the first shielding plate 421 to rotate, and tightness of the lacing assembly 20 may be adjusted by the gear 428.

It should be understood that the first housing 41 may also be the bottom front housing 31 of the second housing assembly 30. The ratchet 414 may be formed on the body 3110, and the central hole 4100 may be defined in the body 3110. The ratchet pawl mechanism 42 may engage with the ratchet 414. In addition, when the first head band 21 and the second head band 22 are overlappingly connected to the tightness adjustment mechanism 40, and when the tightness adjustment mechanism 40 adjusts the length of the overlapped portion of the first head band 21 and the second head band 22, a distance from the first head band 21 and the second head band 22 to the tightness adjustment mechanism 40 and a distance from the first head band 21 and the second head band 22 to the housing of the head band and the tightness adjustment mechanism may be adjusted accordingly. In the present disclosure, the bottom front housing 31 and the bottom rear housing 32 may serve as a housing of the tightness adjustment mechanism, serving as a portion of the tightness adjustment mechanism. Of course, the first housing 41 and the bottom rear housing 32 serve as the housing of the tightness adjustment mechanism.

The Force Bearing Assembly 50

As shown in FIG. 1, a perspective view of a head-mounted device 100 according to an embodiment of the present disclosure is shown. The force bearing assembly 50 may include a first force bearing member 51 and a second force bearing member 52. The first force bearing member 51 may be arranged on the first housing assembly 10. The second force bearing member 52 may be arranged on the second housing assembly 30. In the present embodiment, the first housing assembly 10, the lacing assembly 20, the second housing assembly 30, and the tightness adjustment mechanism 40 may serve as a ring-shaped frame, and tightness of the frame may be adjustable. Further, the first force bearing member 51 may be disposed on one side of the ring-shaped frame, and the second force bearing member 52 may be disposed on another side of the ring-shaped frame. For example, the first force bearing member 51 may be disposed on an upper side of the first housing assembly 10 and the second housing assembly 30, and the second force bearing member 52 may be disposed on a lower side of the first housing assembly 10 and the second housing assembly 30. The first force bearing member 51 may be inclined to a side near the second force bearing member 52. In addition, the first force bearing member 51 may be a first force bearing point, the first housing assembly 10 may be a second force bearing point, and the second force bearing member 52 may be a third force bearing point. The head-mounted device 100 may be stably supported and worn to the user by the first bearing point, the second bearing point and the third force bearing point.

It should be understood that each of the "first force bearing member" and the "second force bearing member" may also be referred to as a "force bearing member".

The First Force Bearing Member 51 of the Force Bearing Assembly 50

Figure 52:
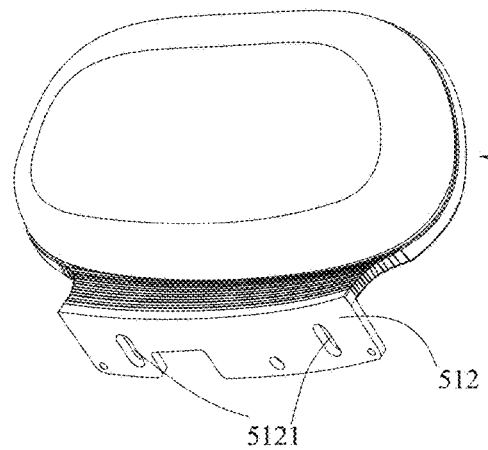
FIG. 52 is a perspective view of a first force bearing member of a force bearing assembly in FIG. 1 from another view angle.

As shown in FIGS. 2 and 52, perspective views of the first force bearing member 51 according to an embodiment of the present disclosure from two different view angles are disclosed. The first force bearing member 51 may include a support plate 511, a mounting plate 512, a neck portion 513, and a soft pad 514. The mounting plate 512 may be arranged with a certain angle relative to the support plate 511. The neck portion 513 may be disposed between and connected to the support plate 511 and the mounting plate 512. The soft pad 514 may be arranged on the support plate 511.

The support plate 511 may be a quadrilateral plate body. A side of the support plate 511 away from the second housing assembly 30 and the soft pad 514 may be a curved surface. One side of the support plate 511 where a soft pad 514 is mounted may be a concave curved surface. The concave curved surface may generally match the profiles of the user's forehead or the part above the forehead. The support plate 511 may extend from a side of the mounting plate 512. The support plate 511 may be inclined toward a side where the soft pad 514 is mounted, so that the mounting plate 512 may be arranged with an obtuse angle relative to the support plate 511. The extending direction of the neck portion 513 may be the same as the extending direction of the support plate 511. That is, the neck portion 513 may extend from the one side of the mounting plate 512, so that the neck portion 513 may be arranged with an obtuse angle relative to the mounting plate 512. In some embodiments, the neck portion 513 may bend upward from the mounting plate 512, so that the neck portion 513 may be arranged with a right angle or an acute angle relative to the mounting plate 512.

The mounting plate 512 may be a plate structure with a thickness. The mounting plate 512 may be made of a rigid material. The mounting plate 512 may be configured to be mounted in cooperation with the top plate 111 of the primary front shell 11 and the primary shell ornament 15. For example, the mounting plate 512 may be sandwiched between the top plate 111 and the primary shell ornament 15. An adjustable through hole 5121 may be defined in the mounting plate 512. The adjustable through hole 5121 may have a strip shape. The adjustable through hole 5121 may correspond to a post 156 on the lower surface 155 of the primary shell ornament 15. The post 156 may be received in the adjustable through hole 5121. The number of the adjustable through holes 5121 may be two. The two adjustable through holes 5121 may be parallel with each other. The neck portion 513 may be made of a rigid material. A thickness of the neck portion 513 along a front-rear direction may be substantially equal to a depth of the recess 154 in the primary shell ornament 15. In this way, a part of the neck portion 513 may be received in the recess 154 of the primary shell ornament 15. In some embodiments, the neck portion 513 may be fixedly received in the recess 154.

A shape of the soft pad 514 may correspond to a shape of the support plate 511. The soft pad 514 may be fixed to a side of the support plate 511 facing the second housing assembly 30. The soft pad 514 may be provided at a side of the support plate 511, the mounting plate 512 may be provided at an opposite side of the support plate 511. In this way, the adjustable through hole 5121 may be defined at a side of the support plate 511 opposite to the side of the support plate 511 corresponding to the soft pad 514.

When mounting the first force bearing member 51 to the first housing assembly 10, the mounting plate 512 may be first placed on the top plate 111 of the primary front shell 11, the post 156 of the primary shell ornament 15 may then be received in the adjustable through hole 5121 of the mounting plate 512 and the through hole 1114 of the top plate 111 successively. At the same time, the recess 154 of the primary shell ornament 15 may receive the neck portion 513, so that the neck portion 513 may be fixedly received in the recess 154, and the first force bearing member 51 may be mounted to the first housing assembly 10. Since the adjustable through hole 5121 is defined in the mounting plate 512, it is possible to adjust the position of the first force bearing member 51 relative to the primary front shell 11 along a front-rear direction within a certain range, and to achieve adjustable mounting of the first force bearing member 51.

Specifically, the strip shaped adjustable through hole 5121 defined in the mounting plate 512 of the first force bearing member 51 and the primary shell ornament 15 whose post 156 is received in the adjustable through hole 5121 may form the adjustable structure of the present disclosure. The post 156 may be received in the adjustable through hole 5121, and may be positioned at different positions within the adjustable through hole 5121. Therefore, the adjustable structure may allow the position (For example, the horizontal position of the first force bearing member 51 along the direction of the adjustable through hole 5121) of the first force bearing member 51 relative to the first housing assembly 10 along the front-rear direction to be adjustable within a certain range. In some embodiments, the position of the adjustable through hole 5121 and the position of the post 156 may be interchanged. That is, the adjustable through-hole 5121 may be defined in the primary shell ornament 15, and the post 156 may be provided on the first force bearing member 51. Of course, a form of the adjustable structure in the present disclosure may not be limited to that of the adjustable through hole 5121 or the post 156. Any structure that enables the position of the first force bearing member 51 relative to the first housing assembly 10 to be adjusted may be used.

The Second Force Bearing Member 52 of the Force Bearing Assembly 50

Figure 53:
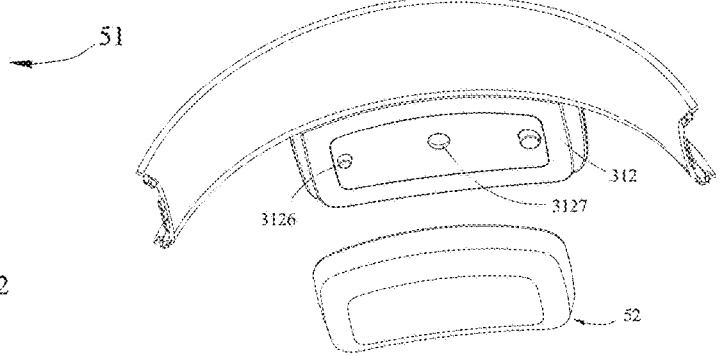
FIG. 53 is an exploded perspective view of a second force bearing member of the force bearing assembly and a bottom front housing of the second housing assembly shown in FIG. 1.
Figure 54:
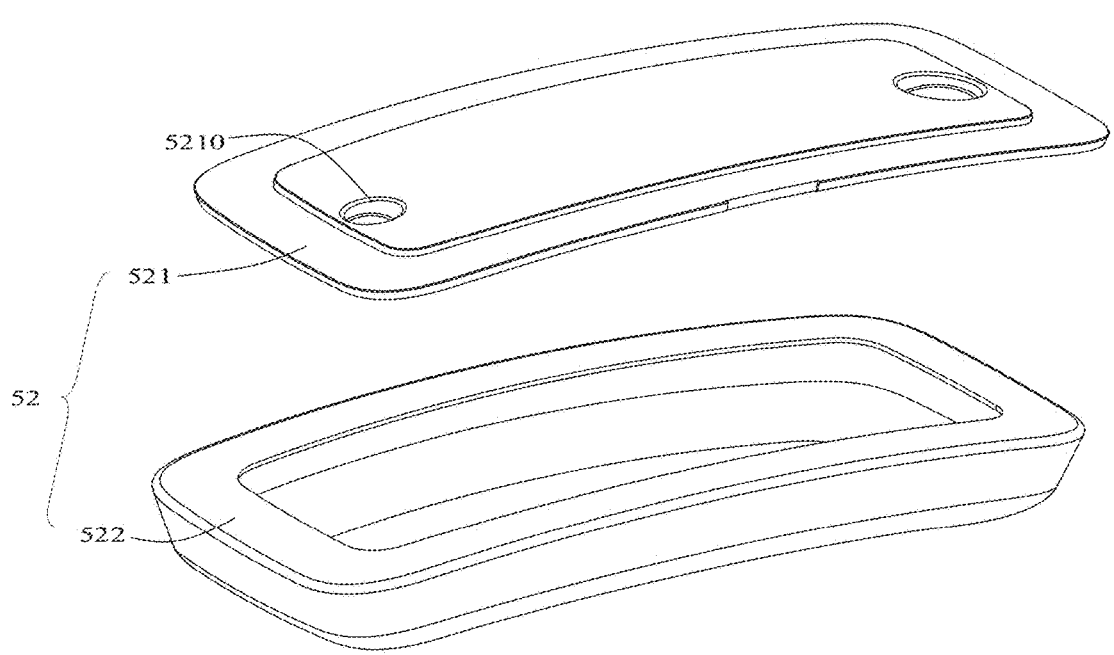
FIG. 54 is an exploded perspective view of a second force bearing member shown in FIG. 53.

As shown in FIG. 53, an exploded view of the second force bearing member 52 of the force bearing assembly 50 and the bottom front housing 31 of the second housing assembly 30 according to an embodiment is shown. The second force bearing member 52 may be fixedly mounted on the bottom front housing 31 of the second housing assembly 30. As shown in FIG. 54, an exploded view and a perspective view of the second force bearing member 52 according to an embodiment are shown. The second force bearing member 52 may include a fixing plate 521 and a soft pad 522 covering the fixing plate 521.

A shape and a size of the fixing plate 521 may match with a shape and a size of the first power supply housing body 3120 of the bottom front housing 31 of the second housing assembly 30. The fixing plate 521 may define a mounting hole 5210 corresponding to the connection member 3126 of the first power supply housing body 3120.

While mounting the second force bearing member 52 on the second housing assembly 30, the soft pad 522 may sleeve the fixing plate 521, and the fixing plate 521 may be aligned to the connection member 3126 on the first power supply housing body 3120, allowing the connection member 3126 to be firmly inserted in the mounting hole 5210, such that the second force bearing member 52 may be stably mounted on the second housing assembly 30. Alternatively, positions of the connection member 3126 and the mounting hole 5210 may be interchangeable. That is, the mounting hole 5210 may be defined in the second housing assembly 30, and the connection member 3126 may be arranged on the second force bearing member 52. Of course, the present disclosure does not limit a form of the mounting hole 5210 and the connection member 3126. Any means that allows the second force bearing member 52 to be mounted on the second housing assembly 30 may be applied, such as glue adhesion.

When the user puts on the head-mounted device 100, since the lacing assembly 20 connects the first housing assembly 10 and the second housing assembly 30 together, forming a wearable ring-shaped frame and enabling the second force bearing member 52 and the first housing assembly 10 to be a main force bearing point, the first housing assembly 10 may contact a forehead of the user and the second force bearing member 52 may contact a rear of the user's head. The user takes the forehead and the rear of the head to support the head-mounted device 100. Since the first force bearing member 51 is disposed at an upper of the forehead and is inclined towards the second force bearing member 52, and contacts the upper of the forehead, the head-mounted device 100 may be firmly supported. Therefore, it may be comfortable for the user to wear the head-mounted device.

The above description shows preferred embodiments of the present disclosure. To be noted that, for an ordinary skilled person in the art, various improvements and embellishments may be made without departing from the principles of the present disclosure, and the various improvements and embellishments shall be within the scope of the present disclosure.

What is claimed is:

1. A head-mounted device, comprising:
a first housing and a partition plate, wherein the partition plate is arranged inside the first housing, the first housing defines a first receiving cavity and a second receiving cavity, the first receiving cavity and the second receiving cavity are located at two opposite sides of the partition plate;
two second housings, extending from either side of two opposite sides of the first housing, each of the two second housings defines a third receiving cavity, each of the two third receiving cavities communicates with the first receiving cavity, one of the two third receiving cavities is at a right side of the first receiving cavity, another one of the two third receiving cavities is at a left side of the first receiving cavity; wherein a part of the first housing at a side of the second receiving cavity extends beyond the second housing; and a tightness adjustment mechanism, received in the first receiving cavity and supported by the partition plate, the tightness adjustment mechanism comprises:
a mounting plate, fixed in the first receiving cavity;
a ratchet pawl mechanism, mounted on the mounting plate, the ratchet pawl mechanism comprises:
a ratchet; and
a pawl assembly, engaging with the ratchet; and
a knob assembly, engaging with the pawl assembly and the ratchet.

2. The head-mounted device as claimed in claim 1, wherein the first housing comprises:
a first power supply housing; and
a second power supply housing, buckled with the first power supply housing;
the two second housings comprise:
a first channel housing; and
a second channel housing, buckled with the first channel housing;
wherein the first power supply housing extends downward from an edge at a side of the first channel housing; the second power supply housing recesses from the second channel housing away from the first channel housing and extends downward.

3. The head-mounted device as claimed in claim 2, wherein
a partition plate is disposed in the second power supply housing, and is configured to partition the first receiving cavity and the second receiving cavity.

4. The head-mounted device as claimed in claim 3, wherein
in the first receiving cavity, a perforated tab is provided on the second power supply housing, an end of the knob assembly protrudes to outside of the first receiving cavity.

5. The head-mounted device as claimed in claim 4, wherein two isolation plates are symmetrically provided at two sides of the perforated tab on the second power supply housing, a notch is defined in each of the two isolation plates and matches with the knob assembly.

6. The head-mounted device as claimed in claim 2, wherein
the third receiving cavities are defined, by the second channel housing and the first channel housing, at either side of the first receiving cavity of the second power supply housing.

7. The head-mounted device as claimed in claim 1, wherein:
the ratchet is provided on the mounting plate; and
the ratchet has a ring shape, internal teeth are provided on an inner side wall of the ratchet.

8. The head-mounted device as claimed in claim 1, wherein a side plate is arranged on each of two opposite long sides of the mounting plate, the side plates are arranged on a side of the mounting plate where the ratchet pawl mechanism is mounted, a first mounting portion is provided on each of two ends of a side plate of the mounting plate, each of the two side plates is provided with a buckling structure.

9. The head-mounted device as claimed in claim 8, wherein:
the buckling structure defines a recess and comprises a bump disposed above the recess; and a buckling structure corresponding to the buckling structure of the side plate is provided on the first housing.

10. A head-mounted device, comprising:
a first housing, defining a first receiving cavity;
a second housing, extending from a side of the first housing, a second receiving cavity is defined by the second housing, the second receiving cavity is isolated from the first receiving cavity; an extending length of the first housing is greater than an extending length of the second housing along a same direction;
a lacing assembly, comprising a first head band and a second head band, the first head band and the second head band are overlapped and connected with each other, a length adjustment hole is defined at an end of each of the first head band and the second head band, the length adjustment holes of the first head band and the second head band are overlapped and connected with each other in the first receiving cavity, a connection portion is provided at the other end of each of the first head band and the second head band; and
a tightness adjustment mechanism, received in the first receiving cavity, the tightness adjustment mechanism comprises:
a mounting plate, fixed in the first receiving cavity; and
a ratchet pawl mechanism, mounted on the mounting plate, the ratchet pawl mechanism and the length adjustment hole cooperate with each other and adjust an overlapped length of the first head band and the second head band;
wherein the tightness adjustment mechanism is supported by a bottom wall of the first housing, and the second housing and the tightness adjustment mechanism are disposed at two opposite surface of the bottom wall.

11. The head-mounted device as claimed in claim 10, wherein the pawl assembly comprises:
a mounting member;
a rotating plate, mounted on the mounting member and rotating relative to the mounting member;
a pawl, pivotally mounted on the mounting member, one end of the pawl abuts against the rotating plate, the other end of the pawl matches with a ratchet; and
a gear, mounted on the mounting member and driven to rotate by the rotating plate.

12. The head-mounted device as claimed in claim 11, wherein a length adjustment hole is provided on each of the first head band and the second head band, the length adjustment hole is a strip-shaped through hole, a sawtooth wave extending along a length of the strip-shaped through hole is arranged on a wall of the length adjustment hole of each of the first head band and the second head band, the gear is arranged in the length adjustment hole, and engages with the sawtooth wave of each of the first head band and the second head band.

13. The head-mounted device as claimed in claim 12, wherein the sawtooth wave of the first head band and the sawtooth wave of the second head band are arranged on either side of the tightness adjustment mechanism respectively.

14. The head-mounted device as claimed in claim 11, wherein:
the mounting member comprises a first shielding plate and a second shielding plate fixedly connected to each other, and
the rotating plate is disposed between the first shielding plate and the second shielding plate.

15. The head-mounted device as claimed in claim 14, wherein the pawl assembly further comprises a spring assembled on the second shielding plate, the spring is connected to the pawl.

16. A head-mounted device, comprising:
- a host housing;
- a first housing and a partition plate, wherein the partition plate is arranged inside the first housing, the first housing defines a first receiving cavity and a second receiving cavity, the first receiving cavity and the second receiving cavity located at two opposite sides of the partition plate,
- two second housings, extending from either side of two opposite sides of the first housing, a third receiving cavity is defined by the second housing, the third receiving cavity communicates with the first receiving cavity, a part of the first housing at a side of the second receiving cavity extends beyond the second housing;
- a lacing assembly, connected with the host housing and the two second housings to form a frame, the lacing assembly comprises a first head band and a second head band connected with each other, the first head band and the second head band are configured to overlap with each other, an end of each of the first head band and the second head band is received in the first receiving cavity and the third receiving cavity, the other end of each of the first head band and the second head band is provided with a connection portion, the connection portion is configured to be connected to the host housing;
- a tightness adjustment mechanism, received in the first receiving cavity and supported by the partition plate, the tightness adjustment mechanism comprises:
  - a mounting plate; and
  - a ratchet pawl mechanism, mounted on the mounting plate, the ratchet pawl mechanism cooperates with the first head band and the second head band, and adjusts an overlapping length of the first head band and the second head band; and
- a force bearing member, mounted on the frame.

17. The head-mounted device as claimed in claim 16, wherein the force bearing member is connected to the host housing, is disposed on a side of the frame, and the force bearing member comprises:
- a support plate;
- a mounting plate, arranged with an obtuse angle relative to the support plate and mounted on the host housing;
- a neck portion, disposed between and connected to the support plate and the mounting plate; and
- a soft pad, arranged on the support plate.

18. The head-mounted device as claimed in claim 16, wherein:
- the force bearing member is connected to the first housing, and is disposed on a side of the frame; and
- the force bearing member comprises a fixing plate and a soft pad wrapping the fixing plate;
- and the fixing plate is fixed on the first housing.

19. The head-mounted device as claimed in claim 18, wherein:
- a connector is provided on the first housing; and
- a mounting hole is defined on the fixing plate, the mounting hole corresponds to the connector of the first housing.

20. The head-mounted device as claimed in claim 16, wherein:
- the force bearing member comprises a first force bearing member and a second force bearing member,
- the first force bearing member is connected to the host housing, and is disposed on a side of the frame,
- a second force bearing member is connected to the first housing, and is disposed on an opposite side of the frame,
- the first force bearing member is inclined towards the second force bearing member.

* * * * *